United States Patent [19]
Reik et al.

[11] Patent Number: 5,409,091
[45] Date of Patent: Apr. 25, 1995

[54] AUTOMATICALLY ADJUSTABLE FRICTION CLUTCH

[75] Inventors: Wolfgang Reik, Bühl; Karl-Ludwig Kimmig, Bühl-Waldmatt, both of Germany; Edmund Maucher, Wooster, Ohio; Christoph Wittmann, Bühl-Eisental, Germany

[73] Assignee: Luk Lamellen und Kupplungsbau GmbH, Bühl, Germany

[21] Appl. No.: 982,184

[22] Filed: Nov. 25, 1992

[30] Foreign Application Priority Data

| Nov. 26, 1991 | [DE] | Germany | 41 38 806 |
| Mar. 5, 1992 | [DE] | Germany | 42 06 904 |
| Mar. 10, 1992 | [DE] | Germany | 42 07 528 |
| Apr. 18, 1992 | [DE] | Germany | 42 12 940 |

[51] Int. Cl.⁶ .................... F16D 13/75; F16D 13/71
[52] U.S. Cl. .................... 192/70.25; 192/89.23; 192/107 C; 192/111 A
[58] Field of Search ........... 192/70.25, 111 A, 89 PH, 192/107 C, 89.23

[56] References Cited

U.S. PATENT DOCUMENTS

| 3,595,355 | 7/1971 | Mancher et al. | 192/89 PH X |
| 4,207,972 | 6/1980 | Zeidler | 192/111 A |
| 4,671,399 | 6/1987 | Ooga | 192/107 C |
| 4,949,829 | 8/1990 | Tojima et al. | 192/89 PH |
| 5,090,536 | 2/1992 | Asada | 192/70.25 |
| 5,174,426 | 12/1992 | Thirion de Briel et al. | 192/107 C |

FOREIGN PATENT DOCUMENTS

| 2606477 | 5/1988 | France | 192/111 A |
| 2916755 | 11/1979 | Germany | |
| 3323995 | 1/1985 | Germany | 192/111 A |
| 3420537 | 12/1985 | Germany | 192/111 A |
| 3518781 | 11/1986 | Germany | |
| 3-129129 | 6/1991 | Japan | 192/111 A |
| 2087489 | 5/1982 | United Kingdom | 192/107 C |

Primary Examiner—Richard M. Lorence
Attorney, Agent, or Firm—Darby & Darby

[57] ABSTRACT

A friction clutch wherein a pressure plate is axially movably but non-rotatably coupled to a cover and is biased by a diaphragm spring to urge the friction linings of a clutch disc against a flywheel which is driven by the engine of a motor vehicle. The diaphragm spring is tiltable relative to a seat which is carried by the cover, and a second spring is provided to bias a portion of the seat against the diaphragm spring. The latter can be moved axially of the flywheel to compensate for wear upon the friction linings, particularly when the flywheel is idle or is driven at a relatively low speed. The device which compensates for wear upon the friction linings is installed between the diaphragm spring and the cover, and its purpose is to ensure that the bias of the diaphragm spring upon the pressure plate in engaged condition of the friction clutch remains at least nearly constant regardless of the extent of wear upon the friction linings and certain other parts including the diaphragm spring, the pressure plate, springs which form part of the clutch disc to urge two sets of friction linings axially and away from each other against the flywheel and the pressure plate, respectively, and leaf springs which connect the pressure plate to the cover.

48 Claims, 19 Drawing Sheets

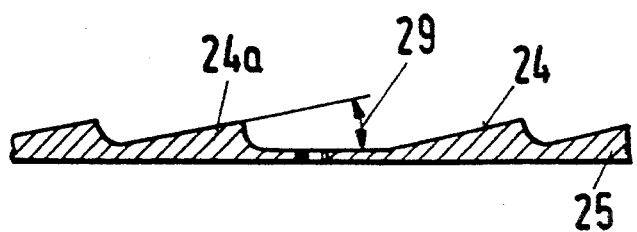
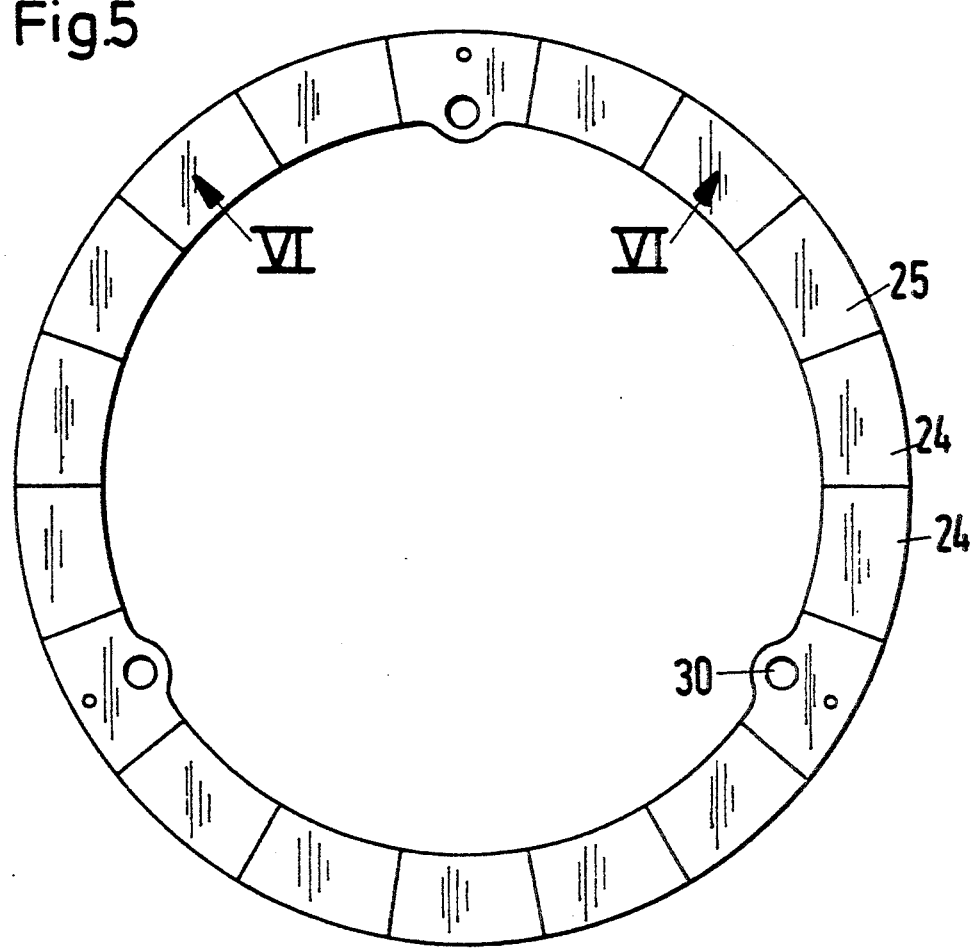

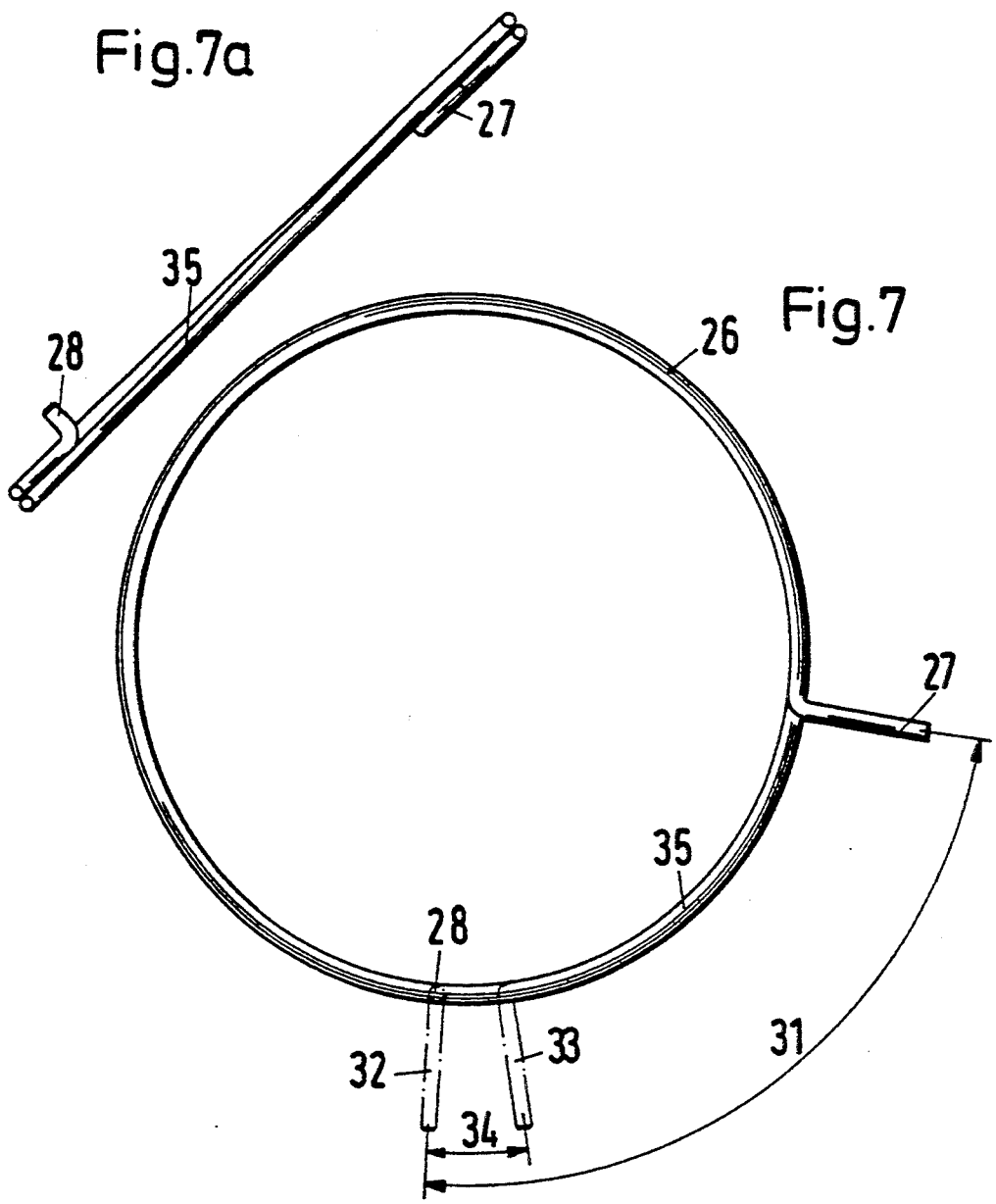

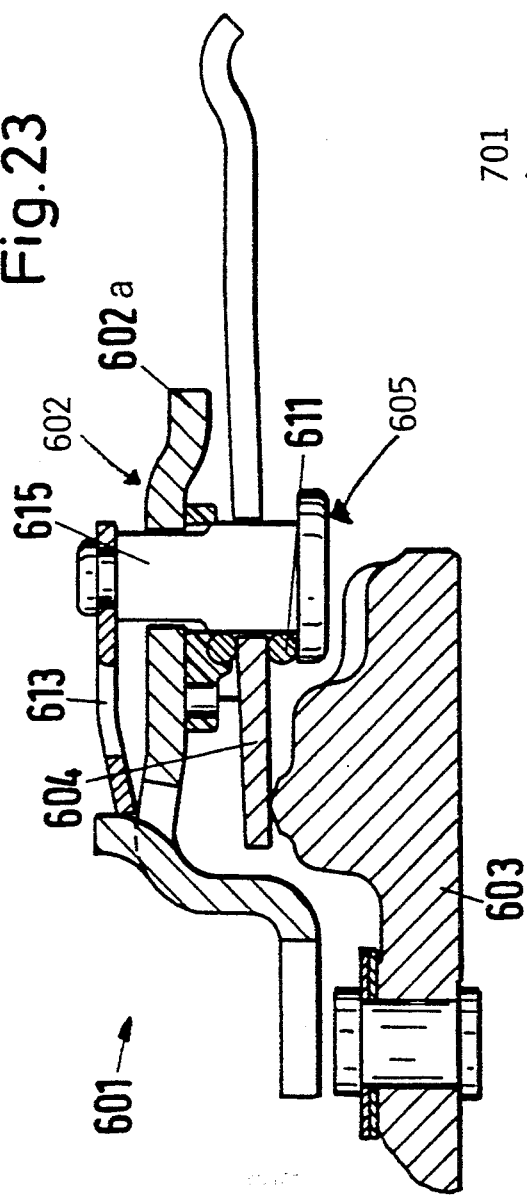
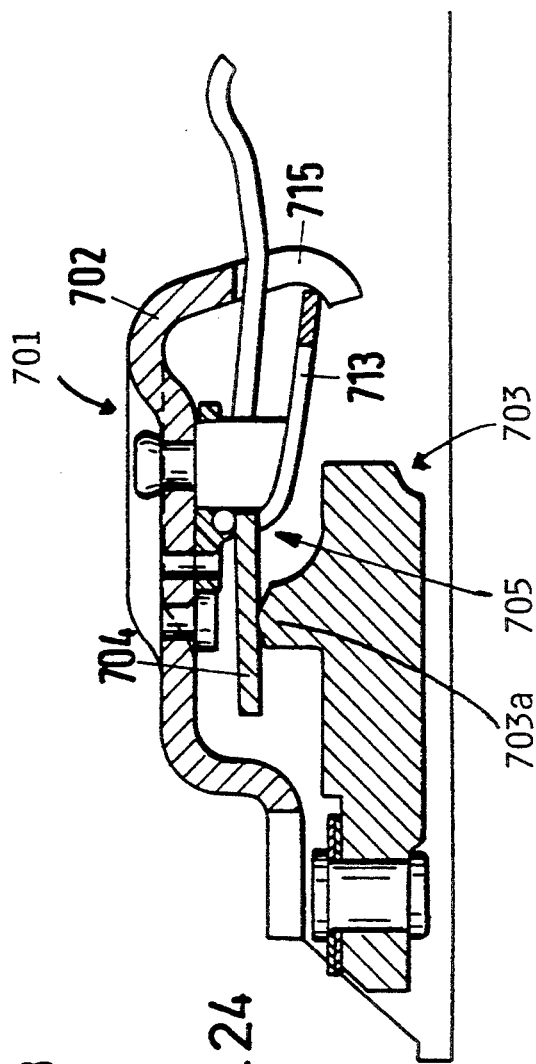

AUTOMATICALLY ADJUSTABLE FRICTION CLUTCH

CROSS-REFERENCE TO RELATED APPLICATION

The disclosure of the present application is in part identical with that in the commonly owned patent application Ser. No. 07/982,178, filed Nov. 25, 1992, by Paul Maucher for "Friction Clutch".

BACKGROUND OF THE INVENTION

The invention relates to improvements in friction clutches, especially for use in motor vehicles. More particularly, the invention relates to improvements in friction clutches wherein a pressure plate is non-rotatably connected to a rotary housing so that it can perform limited axial movements relative to the housing, and wherein a clutch disc or clutch plate can be clamped between the pressure plate and a counterpressure plate (such as a flywheel) under the action of a diaphragm spring which bears against the pressure plate in engaged condition of the friction clutch. The diaphragm spring is axially stressed between the pressure plate and the housing and is tiltable relative to a seat which is carried by the housing, and the friction clutch further employs an adjusting unit which compensates for wear upon the friction linings of the clutch disc.

Automatic compensating devices which ensure that the pressure plate is acted upon by the diaphragm spring with a substantially constant force are disclosed, for example, in published German patent application Serial Nos. 29 16 755 and 35 18 781. These compensating devices are adjustable in response to signals from at least one sensor and are disposed or operate between the pressure plate and the diaphragm spring. The pressure plate is coupled to the housing by tangentially extending leaf springs which must be designed to exert a relatively small force because such force opposes the bias of the diaphragm spring; therefore, when the friction clutch is disengaged, the pressure plate (whose mass is rather substantial) is likely to perform axial reciprocatory movements which involve repeated stray movements into and out of contact with the diaphragm spring. This not only adversely influences the operation of the friction clutch but can actually cause the friction clutch to become a safety risk because the compensating device is being adjusted in disengaged condition of the friction clutch until the pressure plate comes into contact with the clutch disc, i.e., when it is no longer possible to disengage the friction clutch. Therefore, compensating devices which are disclosed in the aforediscussed published German patent applications failed to gain acceptance by the makers of friction clutches.

OBJECTS OF THE INVENTION

An object of the invention is to provide a friction clutch which constitutes an improvement over and a further development of friction clutches disclosed in the published German patent applications Serial Nos. 29 16 755 and 35 18 781.

Another object of the invention is to provide a friction clutch with a device which can automatically compensate for wear upon the friction linings of the clutch disc and for wear upon one or more additional parts of the friction clutch in a novel and improved way.

A further object of the invention is to provide a friction clutch wherein undesirable axial oscillations of the pressure plate cannot adversely influence the adjusting action of the compensating device.

An additional object of the invention is to provide a friction clutch with a novel and improved automatic wear compensating device which can stand long periods of rough treatment, for example, when the friction clutch is used in a motor vehicle to transmit torque between a prime mover and a transmission.

Still another object of the invention is to provide a versatile friction clutch which can be put to use in all kinds of motor vehicles and whose reliability remains unchanged during its entire useful life.

A further object of the invention is to provide a simple and inexpensive friction clutch wherein the wear upon the friction linings of the clutch disc and upon certain other parts is compensated for in a novel and improved way, which is compact, and which can be installed in a power train in a simple and inexpensive way.

Another object of the invention is to provide a friction clutch which can be disengaged in response to the exertion of a relatively small force during its entire useful life.

An additional object of the invention is to provide a friction clutch which embodies the above outlined features and whose useful life is longer than that of heretofore known friction clutches.

Still another object of the invention is to provide a motor vehicle which embodies the above outlined friction clutch.

A further object of the invention is to provide a novel and improved combination of prime mover, friction clutch and transmission, particularly for use in motor vehicles.

Another object of the invention is to provide a friction clutch with an automatic wear compensating device whose effectiveness remains at least substantially unchanged during the entire useful life of the friction clutch.

An additional object of the invention is to provide a novel and improved method of compensating for wear upon the friction linings of the clutch disc and upon certain other parts in a friction clutch for use in motor vehicles or the like.

Still another object of the invention is to provide the friction clutch with novel and improved means for preventing unintentional compensation for wear upon the friction linings at a time when a compensation is undesirable or detrimental.

A further object of the invention is to provide the above outlined friction clutch with novel and improved means for automatically changing the position of the pressure plate.

Another object of the invention is to provide a novel and improved diaphragm spring for use in the above outlined friction clutch.

An additional object of the invention is to provide a novel and improved housing or cover for use in the above outlined friction clutch.

Still another object of the invention is to provide a novel and improved combination of housing, diaphragm spring, seat for the diaphragm spring and automatic wear compensating device for use in the above outlined friction clutch.

A further object of the invention is to provide the above outlined friction clutch with novel and improved means for centering its components relative to the housing.

Another object of the invention is to provide a novel and improved method of preventing vibrations and/or other stray movements of certain parts of a friction clutch from adversely influencing the automatic adjustment to compensate for wear upon the clutch disc.

SUMMARY OF THE INVENTION

One feature of the present invention resides in the provision of an engageable and disengageable friction clutch, particularly for motor vehicles. The improved friction clutch comprises a housing which is rotatable about a predetermined axis, a pressure plate, means (such as a set of leaf springs) for non-rotatably connecting the pressure plate to the housing with limited freedom of movement in the direction of the predetermined axis, a rotary counterpressure plate (such as a flywheel) which is adjacent the pressure plate, a torque transmitting clutch disc disposed between the two plates and having friction linings which are subject to wear in response to repeated engagement and disengagement of the friction clutch, and an axially stressed diaphragm spring which is disposed between the housing and the pressure plate to bias the pressure plate against the clutch disc so that the friction linings are clamped between the two plates in engaged condition of the friction clutch. The diaphragm spring is tiltable relative to a seat which is carried by the housing, and the friction clutch further comprises means for automatically compensating for wear at least upon the friction linings (or upon the friction linings and the adjacent portions of the two plates). The compensating means is effective between the housing and the diaphragm spring to shift the seat relative to the housing in the direction of the predetermined axis, and the friction clutch also comprises means for operating the compensating means (such operating means can comprise, for example, one or more torsion springs or one or more coil springs) and means (such as a second spring resembling or constituting a diaphragm spring) for applying to the axially stressed diaphragm spring a supporting force in a direction toward the seat.

The axially stressed diaphragm spring can have a degressive characteristic curve within its operating range. Furthermore, it is often desirable or advantageous that the diaphragm spring be merely force-lockingly propped against the action of the supporting force.

The supporting force and the bias of the axially stressed diaphragm spring can be related to each other in such a way that—in contemplated built-in condition of the diaphragm spring, in the absence of changes of conicity of the diaphragm spring due to wear, and within the disengagement range of the diaphragm spring—the supporting force is greater than the bias which is applied by the diaphragm spring and opposes the supporting force whereas, when the conicity of the diaphragm spring changes as a result of wear, the supporting force is smaller than the bias which is applied by the diaphragm spring to oppose the supporting force within portions of the path of disengagement of the diaphragm spring.

The means for applying the supporting force can include at least one energy storing device (such as a spring) which changes its shape as a result of wear-induced adjustment of the diaphragm spring and/or the seat.

The compensating means can be disposed between the diaphragm spring and the housing (as seen in the direction of the predetermined axis).

The compensating means can comprise sloping surfaces. In accordance with a presently preferred embodiment, the compensating means comprises ramps and the sloping surfaces are provided on the ramps.

As mentioned above, the means for applying the supporting force can comprise an element which resembles (or constitutes) a diaphragm spring. For example, the means for applying the supporting force can comprise a second diaphragm spring which engages the axially stressed diaphragm spring at a predetermined radial distance from the predetermined axis. The arrangement is preferably such that the axially stressed diaphragm spring is tiltable relative to the seat at or close to the predetermined radial distance from the predetermined axis.

The seat can comprise a first portion (e.g., a first wire ring) between the axially stressed diaphragm spring and the housing, and a second portion (e.g., a second wire ring) between the diaphragm spring and the means for applying the supporting force. The second portion of the seat can be disposed between the diaphragm spring and the pressure plate, and the means for applying the supporting force can include means for urging the second portion of the seat against the diaphragm spring. The second portion of the seat can be mounted for movement in the direction of the predetermined axis and the bias of the axially stressed diaphragm spring varies in response to such movement of the second portion of the seat. The bias of the axially stressed diaphragm spring can decrease in response to movement of the second portion of the seat toward the pressure plate. The second portion of the seat can be moved to a position in which the supporting force which is applied thereto is in a state of at least substantial equilibrium with the disengaging force which is applied thereto by the axially stressed diaphragm spring. The aforementioned urging means can comprise energy storing means which applies to the second portion of the seat a substantially constant force within the contemplated adjustment range.

The means for applying the supporting force can include energy storing means which acts as a sensor.

The seat can comprise a first portion which is disposed between the axially stressed diaphragm spring and the housing and is movable in the direction of the predetermined axis toward the pressure plate but is adapted to be arrested against movement in the direction of the predetermined axis away from the pressure plate. Such seat further comprises a second portion which is disposed between the axially stressed diaphragm spring and the pressure plate and is biased toward the axially stressed diaphragm spring.

The means for operating the compensating means can comprise a spring. The compensating means can comprise a coherent annular adjusting member which is stressed by the axially stressed diaphragm spring in the direction of the predetermined axis in engaged condition of the friction clutch.

The compensating means can comprise adjustable ramps which slope in the direction of the predetermined axis. The compensating means can further comprise the aforementioned annular adjusting member and the ramps can include a set of ramps which are provided on the adjusting member. At least a portion of the seat can be carried by the adjusting member of the compensating means. The ramps can further include a second set of ramps which cooperate with the (first) set of ramps on the adjusting member. The compensating means can also comprise an annulus between the housing and the adjusting member, and the ramps of the second set can be provided on the annulus. Alternatively, the ramps of the second set can be of one piece with the housing, i.e., the annulus can be dispensed with or a portion of the housing can be said to constitute a functional equivalent of such annulus.

The compensating means can be designed to act as a freewheel in the direction of disengagement of the friction clutch and to be self-locking in a direction counter to the direction of disengagement of the friction clutch.

As already mentioned above, the compensating means can comprise sets of cooperating ramps; the arrangement can be such that the ramps of at least one of such sets are inclined at an angle of 4–20 degrees (preferably at an angle of 5–12 degrees) with reference to a plane which is normal to the predetermined axis.

In accordance with a presently preferred embodiment, the compensating means comprises a first annular member (such as the aforementioned adjusting member) having a first set of ramps, and a second annular member (such as the aforementioned annulus) having a second set of ramps which engage the ramps of the first set and have a slope such that the two sets of ramps are in self-locking frictional engagement with each other. At least one of the two members is movable relative to the other member and is biased relative to the other member in the aforementioned direction to shift the seat relative to the housing.

It is also within the purview of the invention to employ compensating means which employs a plurality of discrete mobile adjusting members (e.g., a set of three or more washer-like or button-like adjusting members).

The compensating means can be designed in such a way that it comprises means for shifting the seat as a function of the rotational speed of the housing. For example, the compensating means can be ineffective when the housing is rotated at least at one of a plurality of different speeds. The arrangement may be such that the compensating means is ineffective when the speed of the housing exceeds a predetermined threshold value. The speeds can include an idling speed (e.g., if the counterpressure plate is driven by the engine of a motor vehicle) and speeds below the idling speed; and the compensating means can be designed to be effective at and below the idling speed. It is possible to design the compensating means in such a way that it is effective only, or at least, when the rotational speed of the housing is at least close to zero.

If the compensating means comprises a first member which carries a first set of ramps and a second member having a second set of ramps which engage the ramps of the first set, one of the members is preferably movable relative to the housing in a predetermined direction and is biased in such predetermined direction (such as by the aforementioned cooperating means). The one member can be biased in the circumferential direction of the rotary housing.

As mentioned above, the means for applying the supporting force can comprise a resilient sensor, and such sensor can include a portion which is remote from the predetermined axis and reacts against the housing. The housing can include portions which support the sensor.

The friction linings can include first and second sets of linings which are engageable by the pressure plate and by the counterpressure plate, respectively, and the clutch disc which includes such sets of friction linings can further include resilient means for biasing the two sets of friction linings away from each other in the direction of the predetermined axis. Alternatively, the clutch disc or the friction clutch can comprise a suitable substitute for the just mentioned resilient means. The resilient means or its substitute is deformable, with a first force-to-displacement characteristic, in response to the bias of the axially stressed diaphragm spring upon the pressure plate with a second force-to-displacement characteristic which at least approximates the first characteristic.

The force which is required to actuate the axially stressed diaphragm spring in disengaged condition of the friction clutch can be in the range of between minus 150 nm and plus 150 nm.

The axially stressed diaphragm spring can be designed to have a force-to-displacement characteristic with a transition from positive to negative upon disengagement of the clutch disc from the counterpressure plate.

Another feature of the invention resides in the provision of a friction clutch which comprises a pressure plate rotatable about a predetermined axis, a rotary counterpressure plate which is coaxial with the pressure plate, a diaphragm spring which serves to bias one of the two plates axially toward the other plate, and a clutch disc which is disposed between the two plates and has first and second sets of friction linings engageable by the pressure plate and by the counterpressure plate, respectively. The clutch disc further comprises resilient means for biasing the two sets of friction linings away from each other in the direction of the predetermined axis, and the resilient means is deformable, with a first force-to-displacement characteristic, in response to the bias of the diaphragm spring upon the one plate with a second force-to-displacement characteristic which at least approximates the first characteristic.

The novel features which are considered as characteristic of the invention are set forth in particular in the appended claims. The improved friction clutch itself, however, both as to its construction and its mode of operation, together with additional features and advantages thereof, will be best understood upon perusal of the following detailed description of certain presently preferred specific embodiments with reference to the accompanying drawings.

BRIEF DESCRIPTION OF THE DRAWINGS

FIG. 5 is a plan view of a second annular adjusting or wear compensating member which is utilized in the adjusting or wear compensating device or unit of the friction clutch shown in FIGS. 1 and 2;

FIG. 6 is a fragmentary sectional view substantially as seen in the direction of arrows from the line VI—VI in FIG. 5;

FIG. 7 is a plan view of a torsion spring which is utilized in the adjusting unit of the friction clutch shown in FIGS. 1 and 2;

FIG. 7a an end elevational view of the torsion spring;

FIG. 23 is a fragmentary axial sectional view of a fifth friction clutch;

FIG. 24 is a fragmentary axial sectional view of a sixth friction clutch;

DESCRIPTION OF PREFERRED EMBODIMENTS

Figure 1:
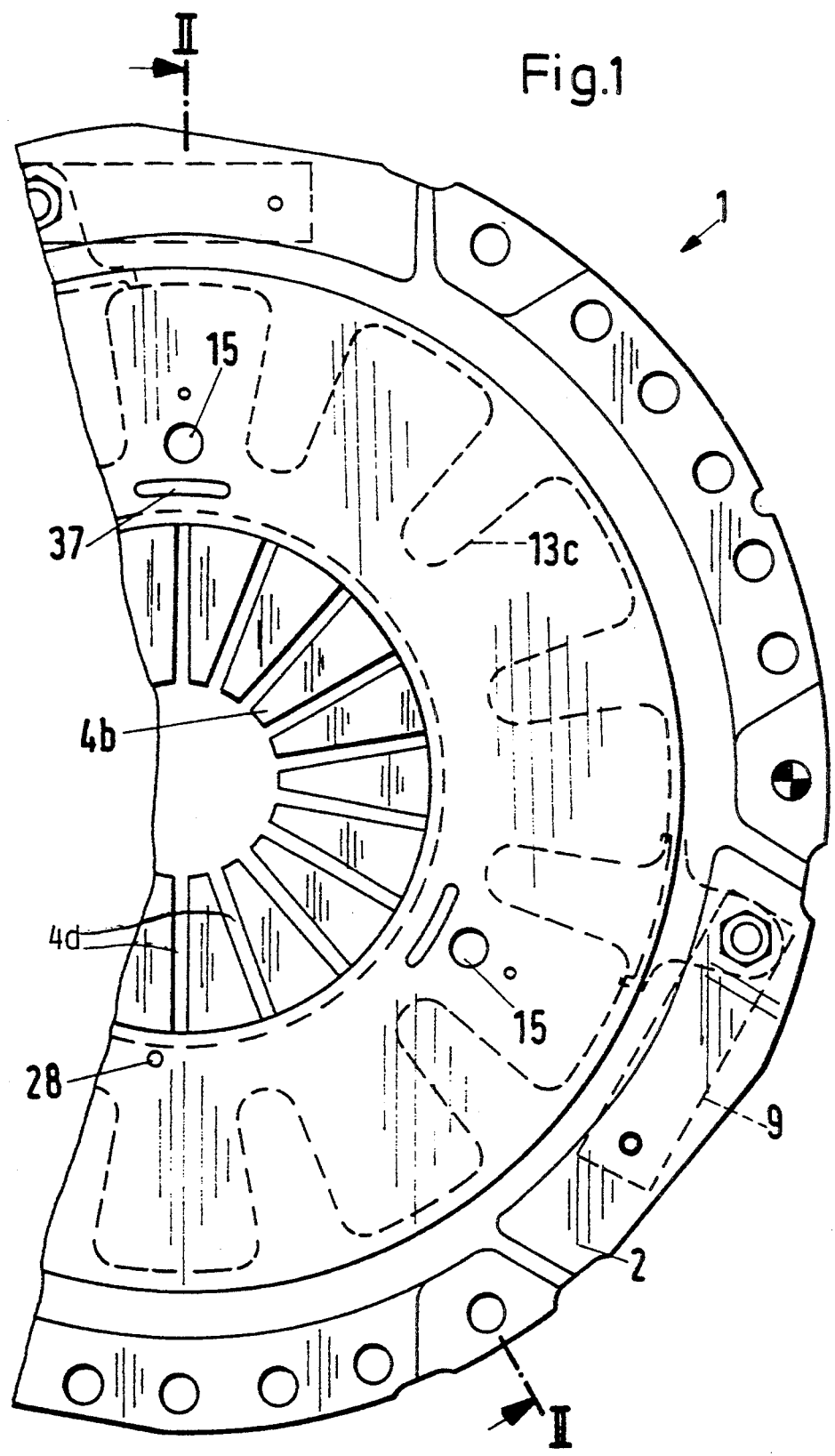
FIG. 1 is a fragmentary elevational view as seen from the right-hand side of FIG. 2 and shows a friction clutch which embodies one form of the present invention.
Figure 2:
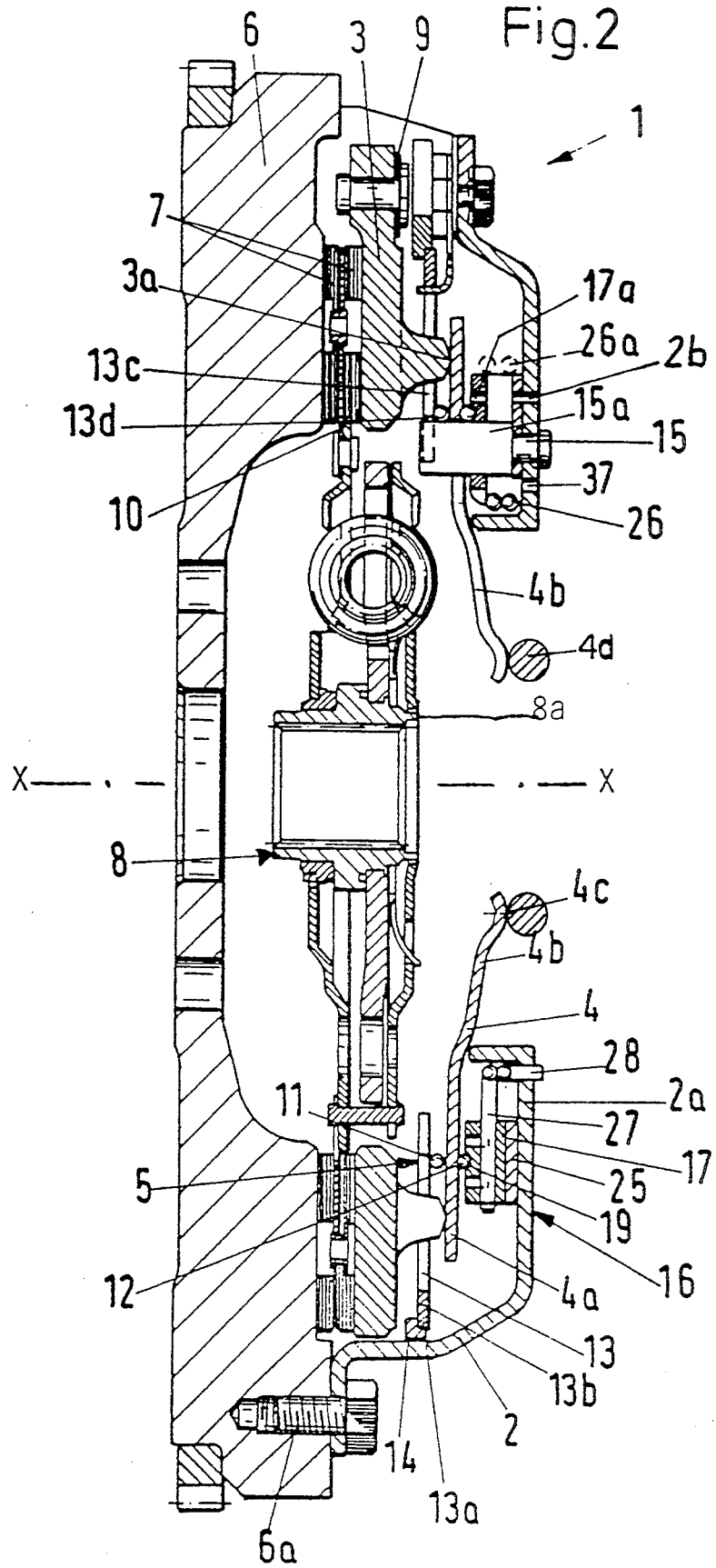
FIG. 2 is a sectional view substantially as seen in the direction of arrows from the line II—II in FIG. 1.

Referring first to FIGS. 1 and 2, there is shown a torque transmitting friction clutch 1 which comprises a housing or cover 2 and a pressure plate 3 which is nonrotatably but axially movably (within limits) connected to the cover 2. A resilient device in the form of a diaphragm spring 4 is installed, in stressed condition, between the bottom wall or end wall 2a of the cover 2 and the pressure plate 3 so as to bias the pressure plate in a direction to the left, as viewed in FIG. 2, namely against the adjacent set of friction linings 7 forming part of a torque transmitting clutch plate or clutch disc 8. The diaphragm spring 4 is tiltable relative to the cover 2 at a location which is determined by an annular seat assembly 5 (hereinafter called seat for short) carried by the bottom wall 2a. The normal stressed condition of the diaphragm spring 4 is such that it urges the pressure plate 3 against the adjacent set of friction linings 7 of the clutch disc 8 whereby a second set of friction linings forming part of the clutch disc bears against the adjacent friction surface of a rotary counterpressure plate 6 here shown as a flywheel and hereinafter called flywheel for short. The illustrated clutch disc 8 comprises a centrally located hub 8a which can be installed on the input shaft (not shown) of a variable-speed transmission in a motor vehicle and carries two sets of friction linings 7 with resilient segments 10 between the two sets of linings. The clutch 1 is engaged and the flywheel 6 transmits torque to the input shaft of the transmission when the two sets of friction linings 7 of the clutch disc 8 are clamped between the neighboring friction surfaces of the pressure plate 3 and flywheel 6.

The means for connecting the pressure plate 3 with the cover 2 comprises several circumferentially extending leaf springs 9 (see particularly FIG. 1) which hold the pressure plate 3 against rotation but permit it to move, within limits, axially of the cover 2. The purpose of the resilient segments 10 between the two sets of friction linings 7 forming part of the clutch disc 8 is to establish a progressive buildup (variation) of torque during engagement of the friction clutch 1. Such resilient segments permit limited axial shifting of the two sets of friction linings 7 toward each other to thus establish a progressive increase of axial forces which act upon the friction linings. However, it is equally within the purview of the invention to employ a clutch disc which replaces the illustrated clutch disc 8 and comprises one or two sets of friction linings 7 having no freedom of axial movement relative to each other. Such friction linings can be glued or otherwise affixed to opposite sides of a suitable plate-like carrier surrounding the hub of the modified clutch disc. In such modified friction clutch, one could employ a "substitute" for the resilient segments 10, namely one or more resilient elements in series with the diaphragm spring 4. For example, one could employ one or more resilient elements between the cover 2 and the adjacent portion 12 of the seat 5 and/or between the diaphragm spring 4 and the pressure plate 3. Alternatively or in addition to such "substitutes" one can employ a resilient cover 2.

The illustrated diaphragm spring 4 comprises a circumferentially complete annular main or primary or portion 4a which is adjacent one or more axially extending protuberances or portions 3a of the pressure plate 3 and serves to generate the major part of forces which are necessary to bias the pressure plate 3 against the adjacent friction linings 7 so as to urge the other set of friction linings against the friction surface of the flywheel 6. The main or primary portion 4a of the diaphragm spring 4 carries radially inwardly extending yieldable prongs 4b having radially innermost portions or tips 4c engageable by a bearing, a pedal or other component which forms part of means 4d for disengaging the friction clutch 1. The main or primary portion 4a of a disengagement the diaphragm spring 4 includes a radially outer part which engages the portion or portions 3a of the pressure plate 3, and a radially inner part which is disposed between two portions 11 and 12 of the seat 5. Such radially inner portion of the main or primary portion 4a is tiltable between the portions 11 and 12 in order to move the radially outer portion of the diaphragm spring 4 toward or away from the flywheel 6, i.e., to engage or disengage the clutch 1.

The illustrated portions 11 and 12 of the seat 5 are wire rings which flank the radially inner part of the main or primary portion 4a of the diaphragm spring 4 at a location radially inwardly of the portion or portions 3a of the pressure plate 3. A biasing means comprises a resilient distance or displacement monitoring sensor 13, here shown as a diaphragm spring, is provided to bias the inner ring or portion 11 of the seat 5 toward the bottom wall 2a of the cover 2. The illustrated resilient sensor 13 in the form of a diaphragm spring can be replaced by other biasing means without departing from the spirit of the invention. The annular radially outer portion 13b of the sensor 13 is circumferentially complete and comprises an outermost part or portion 13a which reacts against an abutment 14 at the inner side of the cover 2. The sensor 13 further comprises radially inwardly extending resilient tongues 13c which bear upon the adjacent side of the ring 11.

The abutment 14 for the radially outermost part 13a of the annular portion 13a of the sensor 13 can comprise a circumferentially complete annulus which is welded or otherwise secured to the inner side of the cover 2. Alternatively, the abutment 14 can comprise two or more arcuate sections which are affixed to the inner side of the cover 2 to be engaged by the adjacent part 13b of the sensor 13. The individual segments or portions of the abutment 14 can be bonded, riveted or otherwise affixed to the cover 2. It is also possible to provide an abutment 14 consisting of one or more projections which are of one piece with the cover 2 and are configurated to extend into the path of leftward movement (reference being had to FIG. 2) of the radially outermost part 13a of the sensor 13. Such abutment can consist of radially inwardly deformed portions of the cover 2 or it can include one or more lugs or prongs which are bent from the adjacent portion of the cover to thus establish holes in the cover adjacent the radially outermost part 13a of the sensor 13. The making of such inwardly extending portions, lugs or prongs can take place subsequent to installation of the sensor 13 in the interior of the cover 2. The sensor 13 can be stressed as a result of the making of abutment 14, or the sensor is already maintained in stressed condition at the time the abutment 14 is either installed or formed as an integral part of the cover 2.

It is also possible to provide a more pronounced connection between the sensor 13 and the abutment 14. For example, it is possible to provide a bayonet mount which can establish a positive but separable connection between the sensor 13 and the abutment 14. The configuration of the bayonet mount can be such that the sensor 13 can be installed in the cover 2 to have its radially outermost part 13a located to the left of the abutment 14, as viewed in FIG. 2. The radially outermost part 13a is then shifted axially toward the bottom wall 2a of the cover 2 to stress the sensor 13 and to cause such radially outermost part 13a to advance over the adjacent portion or portions of the abutment 14. The next step involves turning of the sensor 13 relative to the abutment 14 and/or vice versa so as to releasably lock the radially outermost part 13a of the sensor in the position which is shown in FIG. 2, namely at the right-hand side of the abutment 14. In such friction clutches, the radially outermost part 13a of the sensor 13 can comprise a plurality of prongs or arms extending radially outwardly beyond the circumferentially complete annular portion 13b of the sensor. The abutment 14 then comprises a plurality of recesses or tooth spaces, which permit the prongs of the sensor 13 to pass therethrough before the sensor is turned so that its prongs are moved out of alignment with the tooth spaces of the abutment 14.

The means for centering the diaphragm spring 4 and/or the sensor 13 in the cover 2 and for simultaneously preventing rotation of such springs relative to the pressure plate 3 comprises axially parallel rivets 15. Such rivets can further serve as a means for centering the rings 11 and 12 of the seat 5 in the cover 2. Each rivet 15 comprises an elongated shank 15a which extends in parallelism with the axis (X—X) of rotation of the clutch plate 8 and is anchored in the bottom wall 2a of the cover 2. The shanks 15a extend through slots 4d between the neighboring prongs 4b of the diaphragm spring 4. The tongues 13c of the sensor 13 comprise portions 13d which straddle the adjacent portions of the shanks 15a so that the rivets 15 hold the sensor 13 against rotation in the cover 2.

The resilient sensor 13 is designed to furnish a substantially constant force during a predetermined stage of its axial deformation. The purpose of the sensor 13 is to bias the ring 11 toward the bottom wall 2a of the cover 2 as well as to take up the clutch disengaging force when such force is being applied to the tips 4c of prongs 4b forming part of the diaphragm spring 4. Depression of the tips 4c in a direction to the left, as viewed in FIG. 2, results in tilting of the diaphragm spring 4 between the rings 11 and 12 of the seat 5 whereby the main or primary portion 4a of the spring 4 is moved away from the flywheel 6 so that the pressure plate can be retracted by the leaf springs 9 and releases the adjacent set of friction linings 7. In other words, the clutch disc 8 ceases to rotate with the flywheel 6. The arrangement is such that a state of equilibrium, or a state at least closely approximating equilibrium, exists between (a) that force which is generated upon the ring 11 during the application of disengaging force to the tips 4c of the prongs 4b and (b) the counterforce which is furnished by the sensor 13 and acts upon the ring 11. The term "disengaging force" is intended to denote that maximum force which must be applied to the tips 4c of the prongs 4b in order to disengage the friction clutch 1 against the bias of the sensor 13. Such disengaging force can also be applied to the prongs 4b by disengaging levers or by a pedal, not shown.

In accordance with a feature of the invention, the ring 12 between the diaphragm spring 4 and the bottom wall 2a of the cover 2 is biased by an adjusting or wear compensating device or unit 16 which is installed in the axial space between the cover and the diaphragm spring. The adjusting unit 16 ensures that, when the rings 11 and 12 of the seat 5 are shifted axially in a direction toward the pressure plate 3 and flywheel 6, no undesirable clearance will develop between the ring 12 and the cover 2. Otherwise stated, there will be no clearance between the ring 12 and the diaphragm spring 4. Such positioning of the ring 12 relative to the diaphragm spring 4 is desirable and advantageous because this ensures that there is no undesirable lost motion during actuation of the friction clutch 1 which, in turn, ensures optimum efficiency and superior operation of the friction clutch. Axial shifting of the rings 11 and 12 of the seat 5 toward the pressure plate 3 and flywheel 6 will take place as a result of wear upon the friction surfaces of the pressure plate 3 and flywheel 6 as well as (and particularly) due to wear upon the friction linings 7. However, the adjustment or compensation in accordance with the invention also takes place in response to wear upon the rings 11 and 12, these portions of the diaphragm spring 4 which are adjacent the rings 11, 12 (as seen in the direction of the axis X—X), those portions of the diaphragm spring 4 which engage the portion or portions 3a of the pressure plate 3, and the portion or portions 3a of the pressure plate. The exact mode of automatic operation of the adjusting unit 16 will be described in full detail with reference to the diagrams which are shown in FIGS. 8, 9, 10 and 11.

Figure 3:
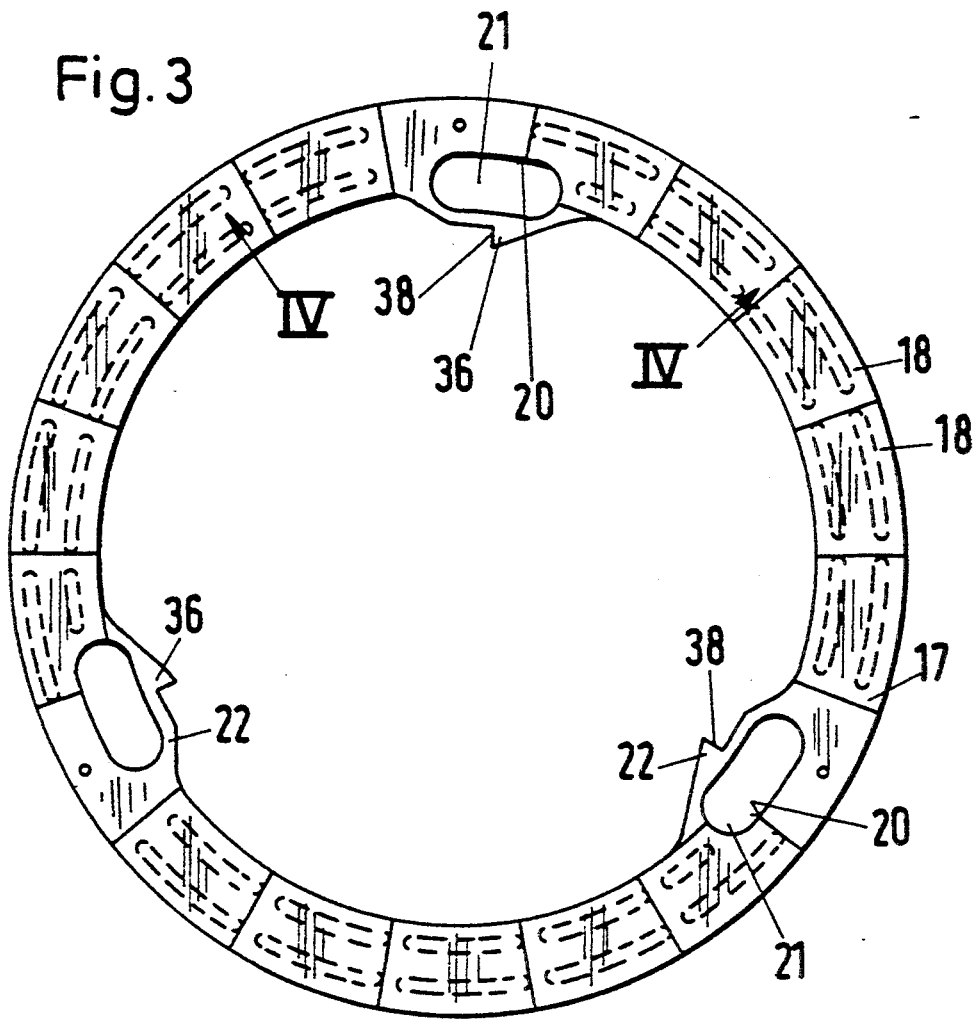
FIG. 3 is a plan view of a first annular adjusting or wear compensating member which is utilized in an adjusting or wear compensating unit or device of the friction clutch shown in FIGS. 1 and 2.
Figure 4:
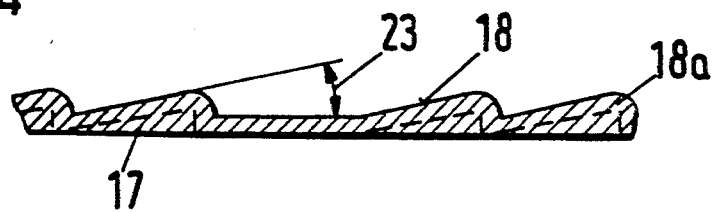
FIG. 4 is a fragmentary sectional view substantially as seen in the direction of arrows from the line IV—IV in FIG. 3.

The adjusting unit 16 comprises a spring-biased ring-shaped adjusting or wear compensating member 17 which is shown in FIGS. 3 and 4. This adjusting member is installed between the diaphragm spring 4 and the bottom wall 2a of the cover 2 and comprises a set of inclines or ramps 18. All of the ramps 18 are inclined in the same direction circumferentially of the member 17. When the member 17 is installed in the cover 2, its ramps 18 face the bottom wall 2a. That side of the member 17 which faces away from the bottom wall 2a is flat or substantially flat and is provided with a circumferentially extending groove 19 (FIG. 2) which receives a portion of the ring 12. In this manner, the ring 12 (which is centered by the shanks 15a of the rivets 15) centers the member 17 in the cover 2. The configuration of the groove 19 and/or of the adjacent portion of the member 17 can be such that the ring 12 is not only held against uncontrolled radial movements but is also held against axial movement relative to the member 17. For example, the configuration of the surface bounding the groove 19 can be such that the ring 12 can be received therein by snap action. Alternatively, the plane surface of the member 17 which faces away from the bottom wall 2a can be provided with spaced-apart projections or other configurations which enable the member 17 to clampingly or otherwise engage (e.g., by snap action) the adjacent portions of the ring 12 and to thus ensure that this ring is held against any uncontrolled radial and/or axial movements relative to the member 17.

If the temperature of the friction clutch 1 in the region of the adjusting unit 16 fluctuates within a wide range, it is advisable to provide for some compensatory movement between the ring 12 and the member 17 of the adjusting unit 16. For example, this can be achieved by making the ring 12 a split ring so that it can expand or contract in the circumferential direction of the member 17. It is also possible to assemble the ring 12 of two, three or more discrete arcuate sections, i.e., to provide two or more interruptions in such ring in order to even more fully compensate for eventual pronounced fluctuations of the temperature of the adjusting unit 16. This enables the ring 12 to conform its diameter to the varying diameter of the groove 19.

The member 17 which is shown in FIGS. 3 and 4 is made of a plastic material, for example, of a heat-resistant thermoplastic substance which can be reinforced by glass fibers or the like. This renders it possible to mass-produce the member 17 in an injection molding or other suitable machine. As already pointed out hereinbefore, the utilization of an adjusting member 17 which is made of a plastic material having a low specific weight brings about the advantage that the mass inertia weight is reduced which entails a reduction of sensitivity to fluctuations of pressure. It is also possible to make at least the portion 12 of the seat 5 from a plastic material. However, it is equally within the purview of the invention to make the member 17 of a metallic sheet material or of a sintered metal. Still further, it is within the scope of the invention to make the ring 12 of one piece with the member 17. This is possible regardless of whether the member 17 is made of a metallic or plastic material. Analogously, the ring 11 can be made of one piece with the sensor 13; all that is necessary is to provide the tongues 13c of the sensor 13 with suitable projections in the form of beads or the like which together constitute a composite or one-piece ring 11.

The rivets 15, and more particularly the shanks 15a of such rivets, preferably further constitute a means for centering the member 17 of the adjusting unit 16 in the cover 2 of the friction clutch 1. The rivets 15 are preferably equidistant from each other in the circumferential direction of the cover 2. The shanks 15a extend through suitable openings 21 which are provided in the member 17 and are bounded by surfaces 20 which are engaged by the shanks 15a to thus center the member 17 in the cover 2. The illustrated openings 21 are elongated slots having a substantially constant width (as measured in the radial direction) and extend circumferentially of the member 17. These openings 21 are closely adjacent the radially inner portion of the member 17. As can be seen in FIG. 3, the member 17 further comprises lobes 22 which are disposed radially inwardly of the respective openings 21 and bound the radially inner portions of the adjacent openings.

The member 17 which is shown in FIG. 3 comprises three openings 21 and a total of five ramps 18 between each pair of neighboring openings. The slopes (note the angle 23 in FIG. 4) of the ramps 18 are selected in such a way that the ramps enable the member 17 to compensate for wear upon the pressure plate 3, flywheel 6 and friction linings 7 during the entire useful life of the friction clutch 1. The same applies for the length of the openings 21 in the circumferential direction of the member 17. Such length is selected with a view to permit an angular adjustment of the member 17 relative to the bottom wall 2a of the cover 2 which is necessary for compensate for the aforediscussed wear upon the pressure plate 3, flywheel 6 and friction linings 7 as well as, if necessary, for wear upon the friction clutch itself and, e.g., for the wear upon the rings 11, 12, those portions of the diaphragm spring 4 which are disposed between the rings 11, 12, the portion or portions 3a of the pressure plate 3 and/or the diaphragm spring at the portion or portions 3a. The length of the openings 21 can be selected in such a way that the member 17 is free to perform an angular movement in the range of between 8° and 60°, preferably within a range of between 10° and 30°. In the embodiment which is illustrated in FIG. 3, the angular adjustability of the member 17 relative to the cover 2 is approximately 12°. Furthermore, the angle 23 (which is shown in FIG. 4 and denotes the slope of the ramps 18) is also in the range of 12°. This angle 23 is selected in such a way that, when the ramps 18 of the member 17 and the complementary inclines or ramps 24 of a second annular displacing member 25 (shown in FIGS. 5 and 6 and hereinafter called annulus) are in frictional engagement with each other, the member 17 and the annulus 25 cannot slip because the friction between the abutting surfaces of the ramps 18 and 24 is too pronounced. Depending on the nature of the material of the member 17 and annulus 25 and on the finish of the abutting surfaces of the ramps 18 and 24, the angle 23 can be in the range of between 5° and 20°.

The member 17 is stressed in the circumferential direction by a ring-shaped torsion spring 26 which is shown in FIGS. 1, 2, 7 and 7a. The bias of the spring 26 is selected in such a way that the member 17 is stressed in a direction which is necessary for adjustment in order to compensate for wear upon the pressure plate 3, flywheel 6 and friction linings 7. In other words, the spring 26 tends to bias the member 17 in a direction such that, as the ramps 18 slide along the complementary ramps 24 of the annulus 25, this results in axial displacement of the member 17 in a direction toward the pressure plate 3, i.e., axially of and away from the bottom wall 2a of the cover 2. It is clear that the illustrated torsion spring 26 constitutes but one form of means for biasing the member 17 in a direction to slide along the annulus 25 and to thereby advance axially toward the pressure plate 3. Referring to FIGS. 7 and 7a, this torsion spring comprises a relatively small number of convolutions 35 (for example, not more than two convolutions) and two legs 27 and 28. The leg 27 extends radially outwardly, and the leg 28 extends in part radially and in part axially (see FIG. 7a). The leg 27 is non-rotatably anchored in or is otherwise connected with the member 17, and the leg 28 is non-rotatably anchored in or is otherwise secured to the cover 2. The spring 26 is installed in stressed condition.

A presently preferred form of the displacing annulus 25 is shown in FIGS. 5 and 6. This annulus comprises the aforediscussed ramps 24 which are complementary to the ramps 18 of the member 17. The surfaces along which the ramps 18 abut the ramps 24 can be congruent surfaces. The angle 29 which is shown in FIG. 6 preferably matches the angle 23 which is shown in FIG. 4. As can be readily seen by comparing FIGS. 3 and 5, the distribution of ramps 24 on the annulus 25 is the same as, or at least similar to, that of the ramps 18 on the member 17. The annulus 25 is non-rotatably secured to the housing 2. To this end, the annulus 25 is provided with a plurality of holes 30 which can receive portions of the rivets 15 so that such rivets also serve as a means for non-rotatably coupling the annulus 25 to the bottom wall 2a of the cover 2. This can be seen in the upper portion of FIG. 2.

FIG. 2 further shows, by broken lines, that operating the means for biasing the member 17 in the circumferential direction of the cover 2 can comprise an additional torsion spring 26a which can be configurated in the same way as the torsion spring 26. Thus, one leg of the torsion spring 26a can be anchored in the member 17 and its other leg can be anchored in the cover 2. The torsion spring 26a is also installed in stressed condition so that it always tends to turn the member 17 relative to the cover 2.

An advantage of the utilization of operating means having two torsion springs 26, 26a is that their bias can increase under the action of centrifugal force when the friction clutch 1 is in use and its cover 2 rotates with the pressure plate 3 and flywheel 6. The flywheel 6 can receive torque from the output element of an engine in a motor vehicle. For example, the increased bias of the spring 26 in response to the action of centrifugal force can be compensated for by the torsion spring 26a. To this end, the springs 26 and 26a are convoluted in such a way that, at least when acted upon by centrifugal force, they generate and apply to the member 17 forces which act in opposite directions as seen in the circumferential direction of the member 17. The diameters of convolutions of the torsion spring 26a are larger than the diameters of convolutions 35 of the torsion spring 26. Reference may be had to FIG. 2. This enables the designer of the clutch to select the centrifugal forces acting upon the torsion springs 26 and 26a in such a way that the forces acting upon the member 17 in the circumferential direction are at least substantially balanced. Adequate balancing can be achieved by appropriate selection of the diameters of convolutions of the springs 26, 26a, by appropriate selection of the diameters of wires of which these springs are made and/or by appropriate selection of the number of their convolutions. FIG. 2 shows that the torsion spring 26 is located radially inwardly and the torsion spring 26a is located radially outwardly of the member 17. However, it is equally possible to install each of these springs radially inwardly or radially outwardly of the member 17.

FIG. 7 shows the torsion spring 26 in a plan view. When this spring is not under stress, its legs 27, 28 make an angle 31 which can be in the range of 40°–120°. The leg 27 will be moved (relative to the leg 28) to the position 32 when the friction linings 7 are new (i.e., prior to being subjected to any wear). The leg 27 assumes the position 33 of FIG. 7 when the linings 7 have undergone a maximum permissible amount of wear. The angle 34 of adjustment (between the positions 32 and 33 shown in FIG. 7) is approximately 12°. The spring 26 of FIG. 7 is designed in such a way that, when in unstressed condition, only a single convolution 35 extends between the legs 27 and 28. The remaining portion of the spring 26 (namely outside of the angle 31) has two convolutions 35 (FIG. 7a) which overlie each other as seen in the axial direction of the spring 26.

The spring 26a is similar to the spring 26 but, in the embodiment of FIGS. 1 and 2, has a larger diameter and is stressed in a different direction as concerns its bias upon the member 17. The force which the spring 26 applies to the member 17 is greater than the force of the spring 26a.

When the wear upon the component parts of the friction clutch 1 is minimal, i.e., when the clutch is yet to be put to use, the angular positions of the member 17 and annulus 25 relative to each other are such that the axially extending peaks 18a of the ramps 18 forming part of the member 17 extend close to or actually abut the axially extending peaks 24a of the ramps 24 on the annulus 25. In other words, the combined thickness of the member 17 and annulus 25 then assumes a minimum value, i.e., these parts occupy a minimum amount of space in the axial direction of the cover 2 between the bottom wall 2a and the diaphragm spring 4.

In the friction clutch 1 of FIGS. 1 and 2, the annulus 25 constitutes a separately produced part which is installed at the inner side of the bottom wall 2a of the cover 2. However, it is also possible to make the annulus 25 an integral part of the cover 2; for example, the lobes 24 can be stamped out of the bottom wall 2a to extend toward the member 17 of the adjusting unit 16. Such mode of making the annulus 25 (namely its lobes 24) is particularly advantageous if the cover 2 is made of a single piece of metallic sheet material.

The shoulders 38 on the pallets 36 of lobes 22 of the member 17 can be utilized to ensure proper angular positioning of the member 17 in the cover 2 during assembly of the friction clutch 1. The shoulders 38 can be engaged by a suitable turning or retaining tool which reacts against the cover 2. The tool is put to use during assembly of the friction clutch 1 and is removed from the friction clutch when the attachment of the cover to the flywheel 6 (by threaded fasteners 6a one of which is shown in FIG. 2) is completed. The adjusting unit 16 becomes operative as soon as the aforementioned tool is removed, i.e., as soon as the member 17 is free to turn relative to the cover 2 (if and when necessary) to compensate for wear upon the parts 3, 6 and/or 7. As shown in FIGS. 1 and 2, the bottom wall 2a of the cover 2 has circumferentially extending elongated slot-shaped windows 37 which enable the prongs or analogous extensions of the tool to advance toward and to engage the shoulders 38 on the pallets 36 of the lobes 22 of the member 17 during assembly of the friction clutch 1. The shoulders 38 can be replaced with other configurations (e.g., holes) in or on the member 17, as long as the tool can properly engage and hold the member 17 in requisite position during assembly of the friction clutch 1. The length of the windows 37 should at least suffice to ensure that the member 17 can be turned back through the maximum angle which is required to compensate for wear upon the pressure plate 3, flywheel 6 and/or friction linings 7. It is also possible to assemble the friction clutch 1 in a first step and to thereupon employ a tool which is to be used to turn the member 17 relative to the cover 2. The prongs of the tool are inserted through the windows 37 of the bottom wall 2a and engage the shoulders 38 on the pallets 36 of the lobes 22. The member 17 is then turned back in a direction to ensure that its ramps 18 cooperate with the ramps 24 of the annulus 25 in a sense to move the member 17 closer to the bottom wall 2a to a position from which the member 17 must turn in order to compensate for wear upon the parts 3, 6 and/or 7 in actual use of the friction clutch 1. The member 17 is then located at a minimum distance from the bottom wall 2a and is secured in such position, for example, with a clamp or a pin extending into registering openings of the cover 2 and member 17 to prevent angular displacement of the thus coupled parts 2, 17 relative to each other. The clamp or pin is removed from the openings when the attachment of the cover 2 to the flywheel 6 is completed, i.e., the unit 16 is then ready to perform its adjusting action if and when necessary, depending on the extent of wear upon the pressure plate 3, flywheel 6 and/or friction linings 7.

The dimensions of the windows 37 in the cover 2 are selected in such a way that the member 17 can be returned to its "retracted" position (at a minimal distance from the bottom wall 2a) if and when the cover 2 is to be detached from the flywheel 6. This involves disengagement of the clutch 1 (i.e., the application of axial force against the tips 4c of the prongs 4b in a direction toward the clutch disc 8) so that the diaphragm spring 4 no longer exerts an axially oriented force against the ring 11 of the seat 5 and the member 17 can be readily turned relative to the cover 2.

A further possibility of placing the friction clutch 1 into operative condition subsequent to installation of the friction clutch in a motor vehicle (so that the flywheel 6 can receive torque from the output element of the combustion engine) is to change the angular position of the adjusting member 17 (so that the member 17 is located at a minimum distance from the bottom wall 2a of the cover 2) subsequent to attachment of the flywheel 6 to the engine. To this end, the friction clutch 1 can be disengaged by an auxiliary tool so that the stress upon the adjusting member 17 is practically zero, and the adjusting member 17 is then moved (turned) to its proper initial or starting position at a maximum distance from the pressure plate 3. The friction clutch I is then engaged so that the retracted adjusting member 17 remains in the proper retracted position prior to its movement toward the pressure plate 3 in order to compensate for wear upon the friction linings 7 and, if necessary, upon one or more aforementioned additional parts including the diaphragm spring 4, the portion or portions 3a of the pressure plate 3 and the rings 11, 12 of the seat 5.

Figure 8:
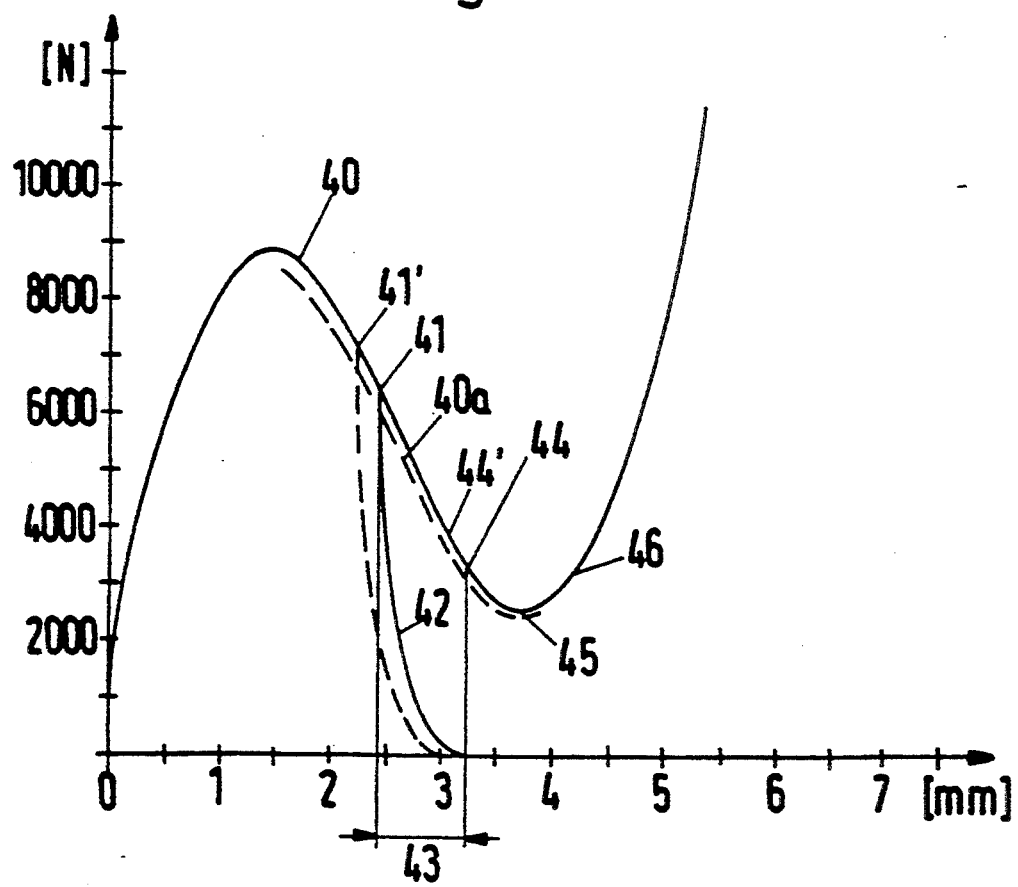
FIG. 8 is a diagram wherein the curves denote variations of the force generated by a diaphragm spring which is used to bias a pressure plate against a clutch disc in the friction clutch of FIGS. 1 and 2.

Referring to the diagram of FIG. 8, the sinusoidal curve 40 denotes the axially oriented force which develops in response to changes of conicity of the diaphragm spring 4 as a result of deformation between two abutments spaced apart from each other a distance corresponding to that of the seat 5 from the projecting portion or portions 3a of the pressure plate 3. The distance (in mm) between such abutments is measured along the abscissa, and the force (in nm) which is generated by the diaphragm spring 4 is measured along the ordinate of the coordinate system of FIG. 8. The (operating) point 41 of the curve 40 is indicative of the flattened condition of the diaphragm spring 4, namely the condition which is preferably selected as initial condition of the diaphragm spring when the friction clutch 1 is engaged, and denotes the force which is generated by the diaphragm spring 4 upon installation of the friction clutch 1 and while the clutch is engaged; at such time, the spring 4 exerts a maximum force upon the portion or portions 3a of the pressure plate 3 and the latter exerts a maximum force which is used to clamp the friction linings 7 of the clutch disc 8 between the friction surfaces of the pressure plate 3 and flywheel 6. The point 41 can be shifted along the curve 40 toward or away from the abscissa by changing the conicity, i.e., the setting, of the diaphragm spring 4 in assembled condition of the friction clutch 1.

The curve 42 denotes in FIG. 8 the axial spreading force which is applied by the resilient segments 10 between the two sets of friction linings 7. Such spreading force of the segments 10 opposes the force which the diaphragm spring 4 applies to the pressure plate 3. It is desirable and advantageous that the axial force which is required for the possible resilient deformation of the segments 10 at least match the bias of the diaphragm spring 4; it is also possible to select the mounting of the diaphragm spring 4 and the resiliency and bias of the segments 10 in such a way that the force which is denoted by the curve 42 exceeds the force which is denoted by the curve 40. The stressing of the resilient segments 10 decreases in response to disengagement of the friction clutch 1, and the extent to which the stressing decreases is denoted by the distance 43. This results in a corresponding axial shifting or deformation of the diaphragm spring 4 whereby the segments 10 assist the disengagement of the friction clutch. In other words, the required maximum disengaging force is less than that which would be necessary at the point 41 of the curve 40 in FIG. 8 if the resilient segments 10 were omitted, i.e., in the absence of means for biasing the friction linings 7. The point 44 on the curve 40 denotes the magnitude of the force of diaphragm spring 4 at the instant of disengagement of the friction clutch 1, i.e., the friction linings 7 are no longer engaged by the friction surfaces of the pressure plate 3 and flywheel 6 when the point 44 is exceeded. Due to the degressive characteristic curve of the diaphragm spring 4, the disengaging force which is to be applied at such time is much less than that corresponding to the force denoted by the point 41 of the curve 40. The disengaging force which must be applied in the friction clutch 1 decreases all the way to the minimum or lowest point 45 of the sinusoidal curve 40. From there on, the required disengaging force rises again and the extent of axial movement of the tips 4c of prongs 4b along their predetermined path can be selected in such a way that the magnitude of this force does not exceed that at the point 44 (i.e., the maximum disengaging force) and preferably remains therebelow. In other words, the force should not rise above that denoted by the point 46.

Figure 9:
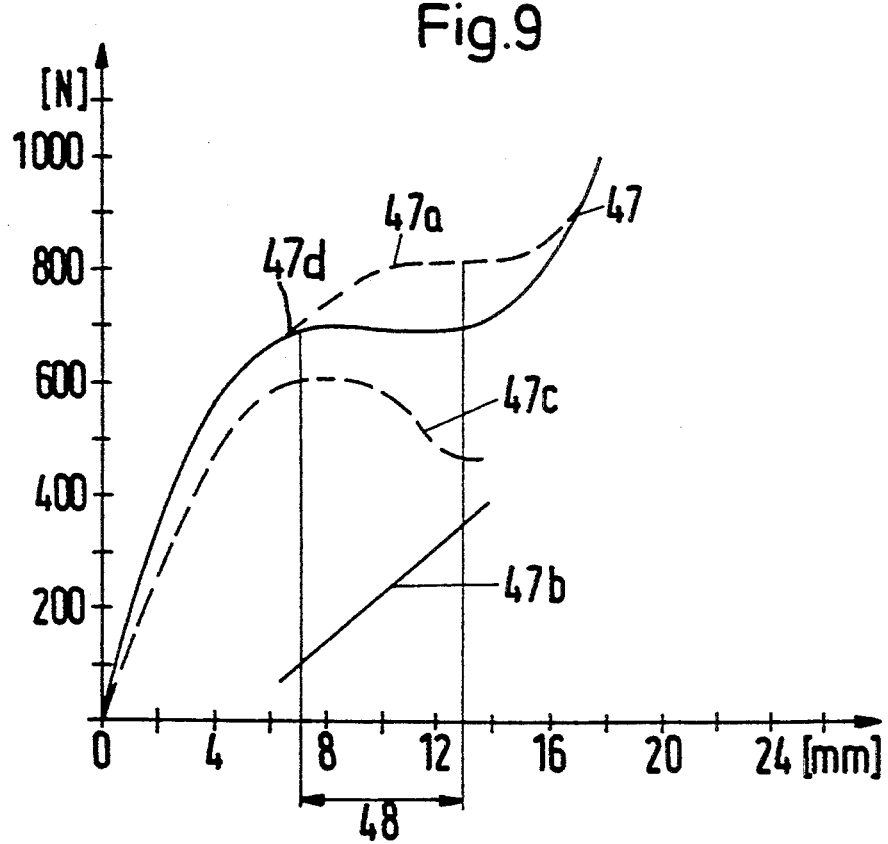
FIG. 9 is a diagram wherein the curves denote variations of certain characteristics of a resilient sensor in the friction clutch of FIGS. 1 and 2.

The magnitude of force which is generated by the sensor 13 is denoted by the curve 47 which is shown in FIG. 9. This curve actually denotes the force which is generated when the conicity of the sensor 13 is changed as a result of stressing. Such change in stressing of the sensor 13 takes place as a result of variations of the distance between two abutments whose radial spacing corresponds to that of the abutment 14 at the inner side of the cover 2 from the portion or ring 11 of the seat 5. The distance 48 covered by the sensor 13 is that during which the axial force generated by the sensor remains substantially constant. The magnitude of this force is selected in such a way that it at least approximates the magnitude of the clutch disengaging force as denoted by the point 44 on the curve 40 of FIG. 8. The supporting force to be furnished by the sensor 13 is less than that at the point 44 of the curve 40 by a value corresponding to the lever arm of the diaphragm spring 4. In most instances, such transmission ratio is between 1:3 and 1:5 but can also be less than 1:3 or greater than 1:5 for certain applications of the improved friction clutch.

The just mentioned transmission ratio of the diaphragm spring 4 denotes the ratio of radial distance of the seat 5 from the portion or portions 3a of the pressure plate 3 to the radial distance of the seat 5 from the tips 4c of the prongs 4b forming part of the diaphragm spring 4 and being depressible, for example, by a disengaging bearing of the friction clutch.

The mounting of the sensor 13 in the friction clutch 1 is selected in such a way that the sensor can perform an axial movement in the region of the seat 5, namely in a direction toward the friction linings 7, to an extent corresponding at least to the axial adjustment of the pressure plate 3 toward the flywheel 6 as a result of wear upon the friction surfaces of the parts 3, 6 and as a result of wear upon the friction linings 7. This ensures that the axially oriented supporting force for the seat 5 remains constant regardless of the wear upon the parts 3, 6 and 7. In other words, the substantially linear portion 48 of the curve 47 in FIG. 9 should have a length not less than that corresponding to the aforediscussed extent of wear and preferably exceeding the latter. This ensures that the adjusting unit 16 can also compensate, at least in part, for eventual tolerances during assembly of the friction clutch 1.

In order to ensure the establishment of a practically unchanged (i.e., predetermined) release point 44 for the friction linings 7 when the friction clutch 1 is disengaged, it is possible to employ torque varying means 10 known as a so-called twin-segment biasing means which is to operate between the two sets of friction linings 7. Such biasing means can comprise pairs of discrete parallel resilient segments which are disposed back-to-back. The segments which are disposed back-to-back can be subjected to a certain initial stress in the axial direction of the clutch disc 8. Prestressing of resilient segments between the friction linings 7 of the clutch disc 8 renders it possible to at least substantially compensate for so-called penetration or embedding losses which develop during the useful life of the friction clutch 1 as a result of penetration of the segments 10 into the adjacent friction linings 7. By properly limiting the extent of axial movability of the two sets of friction linings 7 relative to each other and by properly selecting the bias of the segments 10 between the two sets of friction linings, one can ensure that, at least during disengagement of the friction clutch 1, the pressure plate 3 covers a predetermined distance 43 in a direction away from the friction linings under the action of the resilient segments 10. In order to achieve such predetermined distance 43, it is possible to limit the extent of axial movement of the two sets of friction linings 7 in directions toward as well as away from each other, e.g., by the provision of suitable stops, i.e., in directions to stress the segments 10 as well as to enable these segments to dissipate energy. Suitable resilient means for use between the two sets of friction linings 7 are disclosed, for example, in commonly owned copending German patent application Serial No. P 42 06 880.0 the entire disclosure of which is incorporated herein by reference.

Figure 10:
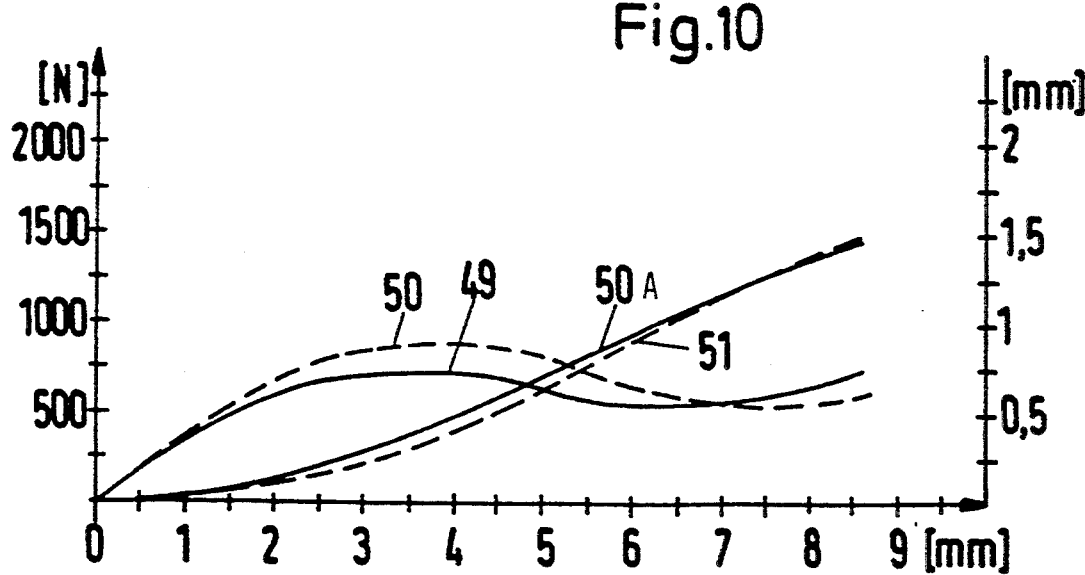
FIG. 10 is a diagram with curves denoting the forces to be applied in order to disengage the friction clutch of FIGS. 1 and 2.

The curve 49 which is shown in FIG. 10 denotes that force which is required to disengage the friction clutch 1 by a disengaging member acting upon the tips 4c of the prongs 4b in order to move the pressure plate 3 from the point 41 to the point 44 (FIG. 8). The curve 49 also indicates the path of movement of tips 4c forming part of the prongs 4b of the diaphragm spring 4.

In order to ensure an optimal operation of the friction clutch 1, i.e., in order to guarantee an automatic compensation for wear upon the friction linings 7, it is desirable—as considered during the actual progress of disengaging force (denoted by the curve 49 in FIG. 10)—to ensure that the sum of forces which are initially applied to the diaphragm spring 4 by the resilient segments 10 and by the sensor 13 exceed the force which the diaphragm spring 4 applies to the ring 11 of the seat 5. Furthermore, even after the pressure plate 3 is disengaged from the friction linings 7, the force which the sensor 13 continues to apply to the diaphragm spring 4 should exceed, or at least match, the required disengaging force which varies during disengagement of the friction clutch in accordance with the curve 49 of FIG. 10 and acts upon the diaphragm spring 4 in the region of the tips 4c of its prongs 4b. Furthermore, the force which the sensor 13 then applies to the ring 11 of the seat 5 should be selected in such a way that it prevents a turning of the adjusting member 17 which is biased by the torsion spring 26, i.e., the sensor 13 should prevent any axial shifting of the diaphragm spring 4 at least until close to the instant when the point 41 (corresponding to the initial position of the diaphragm spring) in the upwardly sloping portion of the curve 40 is exceeded.

The heretofore discussed mode of operation of the friction clutch 1 pertains primarily or exclusively to a predetermined mode of installing the diaphragm spring 4 and without taking into consideration the wear upon the friction linings 7. When a certain amount of wear has taken place (e.g., upon the friction linings 7), the position of the pressure plate 3 changes in that the pressure plate migrates toward the flywheel 6 whereby the conicity of the diaphragm spring 4 (and hence the bias of this spring upon the portion or portions 3a of the pressure plate) changes accordingly (because the tips 4c move in a direction to the right, as viewed in FIG. 2) while the friction clutch 1 remains in engaged condition. Such change of bias of the diaphragm spring 4 upon the pressure plate 3 entails that the point 41 of the curve 40 in the diagram of FIG. 8 migrates toward the point 41' and that the point 44 migrates toward the point 44'. This terminates the state of equilibrium between the diaphragm spring 4 and the sensor 13 at the ring 11 during disengagement of the friction clutch 1. Wear upon the friction linings 7 entails an increase in the magnitude of force which is applied by the diaphragm spring 4 to the sensor 13 and also causes a shifting of the progress of the disengaging force in a sense toward an increase of such force. The thus obtained progress of the disengaging force is denoted in FIG. 10 by the broken-line curve 50. Since the magnitude of the disengaging force increases, the axially oriented force of the sensor 13 upon the diaphragm spring 4 during disengagement of the friction clutch 1 is overcome so that the sensor 13 yields in the region of the seat 5 through an axial distance corresponding essentially to the extent of wear upon the friction linings 7. During such deformation stage of the sensor 13 (which can be said to constitute a means for monitoring the extent of wear upon the parts 3, 6 and/or 7), the diaphragm spring 4 bears against the portion or portions 3a of the pressure plate 3 whereby the conicity of the spring 4 changes together with the amount of energy which is stored therein. Thus, the energy which is stored by the diaphragm spring 4 also changes together with the force which the spring 4 exerts upon the ring 11, i.e., upon the sensor 13 and upon the pressure plate 3. As can be seen in FIG. 8, such change takes place in a sense to reduce the magnitude of the force which is applied by the diaphragm spring 4 to the pressure plate 3 and continues to take place until the magnitude of the axial force applied by the spring 4 to the sensor 13 at the ring 11 is at least substantially neutralized or balanced by the oppositely directed force which is exerted by the sensor 13. In other words, and referring again to the diagram of FIG. 8, the points 41' and 44' of the curve 40 then migrate toward the points 41 and 44, respectively. When the reestablishment of the state of equilibrium is completed, the pressure plate 3 is again ready to be disengaged from the adjacent friction linings 7. During the aforediscussed stage of adjustment in order to compensate for wear upon the friction linings 7, while the friction clutch 1 is being disengaged and the sensor 13 yields, the member 17 of the adjusting unit 16 is caused to turn about the axis X—X of the clutch disc 8 under the bias of the stressed torsion spring 26 which causes a displacement of the ring 12 to an extent corresponding to the extent of wear upon the friction linings 7; this, in turn, again eliminates any play at the seat 5. When the adjusting step is completed, the magnitude of the disengaging force again corresponds to that denoted by the curve 49 in the diagram of FIG. 10. The curves 50A and 51 in the diagram of FIG. 10 denote the axial displacement of the pressure plate 3 when the magnitude of the disengaging force varies in accordance with the curves 49 and 50, respectively.

Figure 11:
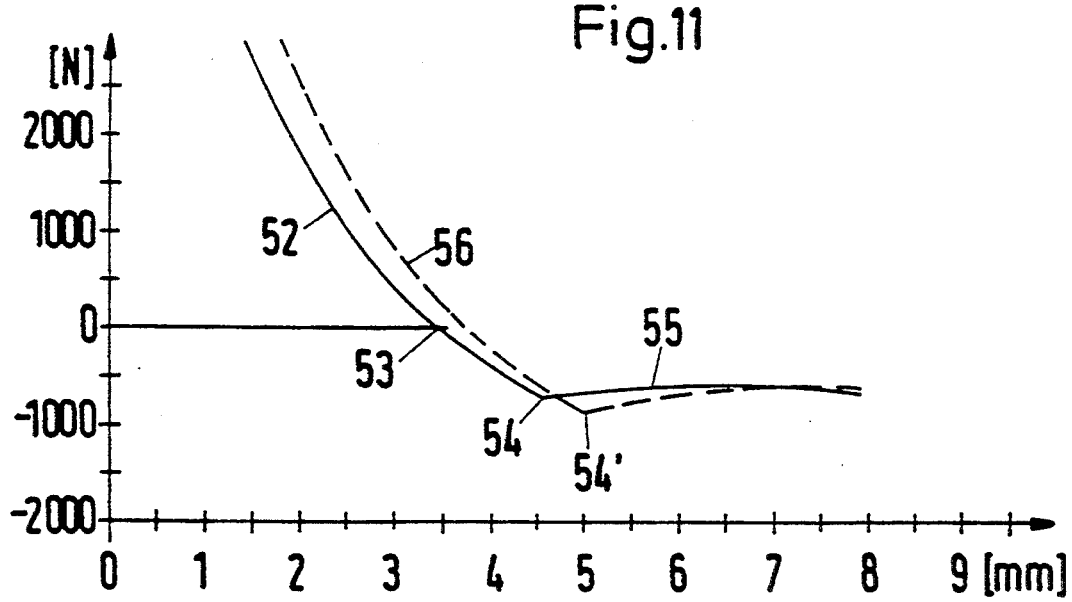
FIG. 11 is a diagram with curves denoting the reduction of forces acting upon the housing and upon the sensor of the friction clutch of FIGS. 1 and 2 during disengagement of the friction clutch.

The curves which are shown in the diagram of FIG. 11 denote the variations of forces acting upon the cover 2 and upon the sensor 13 during disengagement of the friction clutch 1. The extreme values are omitted. Starting with the engaged condition of FIG. 2, the cover 2 and the pressure plate 3 are first acted upon by a force whose magnitude corresponds to the operating or installation point 41 of the diaphragm spring 4 as denoted by the curve 40 of FIG. 8. As the disengagement of the friction clutch 1 progresses, the magnitude of the axial force exerted by the diaphragm spring 4 upon the cover 2 and the ring 12 decreases in accordance with the curve 52 of FIG. 11, namely to the point 53. When the point 53 is exceeded in the direction of disengagement of the friction clutch 1, a conventional frictional clutch (wherein the diaphragm spring is tiltable at a fixed location relative to the clutch cover, i.e., wherein the ring 11 is fixedly installed in the cover) would operate in such a way that the force exerted by the diaphragm spring 4 upon the cover 2 at the level of the seat 5 would change (reverse) its direction. However, the novel friction clutch 1 operates in such a way that the change in the axial direction of the force applied by the diaphragm spring 4 in the region of the seat 5 is taken up by the sensor 13. When the magnitude of the force which is being applied by the diaphragm spring 4 reaches the value denoted by the point 54 on the curve 52 of FIG. 11, the diaphragm spring 4 becomes disengaged from the portion or portions 3a of the pressure plate 3. The resilient segments 10 between the two sets of friction linings 7 generate an axially oriented force which assists the disengagement of the friction clutch 1, because it acts against the bias of the diaphragm spring 4, at least to the point 54 on the curve 52 of FIG. 11. The force which is generated by the resilient segments 10 decreases as the extent of displacement of tips 4c of prongs 4b toward the clutch disc 8 increases during disengagement of the friction clutch 1, i.e., in response to progressing axial displacement of the pressure plate 3 in a direction away from the flywheel 6. Thus, the curve 52 of FIG. 11 denotes a resultant of a disengaging force which is being applied to the tips 4c during disengagement of the friction clutch 1 on the one hand and of the axial force which is being applied by the resilient segments 10 of the clutch disc 8 upon the diaphragm spring 4 in the region of portion or portions 3a of the pressure plate 3. When the point 54 is exceeded in the direction of disengagement of the friction clutch 1, the axially oriented force which is being applied by the diaphragm spring 4 to the ring 11 is compensated for by the oppositely directed force which is being applied by the sensor 13. These two forces are balanced by the pressure plate 3 not later than when the axial pressure upon the friction linings 7 is terminated. As the disengaging operation progresses, the axially oriented force which is being applied by the sensor 13 at the seat 5 preferably exceeds, at least slightly, the prevailing disengaging force. The portion 55 of the curve 52 in the diaphragm of FIG. 11 indicates that, as the extent of movement to disengage the friction clutch 1 increases, the disengaging force (and the force applied by diaphragm spring 4 to the ring 11) decreases when compared with the disengaging force denoted by the point 54 of the curve 52. The broken-line curve 56 in the diagram of FIG. 11 denotes that condition of the friction clutch 1 when the friction linings 7 have undergone a certain amount of wear but prior to any compensation for such wear in the region of the seat 5. It will be noted that the change of orientation (conicity) of the diaphragm spring 4 due to wear upon the friction linings 7 results in an increase of the magnitude of forces which are being applied to the cover 2, to the ring 11 and/or to the sensor 13. This causes the point 54 to migrate in a direction toward 54' which, in turn, entails that in the course of the next-following disengaging operation the axial force which is being applied by the diaphragm spring 4 to the sensor 13 at the ring 11 exceeds the oppositely directed force of the sensor 13; this causes an adjustment in the aforedescribed manner as a result of axial relaxation of the sensor 13. Such adjustment entails that, due to adjustment which is effected by the torsion spring 26, i.e., as a result of turning of the annular member 17 and ensuing axial shifting of the ring 12, the point 54' migrates toward the point 54 which, in turn, reestablishes the desired state of equilibrium at the seat 5, namely between the diaphragm spring 4 and the sensor 13.

In actual practice (i.e., when the friction clutch 1 is in use), adjustments by the unit 16 are effected continuously or nearly continuously (i.e., by minute steps). The distances between the various points on the curves of FIGS. 8 to 11 are greatly exaggerated for the sake of clarity.

It is very likely that certain changes of various functional parameters and/or operating points will take place during the useful life of the friction clutch 1. For example, improper actuation of the friction clutch 1 can result in overheating of the resilient segments 10 in the clutch disc 8 which can cause a reduction of the resiliency of these segments, i.e., a reduction of the extent of axial movability of the parts 10. Nevertheless, it is possible to ensure reliable operation of the friction clutch 1 by appropriate selection of the characteristic curve 40 of the diaphragm spring 4 and a corresponding conformance of the curve 47 denoting the displacement-to-force relationship of the sensor 13. A reduction of axial movability of the segments 10 would merely entail that the conicity of the diaphragm spring 4 in the friction clutch 1 of FIGS. 1 and 2 would change in a sense to reduce the magnitude of the force which the spring 4 exerts upon the portion or portions 3a of the pressure plate 3. This can be seen in the diagram of FIG. 8. Furthermore, this would bring about a corresponding change of axial deformation of the sensor 13 and a corresponding axial displacement of the ring 11.

In accordance with a further feature of the invention, it is possible to construct the improved friction clutch in such a way that the resultant of forces acting upon the diaphragm spring 4 increases in response to increasing wear upon the friction linings 7. Such increase can be limited to a certain stage or portion of the maximum permissible displacement due to wear upon the friction linings 7. As mentioned above, the wear upon the friction linings is normally more pronounced than the wear upon the flywheel 6 and upon the pressure plate 3; therefore, the preceding and the next-following passages of this description refer primarily or exclusively to wear upon the friction linings. The increase of the magnitude of forces acting upon the diaphragm spring 4 can take place as a result of appropriate design of the sensor 13. FIG. 9 shows by broken lines, as at 47a, the characteristic curve denoting a thus modified sensor 13 within the range 48. If the magnitude of forces acting upon the diaphragm spring 4 increases in response to progressing wear upon the friction linings 7, one can at least partially compensate for a reduction of the force which the spring 4 applies to the pressure plate 3 due to a reduction of resiliency of the segments 10, e.g., as a result of penetration or embedding of these segments into the adjacent friction linings 7. It is particularly advantageous if the force for the diaphragm spring 4 increases proportionally with (i.e., at the same rate or nearly at the same rate as) the setting or reduction of bias of the segments 10, for example, due to the aforediscussed embedding into the adjacent friction linings 7. In other words, as the thickness of the clutch disc 8 in the region of the friction linings 7 decreases (i.e., as the distance between the two sets of friction linings decreases due to the reduced bias of the segments 10 as a result of penetration into the friction linings and/or due to wear upon the friction linings), the magnitude of forces acting upon the diaphragm spring 4 increases accordingly. It is of particular advantage if the magnitude of such forces increases in such a way that the increase is more pronounced during a first stage and less pronounced during a next-following second stage. These two stages are within the distance 48 as measured along the abscissa of the coordinate system which is shown in FIG. 9. The just outlined design is desirable and advantageous because the major part of penetration of segments 10 into the adjacent friction linings 7 takes place mainly during a relatively short period of the full useful life of the friction clutch; thereafter, the positions of the segments 10 relative to the adjacent friction linings 7 are more or less stabilized. Thus, once a certain penetration has taken place, this variable parameter or factor can be disregarded because it no longer affects the operation of the adjusting unit 16. The change of magnitude of the force acting upon the diaphragm spring 4 can also take place at least during a certain stage of wear upon the friction linings 7.

The preceding description of operation of the adjusting unit 16 to compensate for wear upon the friction linings 7 did not take into consideration the axially oriented forces which are or which can be generated by the leaf springs 9 serving to axially movably but non-rotatably couple the pressure plate 3 to the flywheel 6 and cover 2. If the leaf springs 9 are installed in stressed condition so that they tend to move the pressure plate 3 axially and away from the adjacent friction linings 7, i.e., in a sense to bias the portion or portions 3a of the pressure plate 3 against the diaphragm spring 4, the leaf springs 9 are in a condition to assist the disengagement of the friction clutch 1. Thus, the axially oriented force which is applied by the leaf springs 9 is superimposed upon the forces which are being applied by the sensor 13 and by the diaphragm spring 4 as well as upon the disengaging force which is being applied (e.g., by a suitable disengaging bearing) against the tips 4c of the prongs 4b. Such function of the leaf springs 9 was not considered in the preceding description of the diagrams of FIGS. 8 to 11. The overall force which is being applied to the diaphragm spring 4 in disengaged condition of the friction clutch 1 to cause the spring 4 to bear upon the ring 12 of the seat 5 is the sum of forces which are generated primarily by the leaf springs 9, sensor 13 and the applied disengaging force acting upon the tips 4c of prongs 4b forming part of the spring 4.

The leaf springs 9 can be installed between the cover 2 and the pressure plate 3 in such a way that their axially oriented force acting upon the diaphragm spring 4 increases in response to progressing wear upon the friction linings 7. For example, the magnitude of axial force exerted by the leaf springs 9 upon the diaphragm spring 4 in response to increasing wear upon the friction linings 7 can increase in accordance with a curve 47b which is shown in the diagram of FIG. 9 and denotes the variations of such force upon the spring 4 within the distance 48. FIG. 9 further shows that, as the deformation of the sensor 13 increases, the restoring force of the leaf springs 9 upon the pressure plate 3 (this force is also applied to the diaphragm spring 4) also increases. By totalizing the forces denoted by the curve 47b and the characteristic curve of the diaphragm spring, one arrives at a resultant force which acts upon the spring 4 in the axial direction in a sense to bias this spring against the ring 12 of the seat 5. In order to obtain a variation of forces as denoted by the curve 47a of FIG. 9 (there is an initial increase of force, as at 47d, prior to transition into a substantially constant range of forces within the distance 48), it is desirable to design the sensor 13 in such a way that its characteristic curve corresponds to that shown at 47c in FIG. 9. By summarizing the forces denoted by the curves 47b and 47c in the diagram of FIG. 9, one arrives at a sum of forces denoted by the curve 47a. Thus, the magnitude of the force to be applied by the sensor 13 can be reduced by the simple expedient of stressing the leaf springs 9. Furthermore, by properly designing and mounting the leaf springs 9, it is possible to reduce (at least in part) the bias of the resilient segments 10 and/or (at least in part) the extent of penetration of segments 10 into the adjacent friction linings 7. Thus, one can ensure that the diaphragm spring 4 maintains a substantially unchanged operating point or the same operating range, i.e., the bias of the spring 4 upon the pressure plate 3 remains at least substantially unchanged during the entire useful life of the friction clutch 1. It is further necessary or desirable to take into consideration (during designing of the improved friction clutch and particularly in connection with the design of the sensor 13 and leaf springs 9) the resultant axial forces which are generated by the torsion springs 26, 26a and act upon the member 17 of the adjusting unit 16 in a sense to oppose the supporting force of the sensor 13 and/or the bias of the leaf springs 9.

If the friction clutch of the present invention is designed to employ prestressed leaf springs 9, it is further necessary or advisable to take into consideration that the prestressing of the springs 9 influences the axial force which the pressure plate 3 applies to the adjacent friction linings 7. Thus, if the leaf springs 9 are prestressed in a sense to urge the pressure plate 3 toward the diaphragm spring 4, the force which is applied by the diaphragm spring 4 is reduced by the extent of prestressing of the leaf springs 9. Consequently, the friction clutch then operates in such a way that the resultant axial force acting upon the pressure plate 3 and hence upon the adjacent friction linings 7 includes the force of the spring 4 and the force resulting from prestressing of the leaf springs 9. If one assumes that the curve 40 in the diagram of FIG. 8 denotes the resultant of the forces due to bias of the spring 4 plus the force attributable to prestressing of the leaf springs 9 in unused condition of the friction clutch, a reduction of the distance of the pressure plate 3 from the flywheel 6 due to wear upon the friction linings 7 would result in a shifting of the resulting forces in a sense toward a reduction of forces. FIG. 8 shows a broken-line curve 40a which corresponds, for example, to total wear upon the friction linings 7 in the range of 1.5 mm. Such wear can develop during the useful life of the friction clutch 1, and a shifting from the curve 40 toward the curve 40a results in a reduction of axial force which is being applied by the diaphragm spring 4 to the sensor 13 during disengagement of the friction clutch; such reduction of the axial force is attributable to the fact that, as the wear upon the friction linings 7 progresses, the moment which is being applied by the leaf springs 9 to the spring 4 and acts in the opposite direction also increases. Such moment develops due to the existence of a radial clearance between the seat 5 and the diameter of the annulus defined by the portion or portions 3a of the pressure plate 3, i.e., at the locus of engagement between the pressure plate and the spring 4.

An important advantage of the improved friction clutch 1 is that the ring 12 of the seat 5 is biased against the respective side of the diaphragm spring 4 by a supporting force (furnished by the sensor 13) in such a way that it is not necessary to provide anything more but a form-locking connection for the diaphragm spring, i.e., the latter is supported against the clutch disengaging force solely by the sensor which bears against the ring 12 to maintain the latter in contact with the diaphragm spring. The diaphragm spring 4 has a degressive characteristic curve within its operating range and is installed in such a way that the supporting force furnished by the sensor 13 and the bias of the spring 4 are related to each other in a special way. Thus, the relationship is such that, in contemplated built-in condition of the diaphragm spring, in the absence of changes of conicity of the diaphragm spring due to wear, and within the disengagement range of the diaphragm spring, the supporting force is greater than the bias which is applied by the diaphragm spring and opposes the supporting force of the sensor whereas, when the conicity of the spring 4 changes as a result of wear, the supporting force is smaller than the bias which is applied by the diaphragm spring to oppose the supporting force within portions of the path of disengagement of the diaphragm spring.

Though the friction clutch 1 comprises a sensor which consists of a single resilient element 13, it is equally within the purview of the invention to employ a sensor which comprises two or more resilient elements in the form of diaphragm springs, coil springs or others. As used herein, the term "supporting force" is intended to denote the sum of all forces which act upon the diaphragm spring 4. In the embodiment of FIGS. 1 to 7a, such sum of forces includes that furnished by the sensor 13, that furnished by the leaf springs 9 and that furnished by the resilient segments 10 of the clutch disc 8 to the extent that these forces act upon the diaphragm spring 4 to urge it against the ring 12 of the seat 5. It is presently preferred to employ a sensor including or consisting of a spring (13) which is designed to change its shape as a result of wear-induced adjustment of the diaphragm spring 4 and/or the ring 12 of the seat 5. The illustrated sensor 13 is a diaphragm spring; however, and as will be described in greater detail hereinafter, it is also possible to employ one or more leaf springs, for example, to design and mount the leaf springs 9 in such a way that they perform the function of non-rotatably but axially movably connecting the pressure plate 3 to the cover 2 as well as the function of the sensor 13. The illustrated sensor 13 is designed to directly engage the diaphragm spring 4 and, as shown, such engagement can take place at the same radial distance from the axis X—X as the engagement between the diaphragm spring 4 and the ring 12.

FIG. 2 shows one presently preferred mode of installing the compensating device 16, namely between the cover 2 and the diaphragm spring 4. Furthermore, the friction clutch 1 embodies a presently preferred form of the compensating device 16, namely a device which employs at least two sets of cooperating sloping surfaces, namely those provided on the ramps 18 and 24.

An important advantage of the improved friction clutch is that the conicity (i.e., stressing) of the diaphragm spring 4 remains substantially unchanged during the entire useful life of the friction clutch when the latter is engaged. This, in turn, ensures practically unchanged biasing of the pressure plate 3 in a direction toward the adjacent set of friction linings 7, i.e., the clamping action of the plates 3 and 6 upon the clutch disc 8 (in engaged condition of the friction clutch) remains practically unchanged as long as the friction clutch is in a condition for use. The constancy of the aforementioned clamping action upon the clutch disc 8 is established and maintained regardless of the extent of wear upon one or more parts of the friction clutch 1, primarily upon the friction linings 7 but preferably also upon the diaphragm spring 4, pressure plate 3 and the rings 11, 12 of the seat 5.

Another important advantage of the improved friction clutch 1 is that the mass of the compensating device 16 is not added to the mass of the diaphragm spring 4. Moreover, the device 16 is installed in a part of the friction clutch wherein it is shielded against the influence of wear upon the plates 3, 6 and is also remote from the primary source of heat, namely the friction surfaces of the pressure plate 3 and flywheel 6.

The provision of a seat 5 with two portions (here shown as rings 11, 12) which flank the diaphragm spring 4 and enable the diaphragm spring to become tilted also contributes to the effectiveness of the compensating device 16. The sensor 13 applies a force against that ring (11) of the seat 5 which is disposed between the diaphragm spring 4 and the pressure plate 3. The bias of the spring 4 upon the ring 11 (i.e., upon that ring which is being acted upon by the sensor 13) increases in response to progressing wear upon the friction linings 7 when the friction clutch 1 is being disengaged so that such bias exceeds the force of the sensor 13. The characteristic curve of the diaphragm spring 4 is such that, proceeding from the position of initial installation in the friction clutch 1 and taking into consideration the direction of relaxation as a result of wear upon the friction linings 7, the bias which is then applied by the diaphragm spring (and hence the required disengaging force) increases during a first stage of disengagement, and the bias required to be applied by the spring 4 thereupon decreases when the configuration (conicity) of the diaphragm spring increases beyond that during initial installation (no wear upon the friction linings). Such mounting and such selection of the characteristic curve of the diaphragm spring 4 ensure repeated establishment of a state of equilibrium between the bias of the spring 4 during disengagement of the friction clutch and the force which is applied by the sensor 13 to act upon the same part (seat 5) as the bias of the spring 4 while the wear upon the friction linings 7 progresses. The reason is that, when the supporting force which is being applied by the sensor 13 is exceeded by the bias of the spring 4, the sensor 13 is moved away from the ring 12 and the device 16 is free to compensate for wear upon the friction linings 7. Such compensation takes place under the action of the operating means (springs 26, 26a). The compensation is terminated automatically when the force which is being applied by the sensor 13 prevents further axial displacement of the seat portion 12 in a direction toward the pressure plate 3.

As already mentioned above, the diaphragm spring 4 is preferably installed in the friction clutch 1 in such a way that it exhibits a decreasing characteristic, i.e., that its bias decreases at least during a portion of but preferably during the entire disengagement range. The mounting of the diaphragm spring 4 can be such that, when the friction clutch 1 is disengaged, the bias of the diaphragm spring reaches or moves beyond the lowest point of the substantially sinusoidal curve denoting the force-to-displacement ratio.

The sensor 13 is preferably designed to apply a substantially constant force, at least within the contemplated range of compensation for wear upon the friction linings 7. A diaphragm spring has been found to constitute a highly satisfactory sensor in the friction clutch of the present invention; such friction clutch is installed in stressed condition.

The diaphragm spring 4 acts as a two-armed lever because the radially outer part of its main portion 4a acts upon the portion or portions 3a of the pressure plate 3 and the radially inner part of its main portion 4a is disposed between the rings 11, 12 of the seat 5. Thus, the diameter of the location of mounting the diaphragm spring 4 in the cover 2 is disposed radially inwardly of the diameter of the locus of engagement between the diaphragm spring and the pressure plate. The radially innermost portion (prongs 4b) of the diaphragm spring 4 forms part of actuating means of the mechanism which is used to disengage the friction clutch 1. However, it is also possible to provide clutch disengaging means with levers other than the prongs 4b.

The friction clutch 1 is designed in such a way that it permits automatic axial movements of the rings 11, 12 toward the pressure plate 3 in order to compensate for wear upon the friction linings 7 but is automatically blocked against axial movement in the opposite direction, i.e., toward the bottom wall 2a of the cover 2. This ensures that the diaphragm spring 4 is held between the rings 11 and 12 without any play.

The annular adjusting member 17 of the compensating device 16 is biased by the diaphragm spring 4 in the direction of the axis X—X at least in the engaged condition of the friction clutch 1. The annular member 7 is caused to turn when the wear upon the friction linings 7 warrants compensation by the device 16, and such angular displacement results in axial shifting of the ring 12 (and hence of the adjacent portion of the diaphragm spring 4 and of the ring 11) toward the pressure plate 3.

Such adjustment takes place during disengagement of the friction clutch 1.

It is further within the purview of the invention to replace the illustrated ramps 18 and/or 24 with otherwise configured ramps. For example, the abutting surfaces of the ramps on the member 17 and/or of the ramps 24 on the annulus 25 can have a convex or cylindrical outline. The illustrated plane surfaces are preferred at this time because such surfaces of the ramps 18 cooperate with similar surfaces of the ramps 24 to establish a self-locking action when the two sets of ramps are biased against each other in the axial direction of the cover 2.

At least a portion of the compensating device 16, particularly the annular member 17) is preferably made of a suitable plastic material, preferably a thermoplastic substance (such as polyamide). An advantage of plastic parts is that they can be mass produced (e.g., injection molded) at a low cost. Furthermore, this contributes to a reduction of overall weight and mass of the friction clutch. Thermoplastic parts can be used because the entire compensating device 16 is or can be installed at a certain distance from the friction linings 7, i.e., from that portion of the friction clutch which generates maximum amounts of heat. Still further, lightweight thermoplastic parts contribute to a reduction of inertia of the compensating device 16 which, in turn, enhances the accuracy of adjustments.

The compensating device 16 is designed in such a way that it acts as a freewheel in the direction of disengagement of the friction clutch 1 but is self-locking in a direction counter to the direction of disengagement. This is achieved by the provision of the aforediscussed ramps 18 and 24 which cooperate to prevent any movements of the annular member 17 in the direction of the axis X—X back toward the bottom wall 2a of the cover 2. Such results can be achieved by appropriate selection of the angles 23 and 29; these angles are normally between 4 and 20 degrees, preferably between 5 and 12 degrees. Self-locking action can be achieved by frictional engagement between the ramps 18 of the set of ramps on the annular member 17 and the set of ramps 24 on the annulus 25. The self-locking action can also be achieved in a number of other ways. For example, a form-locking connection in a direction to prevent the member 17 from moving back toward the bottom wall 2a can be obtained by making the ramps 18 or 24 of a relatively soft material and providing the ramps of the other set with serrations or other suitable protuberances or projections capable of penetrating into the softer material of the one set of ramps. Alternatively, the ramps of each of the two sets can be suitably profiled to ensure that the device 16 acts as a freewheel in a direction to move the member 17 axially of and away from the bottom wall 2a but establishes a self-locking action against any movement of the member 17 back toward the bottom wall 2a. An advantage of the just outlined undertakings is that the compensating device 16 need not be provided with any additional means for the sole purpose of permitting axial adjustment of the member 17 and rings 11, 12 in a direction away from but of preventing axial movement of the member 17 toward the bottom wall 2a.

An advantage of the operating means (spring 26) which is used in the friction clutch 1 is that such operating means does not adversely influence the operation of other resilient means including the diaphragm spring 4, the sensor 13, the leaf springs 9 and the resilient segments 10. Even under the most adverse circumstances, the influence of the operating means 26 upon the springs 4, 13, 9 and 10 is negligible.

The ramps 18 and/or 24 can be replaced with otherwise configured parts, for example, by wedges, spheres or rollers which are movable in the radial and/or axial direction of the friction clutch in order to effect the required adjustments so as to compensate for wear.

Resilient segments 10 (such as those disclosed in the published German patent application Serial No. 36 31 863) constitute a preferred but optional feature of the clutch disc 8. As already discussed hereinabove, these resilient segments can assist in disengagement of the friction clutch 1 because, when the friction clutch is engaged, the segments 10 are stressed and apply to the pressure plate 3 a reaction force which opposes the bias of the diaphragm spring 4. During disengagement of the friction clutch, the pressure plate 3 moves axially and away from the flywheel 6, and such axial movement of the pressure plate is assisted by the stressed resilient segments 10. The bias of the diaphragm spring 4 decreases rather abruptly during disengagement of the friction clutch; this results in a pronounced reduction of bias of the spring 4 upon the pressure plate 3 which, in turn, entails a reduction of bias of the segments 10. The effective force which is required to disengage the friction clutch 1 is the difference between the bias of the segments 10 and the bias of the diaphragm spring 4. When the segments 10 are no longer stressed, i.e., when the plates 3, 6 no longer clamp the friction linings 7 of the clutch disc 8, the force which is required for further disengagement of the friction clutch is furnished primarily by the diaphragm spring 4. The characteristics of the spring 4 and of the segments 10 can be related to each other in such a way that, when the plates 3 and 6 release the friction linings 7, a relatively small force is necessary to deform the diaphragm spring. The arrangement may be such that, under extreme circumstances, the selected relationship of the two characteristic curves renders it possible to disengage the friction clutch without the application of any force for deformation of the spring 4 and that, once the plates 3 and 6 have released the friction linings 7, the force with which the diaphragm spring opposes further disengagement of the friction clutch is much less than the bias of the spring 4 upon the pressure plate 3 in engaged condition of the friction clutch. It is also possible to select the characteristic curves of the diaphragm spring 4 and resilient segments 10 in such a way that, when the plates 3, 6 release the friction linings 7, a minimal force or no force at all is required to act upon the diaphragm spring in order to complete the disengagement of the friction clutch. Friction clutches of the just outlined character can be designed to require actuating forces in the range of 0–200 nm.

In accordance with a further advantageous embodiment of the invention, the friction clutch can be designed in such a way that, at or close to the instant of disengagement of the pressure plate 3 from the clutch disc 8, the axial force which is being applied by the diaphragm spring 4 is zero or close to zero so that the bias of the diaphragm spring during further disengagement of the friction clutch undergoes a transition from positive to negative. This means that, when the friction clutch is fully disengaged, such disengagement persists until the operator of the vehicle wherein the friction clutch is put to use decides to apply an external force in a direction to reengage the friction clutch.

Figure 12:
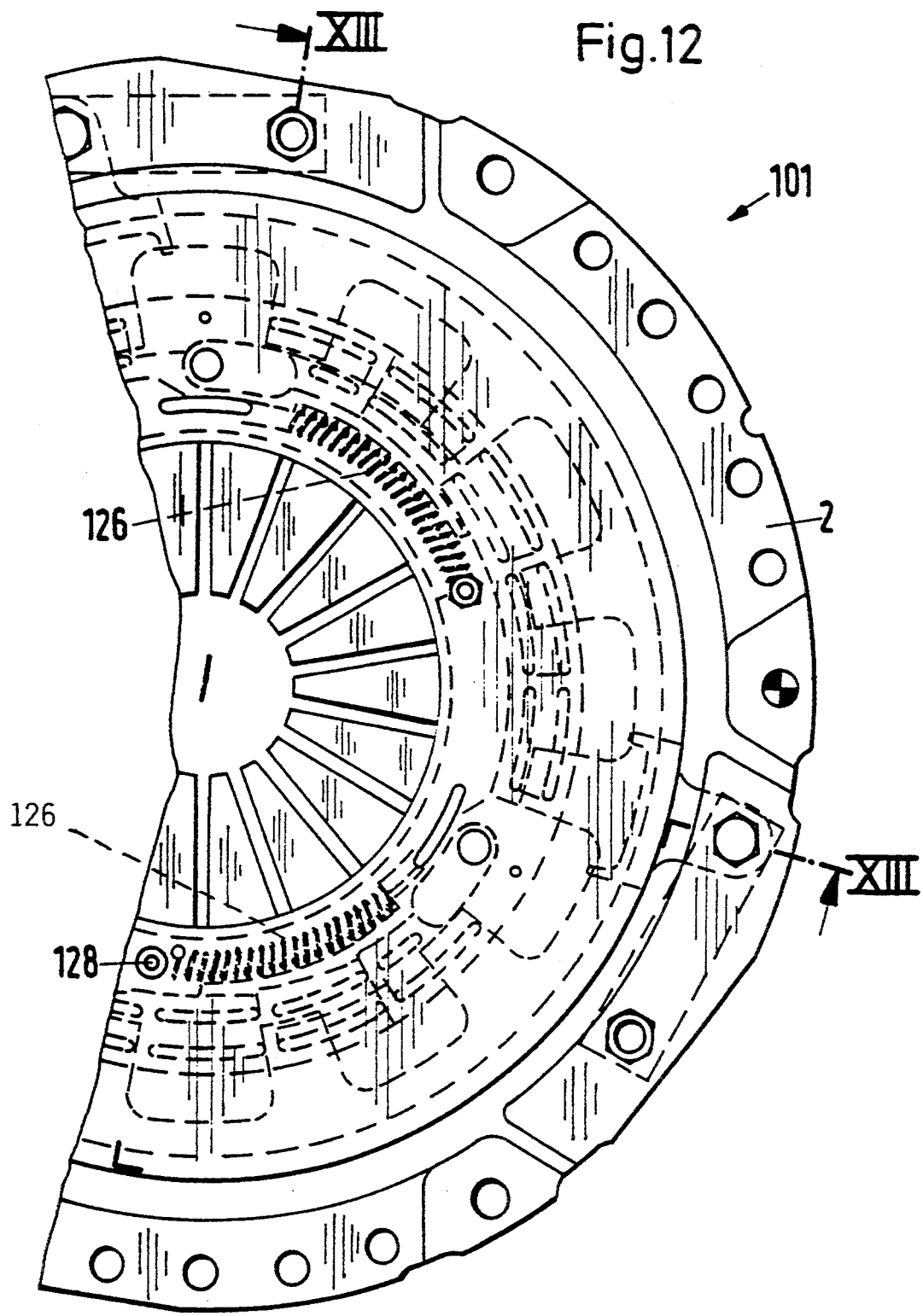
FIG. 12 is a fragmentary elevational view as seen from the right-hand side of FIG. 13 and shows a second friction clutch.
Figure 13:
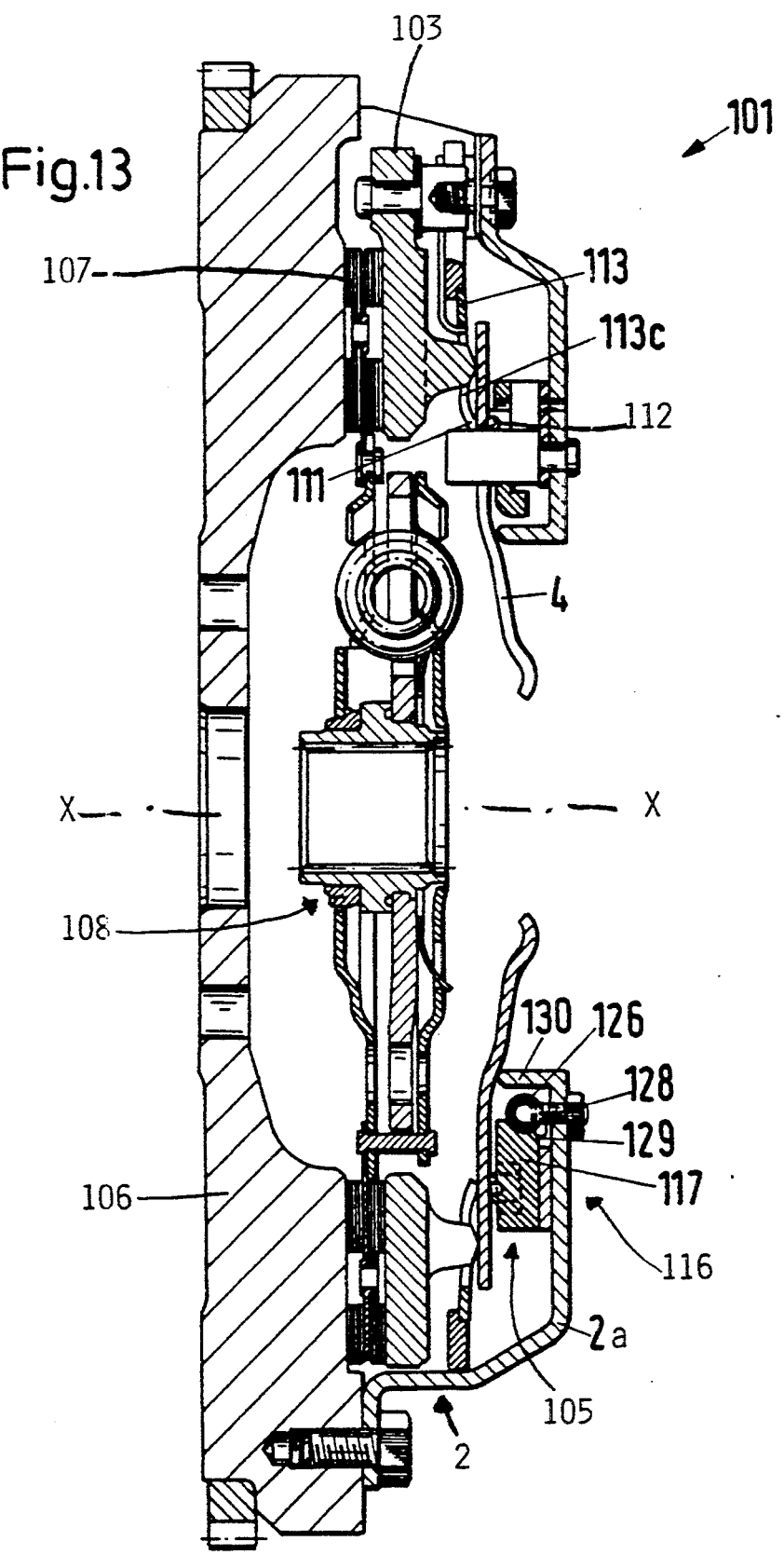
FIG. 13 is a sectional view substantially as seen in the direction of arrows from the line XIII—XIII in FIG. 12.

FIGS. 12 and 13 illustrate certain details of a modified torque transmitting friction clutch 101. One of the differences between the friction clutches 1 and 101 is that the latter employs an operating means including three coil springs 126 (two shown in FIG. 12) which replace the torsion springs 26, 26a in the friction clutch 1 and serve to bias the annular member 117 of the compensating device or adjusting unit 116 for the bias of the diaphragm spring 4. As concerns its function, the member 117 is an equivalent of the member 17, i.e., it can cooperate with an annulus corresponding to the annulus 25 of FIGS. 5 and 6 to move the portion 111 of the seat 105 in a direction to the right (as viewed in FIG. 13) to an extent which is necessary to compensate for wear upon the friction linings 107 of the clutch plate or disc 108.

Figure 14:
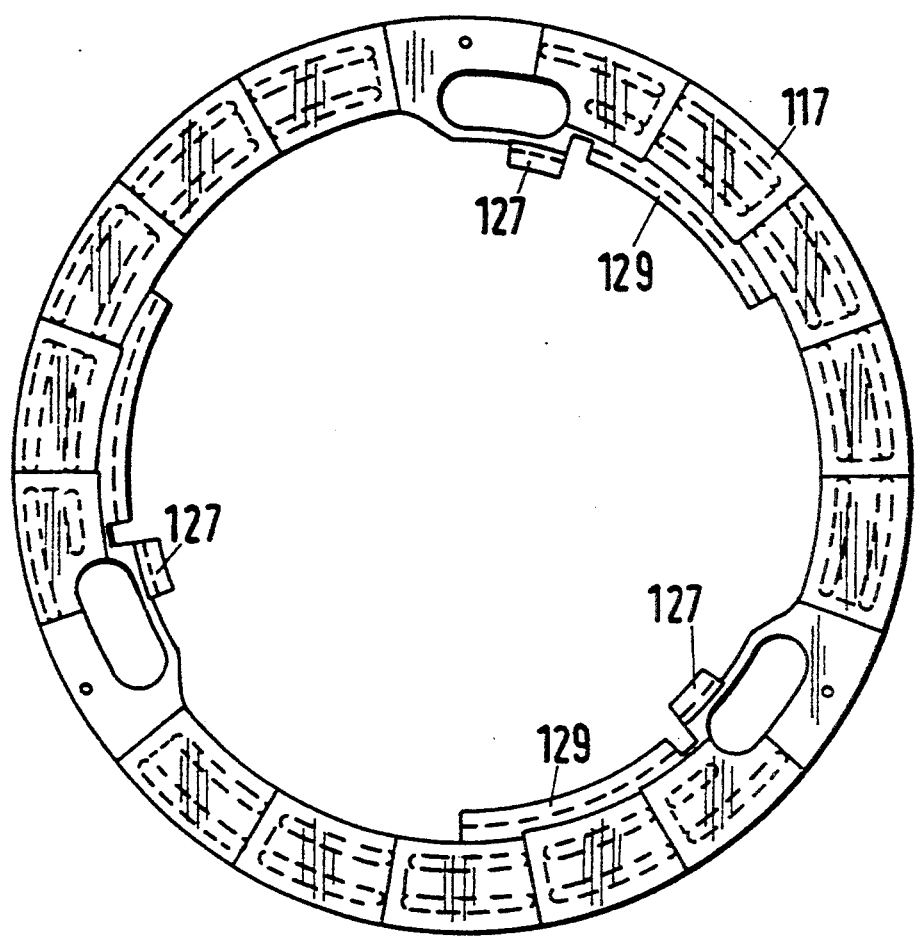
FIG. 14 is a plan view of an annular adjusting or wear compensating member which is utilized in an adjusting or wear compensating device or unit forming part of the second friction clutch.

The friction clutch 101 employs three coil springs 126 which are equidistant from each other in the circumferential direction of the housing or cover 2 and are installed in stressed condition to bias the member 117 relative to the bottom wall 2a of the cover. As can be seen in FIG. 14, the inner marginal portion of the member 117 is provided with axially, radially and circumferentially extending projections 127 which serve as stops for the adjacent ends of the respective coil springs 126. The stops 127 are acted upon by the respective springs 126 in a sense to tend to turn the member 117 about the axis of the cover 2 in a direction to move the portion 111 of the seat 105 for the diaphragm spring 4 toward the pressure plate 103. The springs 126 have an arcuate shape because they are adjacent the convex outer sides of arcuate guides 129 forming part of or affixed to the member 117. The other end of each coil spring 126 is in engagement with a discrete post 128 which is anchored in the bottom wall 2a of the cover 2. The illustrated posts 128 have external threads which mate with the threads of tapped bores provided therefor in the bottom wall 2a. However, it is equally possible to replace the externally threaded posts 128 with integral projections in the form of lugs or the like which are obtained by displacing selected portions of the bottom wall 2a in a direction toward the pressure plate 103. Such making of posts or like parts which are of one piece with the bottom wall 2a is particularly advantageous and simple if the cover 2 is made of a metallic sheet material.

The length of the arcuate guides 129 is preferably selected in such a way that they can adequately guide the respective coil springs 126 during each stage of angular displacement of the member 117 relative to the bottom wall 2a, i.e., during each stage of compensation for wear upon the friction linings 107, pressure plate 103 and/or counterpressure plate 106. The configuration of the guides 129 is such that they can properly prop the respective coil springs 126 from within (i.e., at the concave sides of the arcuate springs) as well as in the axial direction of the bottom wall 2a. Each of the guides 129 can define an arcuate groove or channel which receives a portion of the respective coil spring 126 between the respective post 128 and the respective projection 127. This ensures highly predictable positioning of the coil springs 126 relative to the member 117 and guarantees that these coil springs can turn the member 117 in the proper direction (to move the seat portion 111 toward the pressure plate 103) whenever necessary in order to compensate for wear upon the linings 107, pressure plate 103 and/or counterpressure plate 106. The configuration of the surfaces bounding the channels of the guides 129 on the member 117 can conform to the configuration of the adjacent portions of the respective coil springs 126. Such configuration of the surfaces bounding the channels or grooves in the guides 129 ensures that the coil springs 126 are adequately guided when the cover 2 is idle as well as when the cover is rotated by the counterpressure plate 106 (this counterpressure plate can constitute or form part of a flywheel which receives torque from the output shaft of a combustion engine in a motor vehicle).

In order to even more reliably ensure optimal retention of coil springs 126 in requisite positions relative to the bottom wall 2a and the member 117, the radially inner portion of the bottom wall 2a can be provided with axially extending arms 130 which are disposed radially inwardly of the coil springs (see FIG. 13). The individual arms 130 can be replaced with a circumferentially complete cylindrical collar of the bottom wall 2a. The arms 130 or the aforementioned circumferentially complete collar of the bottom wall 2a can perform the additional function of serving as an abutment for the adjacent portions of the diaphragm spring 4, i.e., such collar or the arms 130 can limit the extent of dissipation of energy by the diaphragm spring 4.

The provision of means for guiding the coil springs 126 exhibits the advantage that, when the friction clutch 101 is rotated by a combustion engine or the like, the convolutions of the springs 126 cannot leave the illustrated positions under the action of centrifugal force, i.e., they cannot move into frictional engagement with the adjacent portions (such as ramps) of the member 117; this would result in the development of undesirable friction which would prevent the springs 126 from changing the angular position of the member 117 in a manner to accurately compensate for wear upon the friction linings 107, pressure plate 103 and/or counterpressure plate 106. When the friction clutch 101 is driven, the coil springs 126 preferably behave not unlike solid bodies, i.e., they are in frictional engagement with the adjacent guides 129 and such frictional engagement suffices to prevent any angular displacement of the member 117. The arrangement can be such that, when the rotational speed of the friction clutch 101 exceeds the idling speed of the engine, frictional engagement between the coil springs 126 and the guides 129 under the action of centrifugal force suffices to prevent any angular displacement of the member 117 relative to the bottom wall 2a of the cover 2, i.e., the springs 126 cannot change the angular position of the member 117. Thus, the angular position of the member 117 with reference to the cover 2 (in order to move the seat portion 111 toward the pressure plate 103) can take place only when the rotational speed of the friction clutch 101 does not exceed the idling speed of the engine. In other words, it is necessary to operate the friction clutch 101 in such a way that its rotational speed is relatively low in order to enable the springs 126 to change the angular position of the member 117 relative to the bottom wall 2a (if necessary).

It is equally possible to block any turning of the member 117 relative to the bottom wall 2a in any one of a number of other ways, i.e., not necessarily as a result of pronounced frictional engagement with the surfaces bounding the grooves or channels of the respective guides 129. For example, the arrangement may be such that the coil springs 126 can change the angular position of the member 117 relative to the bottom wall 2a only when the friction clutch 101 is not driven.

The just discussed feature of the friction clutch 101 can be incorporated with equal advantage in the friction clutch 1 of FIGS. 1 and 2. The arrangement may be such that the angular position of the member 17 relative to the annulus 25 can be changed only when the clutch 1 is not driven at all or when the clutch 1 rotates within a relatively low range of speeds. For example, the housing or cover 2 of the friction clutch 1 of FIGS. 1 and 2 can be provided with means which prevent the torsion spring 26 and/or 26a from changing the angular position of the member 17 relative to the annulus 25 when the member 17 is acted upon by centrifugal force, i.e., when the friction clutch 1 is driven by the engine in a motor vehicle or the like. For example, the bottom wall 2a of the cover 2 in the friction clutch 1 can carry one or more flyweights which move radially outwardly under the action of centrifugal force to thereby interfere with any changes in the angular position of the member 17 relative to the annulus 25, either by directly engaging the member 17 and/or by preventing the spring 26 and/or 26a from changing the angular position of the member 17 in the cover 2. The flyweight or flyweights can be designed and mounted to bear against the radially innermost portion of the member 17 when the friction clutch 1 of FIGS. 1 and 2 is driven. The flyweight or flyweights must be capable of engaging and holding the member 117 with a force which exceeds the bias of the springs 26, 26a, at least when the rotational speed of the friction clutch 1 reaches a certain value.

Referring again to FIGS. 12-14, the friction clutch 101 can be modified by providing radial supports for portions of or for the entire coil springs 126. Such radial supports can be installed on or they can form part of the bottom wall 2a of the cover 2 in the friction clutch 101; for example, the radial supports can be made of one piece with the posts 128. Thus, each post 128 can be replaced with a substantially L-shaped element which includes a portion extending in the circumferential direction of the cover 2 and into the adjacent end convolutions of the respective coil spring 126. Such portions of the L-shaped elements act not unlike retainers and hold the surrounding end convolutions of the respective coil springs 126 against radial movement relative to the bottom wall 2a.

FIG. 13 illustrates that the wire ring 11 of the seat 5 which is shown in FIG. 2 can be omitted. More specifically, the wire ring 11 is replaced by a radially inner portion 111 of the sensor 113. The portion 111 can be assembled of several sections each forming part of one of the tongues 113c of the sensor 113. Those sides of the tongues 113c which engage the diaphragm spring 4 in lieu of a wire ring 11 or the like can have a convex or substantially convex shape. Thus, the sensor 113 of FIG. 13 can perform the combined functions of the sensor 13 and wire ring 11 in the friction clutch 1 of FIGS. 1 and 2.

An advantage of a compensating device which is responsive to the rotational speed of the housing 102 is that the time of carrying out an automatic adjustment can be selected to reduce the likelihood of adversely influencing the operation of the compensating device by centrifugal force and/or by any other parameters (such as vibrations, oscillations and/or other stray movements) which are attributable to the RPM of the cover. As already mentioned hereinbefore, the arrangement may be such that the compensating device 116 is ineffective when the cover 102 is rotated at a particular speed or within a particular range of speeds. For example, the device 116 can be designed to be ineffective when the RPM of the cover 102 exceeds a predetermined threshold value. A presently preferred mode of relating the operability of the compensating device 116 to the RPM of the cover 102 is to ensure that the device 116 can be operated only when the RPM of the cover 102 matches or approximates (and especially when it is below) the idling speed of the engine whose output element drives the flywheel 106. It is also possible to design the compensating device 116 in such a way that it can be operated only when the RPM of the cover 102 is zero or close to zero.

The operating means (26 and 126) which are used in the friction clutches 1 and 101 are installed to bias the respective annular adjusting members (17, 117) in the circumferential direction of the respective housing or cover. This is due to the aforediscussed distribution and orientation of ramps on the annular adjusting member and on the adjacent annular portion of the respective compensating device 16 or 116. However, it is also possible to employ an annular adjusting member which performs a more complex movement, e.g., which is designed to perform a movement in the circumferential direction of the cover as well as another movement relative to the cover in order to move the seat for the diaphragm spring toward the pressure plate.

Figure 15:
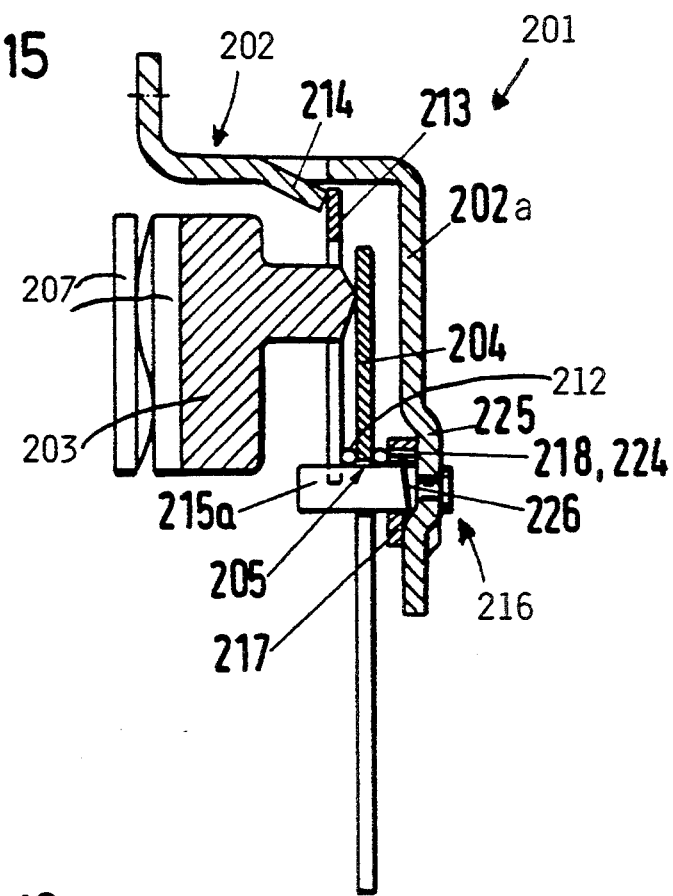
FIG. 15 is a fragmentary axial sectional view of a third friction clutch.
Figure 16:
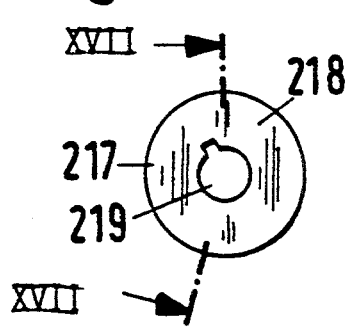
FIG. 16 is a plan view of an annular adjusting or wear compensating member which is utilized in the third friction clutch.
Figure 17:
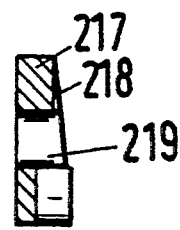
FIG. 17 is a sectional view substantially as seen in the direction of arrows from the line XVII—XVII in FIG. 16.

FIGS. 15 to 17 illustrate certain details of a further torque transmitting friction clutch 201 wherein the circumferentially complete annular adjusting member 17 or 117 is replaced with a set of discrete button- or washer-like adjusting and wear compensating members 217. The discrete members 217 are equidistant from each other in the circumferential direction of the cover or housing 202 and each of these members has a ramp 218 which extends at one of its sides in the circumferential direction to cooperate with an adjacent ramp 224 of the annulus 225 forming part of the bottom wall 202a of the cover 202. Each of the illustrated members 217 has a central opening 219 (e.g., a circular bore or hole) which receives a portion of an axially parallel pin-shaped extension 215a of a rivet in such a way that each member 217 can turn about the axis of the respective extension 215a. The annulus 225 is an integral part of the bottom wall 202a and is provided with the aforementioned ramps 224 cooperating with the ramps 218 of the neighboring members 217 to automatically shift (when necessary) the ring 212 of the seat 205 toward the pressure plate 203 in order to compensate for wear upon the friction linings 207, the pressure plate 203 and/or the counterpressure plate (not shown in FIG. 15). The members 217 are turnable about the axes of the respective extensions 215a by operating means in the form of springs 226 in a sense to move the ramps 218 along the neighboring ramps 224 and to thus shift the ring 212 toward the pressure plate 203. Each spring 226 resembles a helix which surrounds the respective extension 215a, which reacts against the bottom wall 202a and which bears against the corresponding member 217. The end portions of the helical springs 226 are suitably bent so that they can more reliably engage the bottom wall 202a and the respective members 217, respectively. For example, the end portions of the springs 226 can be provided with lugs, legs or like projections. When the diaphragm spring 204 is moved axially of the friction clutch 201 of FIG. 15 due to wear upon the friction linings 207, pressure plate 203 and/or the non-illustrated counterpressure plate, the springs 226 are free to change the angular positions of the respective members 217 relative to the corresponding extensions 215a and to thus move the ring 212 toward the pressure plate 203; this compensates for the aforediscussed wear, primarily upon the friction linings 207.

The sensor 213 of the friction clutch 201 of FIG. 15 bears against lugs 214 which are shown in the form of integral portions of the axially extending part of the cover 202. The lugs 214 preferably constitute inwardly bent parts of the cover which are deformed to the extent necessary to engage the radially outer portion of the sensor 213.

An advantage of the discrete annular adjusting members 217 is that they are less likely to change their positions under the action of centrifugal force, i.e., they are not likely to turn about the respective extensions 215a as a result of rotation of the cover 202 about its own axis. In other words, the adjusting action of such discrete adjusting members 217 is not affected by the magnitude of the centrifugal force.

The discrete annular adjusting members 217 in the friction clutch which is shown in FIG. 15 can be replaced with discrete wedge-like or analogous adjusting members which are mounted for movement in the radial and/or circumferential direction of the cover 202 in order to cooperate with complementary parts on the bottom wall 202a in a sense to displace the ring 212 toward the pressure plate 203 when the need arises, i.e., in order to compensate for wear upon the counterpressure plate, the pressure plate 203 and/or the friction linings 207. Each wedge-like adjusting member can be provided with a longitudinally extending recess to receive a portion of an extension 215a or a like part of or on the bottom wall 202a. This ensures that each wedge-like member can carry out a movement only in a direction which is necessary to adjust the axial position of the ring 212. The arrangement may be such that the wedge-like members which are to be used in lieu of the discrete washer-like members 217 of FIG. 15 are acted upon by centrifugal force in order to move radially and/or circumferentially of the wall 202a and to thus compensate for wear, particularly for wear upon the friction linings 207. However, it is equally possible to employ operating means in the form of springs which cooperate with wedge-like adjusting members to shift such adjusting members along suitable configurations (such as ramps 224) of the bottom wall 202a in order to move the ring 212 axially toward the pressure plate 203. The extensions 215a can be replaced with other suitable guide means for the wedge-like adjusting members which can be used in lieu of the washer-like members 217; for example, the bottom wall 202a can be grooved to establish predetermined paths for movement of the wedge-like members relative to the cover 202.

The ramps 224 can be provided on the bottom wall 202a to project toward the adjacent annular adjusting members 217 from a plane which is normal to the axis of the cover 202. Alternatively, such ramps can be provided on the adjacent portions of the diaphragm spring 204. This also applies for the embodiments of FIGS. 1–2 and 12–13. It is also possible to provide the annular members 17, 117 and/or 217 with two sets of ramps 218, one at each side, and to provide complementary ramps 24, 124 or 224 on the bottom wall 2a, 102a or 202a and on the corresponding diaphragm spring 4, 104 or 204. If the adjusting members are wedges or if they resemble wedges, it is advisable to make them from a lightweight material in order to minimize the influence of centrifugal force.

The selection of materials for the cooperating ramps (such as 18 and 24) also plays an important role in connection with the reliability of adjustment of the diaphragm spring toward the clutch disc of the improved friction clutch. An important prerequisite is to select the material of the member 17 or 117 or of the members 217 and the material of the adjacent annulus 25, 125 or 225 in such a way that the ramps of such parts will not exhibit a tendency to adhere to each other irrespective of the momentary stage of useful life of the respective friction clutch. For example, adherence of one set of ramps to the neighboring ramps can be prevented or avoided by coating at least one of these sets of ramps with a suitable friction-reducing material. If the one and/or the other set of ramps consists of a metallic material, the coating substance will or can be selected with a view to prevent corrosion.

Another mode of preventing the ramps of one set from adhering to the ramps of the other set or sets (and from thus preventing, or interfering with accuracy of, adjustment of the diaphragm spring toward the pressure plate in order to compensate for wear) is to make the materials of the two or more sets of ramps (such as the materials of the annular member 17 and the annulus 25 in the embodiment of FIGS. 1 and 2) of materials having different thermal expansion coefficients. As a rule, the temperature of the friction clutch 1 will fluctuate in actual use as well as prior and between actual use(s) or during and subsequent to actual use. This will entail certain minimal movements of the neighboring ramps 18, 24 relative to each other whenever the temperature of the member 17 and annulus 25 changes. The aforementioned mode of selecting the materials of the member 17 and annulus 25 (so that they have different thermal expansion coefficients) ensures that the ramps 18 cannot adhere to the ramps 24, i.e., that the adjusting or compensating unit 16 is always in condition to carry out all necessary adjustments in exact dependency on the extent of wear upon the friction linings 7 and/or pressure plate 3 and/or counterpressure plate or flywheel 6.

Still another mode of preventing adherence of neighboring sets of ramps to each other is to select the configuration and/or the deformability (stability) of the corresponding parts (such as the adjusting member 17 and the annulus 25 in the friction clutch 1 of FIGS. 1 and 2) with a view to ensure that the action of centrifugal force upon the parts 17 and 25 is not the same, i.e., that such parts will perform certain movements relative to each other in response to rotation of the friction clutch 1 with the result that the extent of movement of the ramps 18 will depart from that of the ramps 24 and the two sets of ramps will be incapable of adhering to one another.

A further mode of preventing the ramps of one set from adhering to the ramps of the neighboring set or sets is to ensure that the ramps of at least one set (e.g., the ramps 18 in the friction clutch 1 of FIGS. 12) are caused to perform at least some axial movements relative to the neighboring ramps (such as 24) during each disengagement of the friction clutch (i.e., during movement of the tips 4c of prongs 4b of the diaphragm spring 4 along a predetermined path extending toward the pressure plate 3 in order to deform the diaphragm spring 4 and to permit the leaf springs 9 to shift the pressure plate 3 axially and away from the flywheel 6). The adjusting member 17 of the unit 16 in the embodiment of FIGS. 1–2 can be coupled with a suitable part or it can be provided with suitable parts which move axially in response to development of wear at 7, 3 and/or 6. Such part or parts can be installed adjacent the seat 5, e.g., on the diaphragm spring 4 and/or on the sensor 13.

Figure 18:
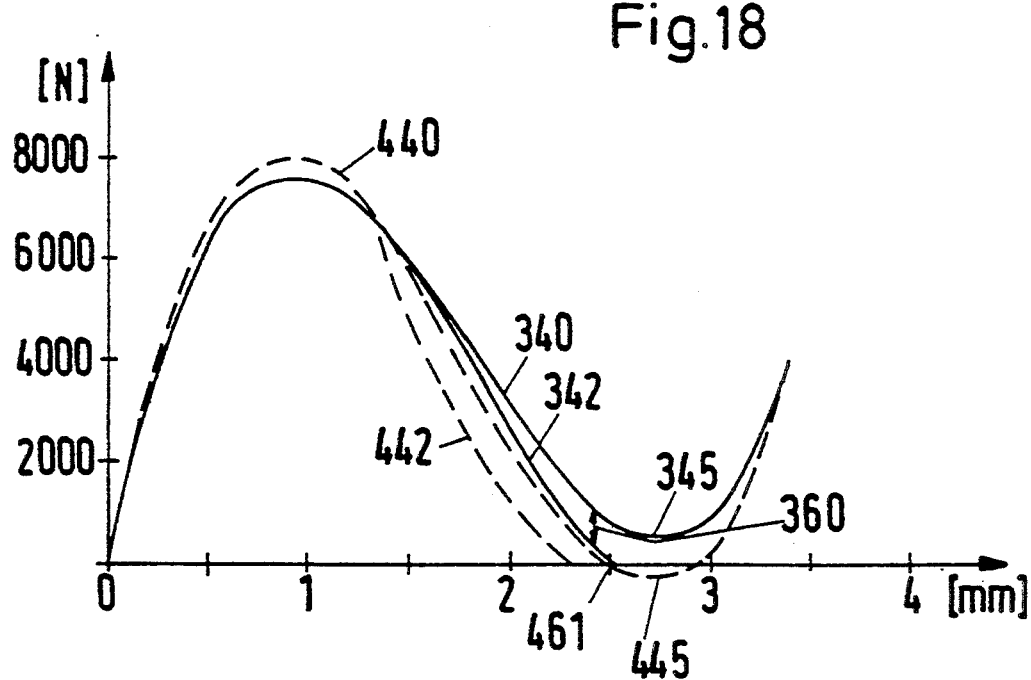
FIG. 18 is a diagram with curves denoting the characteristics of a diaphragm spring corresponding to that used in the friction clutch of FIGS. 1 and 2.

The diagram of FIG. 18 shows the characteristic curve 340 of a diaphragm spring corresponding to the diaphragm spring 4 of FIGS. 1 and 2. The curve 340 has a minimum or lowest point 345 denoting a relatively small force which is generated by the diaphragm spring and is in the range of approximately 450 nm (as measured along the ordinate). The highest point or maximum of the curve 340 is located in the range of 7680 nm. The transmission of force as a result of deformation of the diaphragm spring, and as indicated by the curve 340 of FIG. 18, takes place while the diaphragm spring bears against one and reacts against another of two stops which are spaced apart from each other in the radial direction of the respective friction clutch. The situation is analogous to that described with reference to the characteristic curve 40 of the diaphragm spring 4 in the diagram of FIG. 8.

The characteristic curve 340 of the diaphragm spring (such as 4) can be combined with the characteristic curve 342 of a resilient element corresponding to the segments 10 in the clutch disc 8 of the friction clutch 1. As can be seen in FIG. 18, the distance-to-force progress of the curve 342 is similar to that of the curve 340, i.e., these curves are rather close to each other which denotes that a friction clutch embodying the corresponding diaphragm spring and resilient segments 10 can be actuated in response to exertion of a very small force. Within the operating range of the resilient segments 10, the theoretical disengaging force corresponds to the difference between two vertically aligned points, one on the curve 340 and the other on the curve 342. One such difference is shown in FIG. 18, as at 360. The actually required disengaging force is further reduced by the corresponding lever arms of the actuating means, such as the prongs 4b of the diaphragm spring 4 in the friction clutch 1 of FIGS. 1 and 2. All this is analogous to the construction and mode of operation of the friction clutch 1 as already described with reference to FIGS. 1-2 and 8-11.

The diagram of FIG. 18 further contains a curve 440 which is indicated by broken lines and has a minimum or lowest point 445 denoting a negative force which is generated by a diaphragm spring. In other words, a certain part of the force which is denoted by the curve 440 does not assist in engagement of the friction clutch but rather tends to disengage the friction clutch. Thus, if the deformation of diaphragm spring which is denoted by the curve 440 progresses beyond the point 461, the friction clutch does not exhibit a tendency to become engaged but automatically remains disengaged. The broken-line curve 442 denotes in FIG. 18 the characteristic curve of resilient segments (such as 10 in the friction clutch of FIGS. 1-2) which can be used in conjunction with the diaphragm spring having a characteristic curve corresponding to that shown at 440. Relatively small (minimal) disengaging forces can be achieved if the curves 440 (diaphragm spring 4) and 442 (resilient segments 10) are at least substantially parallel to each other.

Figure 19:
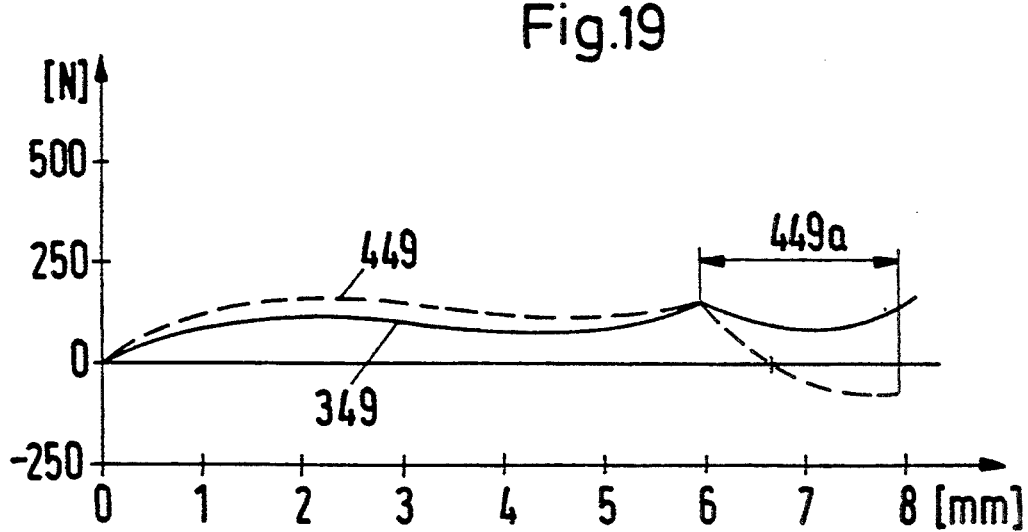
FIG. 19 is a diagram wherein the curves indicate variations of disengaging force when a friction clutch employs diaphragm springs exhibiting characteristics corresponding to those denoted by the curves in the diagram of FIG. 18.

The curve 349 in the diagram of FIG. 19 denotes the progress of a disengaging force which is to be applied to the tips of the prongs 4b (levers) of a diaphragm spring (i.e., to the actuating means of the means for engaging and disengaging the friction clutch) when the friction clutch is being disengaged and employs a diaphragm spring and resilient segments of the character denoted by the curves 340 and 342 of FIG. 18. As can be seen in FIG. 19, the curve 349 remains in the positive force range (above the abscissa of the coordinate system of FIG. 19) which means that a certain force in a direction to disengage the friction clutch must be applied as long as the friction clutch is to remain in disengaged condition (the pressure plate 3 of FIGS. 1-2 is then disengaged from the adjacent set of friction linings 7).

The broken-line curve 449 in the diagram of FIG. 19 denotes the progress of a clutch disengaging force which develops when the diaphragm spring and the resilient segments of the friction clutch exhibit characteristic curves of the type shown at 440 and 442 in the diagram of FIG. 18. The curve 449 includes a portion (at 449a) which denotes an initial decrease of the disengaging force toward the abscissa and thereupon transmits from the positive side to the negative side of the abscissa. This denotes that a friction clutch employing a diaphragm spring represented by the curve 440 and resilient segments represented by the curve 442 can remain in disengaged condition without the need for the application of any disengaging force to the tips of the prongs (actuating means) of the diaphragm spring.

FIGS. 20, 20a, 21 and 22 illustrate a portion of a torque transmitting friction clutch 501, wherein the diaphragm spring 513 which performs the function of a sensor is coupled to the housing or cover 502 by a bayonet mount 514 so that the sensor 513 is maintained in a predetermined axial position relative to the bottom wall 502a of the cover 502. The main portion 513b of the sensor 513 is provided with radially outwardly extending coupling portions or arms 513d which are offset relative to the general plane of the main portion 513b in a direction toward the bottom wall 502a and extend into female coupling portions 502a' provided in the substantially axially extending marginal portion 502b of the cover 502; the marginal portion 502b surrounds the bottom wall 502a and extends toward the pressure plate 503 of the friction clutch 501. The female coupling portions 502a' which are shown in the drawing constitute lugs of one piece with the cover 502 and obtained as a result of appropriate deformation of corresponding parts of the marginal portion 502b. Each female coupling portion 502a' (these coupling portions form part of the bayonet mount 514 and are of one piece with the cover 502) is preferably flanked by at least one slit or slot (such as the slits 502c, 502d) in the adjacent portion of the cover 502. By actually separating certain parts of the coupling portions 502a' from the adjacent portions of the cover 502, the portions 502a' can be more readily shaped to assume an optimum configuration for cooperation with the male coupling portions 513d of the bayonet mount 514.

Figure 21:
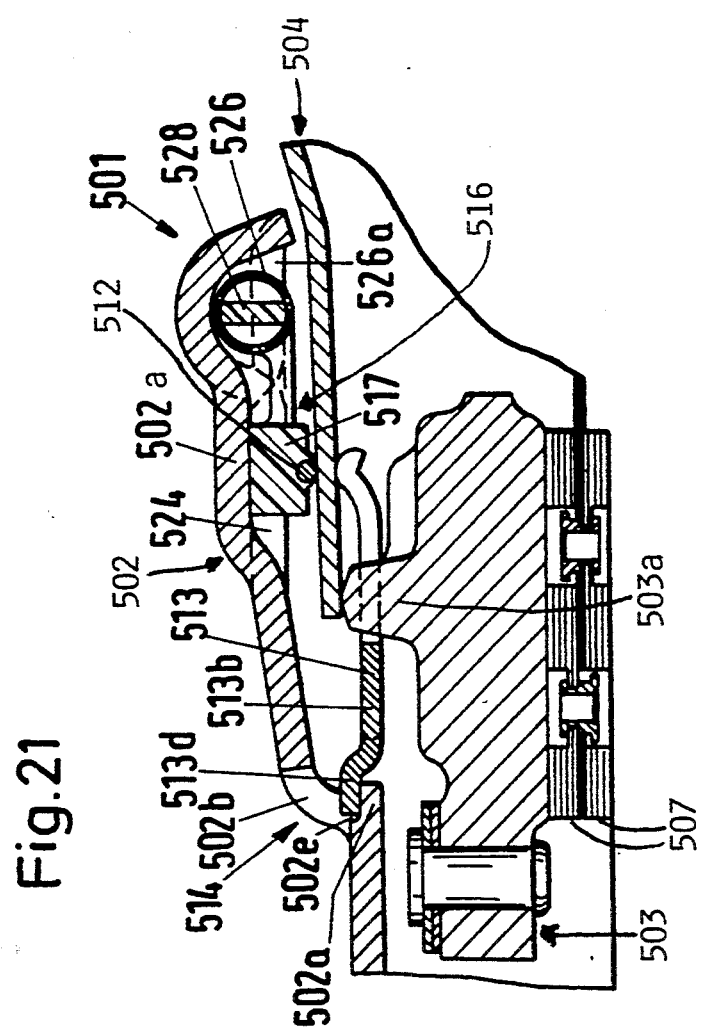
FIG. 21 sectional view substantially as seen in the direction of arrows from the line XXI—XXI in FIG. 20.

As can be readily seen in FIG. 21, the positions and shapes of the coupling portions 502a' and 513d (which together constitute the bayonet mount 514) are selected in such a way that they can further perform the function of means for centering the sensor 513 relative to the cover 502. To this end, the female coupling portions 502a' are provided with rather shallow centering recesses 502e for parts of the respective male coupling portions 513d.

In order to ensure predictable and optimal positioning of the sensor 513 relative to the cover 502 during establishment of engagement between the coupling portions 502a' and 513d of the bayonet mount 514, the substantially axially extending marginal portion 502b of the cover 502 is preferably provided with at least three equidistant female coupling portions 502a'. The arrangement is such that the portions 502a' and 513d of the bayonet mount 514 permit a predetermined angular displacement of the cover 502 and the sensor 513 relative to each other before the bayonet mount is effective to maintain the sensor in an optimum position at a certain distance from the outer side of the bottom wall 502a as well as in properly centered position relative to the cover 502. At such time, the male coupling portions 513d abut stops 502f which form part of the cover 502 and serve to prevent further rotation of the cover 502 and sensor 513 relative to each other in order to activate the bayonet mount 514. As can be seen in FIG. 20a, each stop 502f can constitute an axially extending projection of the cover 502. FIG. 20a further shows that at least one of the female coupling portions 502a' (but preferably at least two or all three coupling portions 502a') is provided with an additional stop 502g which also prevents rotation of the sensor 5013 relative to the cover 502. Each stop 502g is engaged by the adjacent male coupling portion 513d of the sensor 513 when the bayonet mount 514 is fully assembled.

Figure 20:
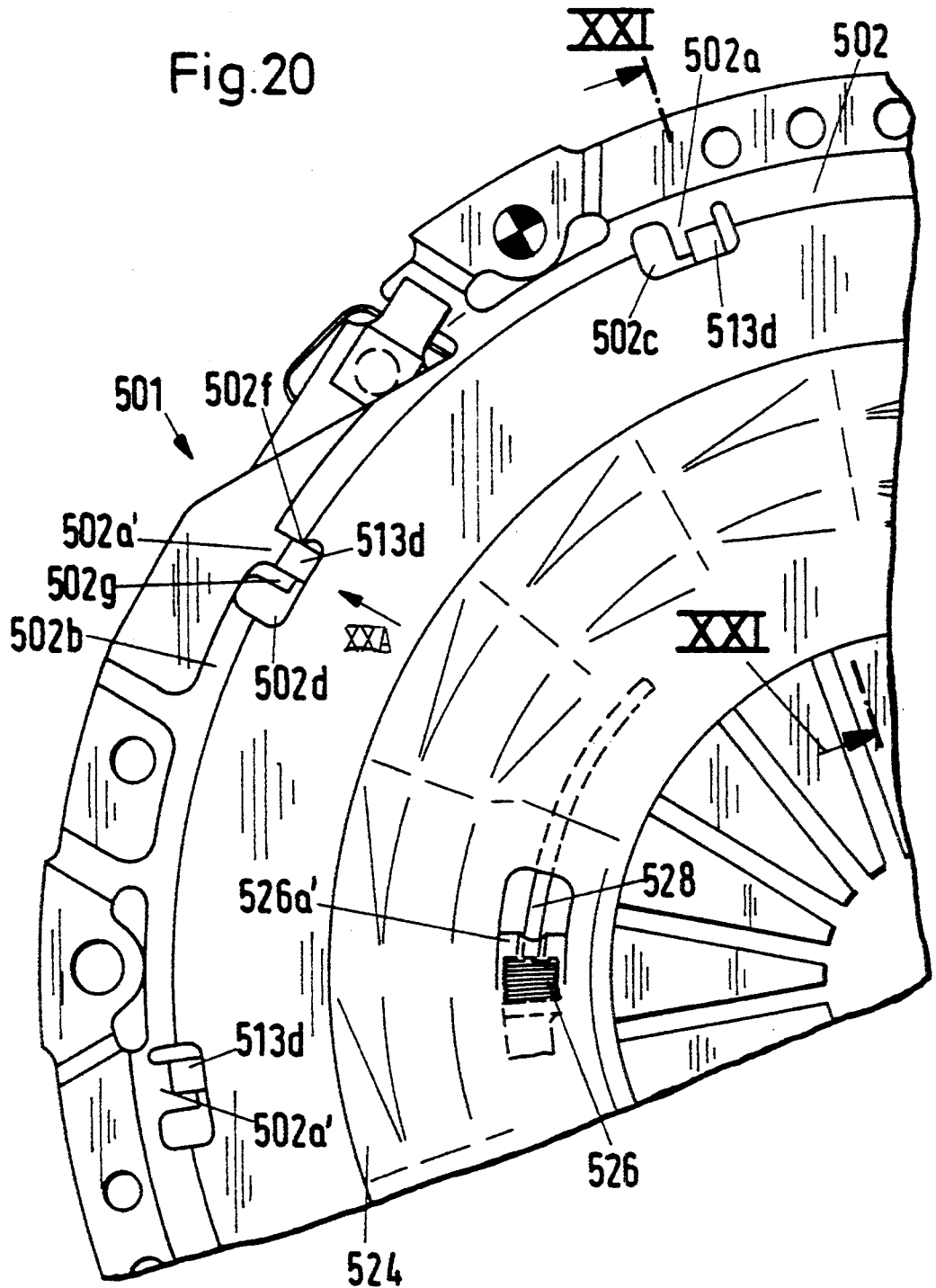
FIG. 20 is a fragmentary elevational view as seen from the upper side of FIG. 21 and illustrates a fourth friction clutch.
Figure 22:
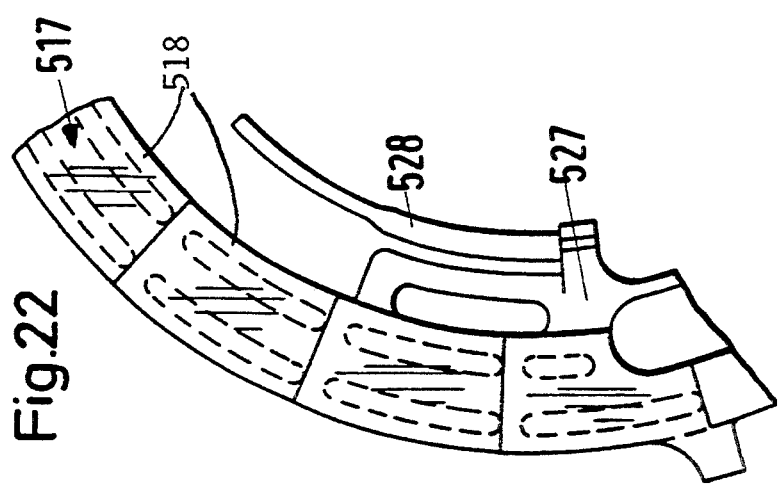
FIG. 22 is a fragmentary plan view of an annular adjusting or wear compensating member which can be utilized in the adjusting or wear compensating device or unit of the fourth friction clutch.
Figure 20A:
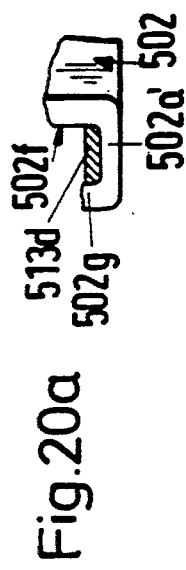
FIG. 20a illustrates, in a partial sectional view, a detail as seen in the direction of arrow XXA in FIG. 20.

In the embodiment which is shown in FIGS. 20 to 22, each of the female coupling portions 502a' is provided with a first stop 502f and with a second stop 502g for the respective male coupling portion 513d. One of the stops 502f, 502g holds the respective coupling portion 513d against rotation in one direction and the other of the stops 502f, 502g holds the respective coupling portion 513d against rotation in the opposite direction. The stops 502g serve to prevent accidental or unintentional separation of the bayonet mount 514, i.e., they prevent accidental separation of the sensor 513 from the cover 502. Once the bayonet mount 514 is active, the sensor 513 is held in a predetermined angular position relative to the bottom wall 502a of the cover 502.

In order to render the bayonet mount 514 effective, the sensor 513 is first subjected to an initial stress by deforming it axially toward the bottom wall 502a of the cover 502 so that the male coupling portions 513d can enter the adjacent slots or slits 502c and 502d of the cover 502 by moving in the circumferential direction of the friction clutch 501. In this manner, the male coupling portions 513d can be moved behind the adjacent female coupling portions 502a'. The next step of rendering the bayonet mount 514 operative involves turning of the cover 502 and the sensor 513 relative to each other until at least some of the coupling portions 513d reach and are arrested by the corresponding stops 502f. The sensor 513 then dissipates some energy so that at least some of the male coupling portions 513d move axially and away from the bottom wall 502a and enter the spaces between the respective stops 502f and 502g. This ensures that the sensor 513 can no longer become accidentally separated from the (female) coupling portions 502a' of the cover 502. Once the bayonet mount 514 is effective to reliably hold the sensor 513 in the interior of the cover 502, the assembly of the friction clutch 501 can proceed without risking accidental changes in the (centered) position of the sensor 513 relative to the cover 502 and/or unintentional separation of the sensor from the cover. At such time, each of the female coupling portions 502a' is overlapped by one of the male coupling portions 513d.

In the heretofore described embodiments of the improved friction clutch, that circumferentially complete portion of the sensor (such as the main portion 513b of the sensor 513) which actually generates the force (e.g., the force to urge the diaphragm spring 504 of FIG. 21 against the ring 512) extends radially outwardly beyond the points or lines of contact between the diaphragm spring and the pressure plate (such as the diaphragm spring 504 and the portion 503a of the pressure plate 503 shown in FIG. 21). However, it is often desirable and advantageous to position the main portion of the sensor radially inwardly of the locations of engagement between the diaphragm spring and the pressure plate, i.e., radially inwardly of the circle including the points or lines of contact between the diaphragm spring and the pressure plate. With reference to the friction clutch 1 of FIGS. 1 and 2, this would mean that the circumferentially complete portion 13b of the sensor 13 would be located radially inwardly of the points of contact between the diaphragm spring 4 and the projecting portions 3a of the pressure plate 3.

Referring again to the friction clutch 501 of FIGS. 20 to 22, the ramps 524 of the adjusting or compensating unit 516 are provided directly at the inner side of the bottom wall 502a of the cover 502. The latter is made of sheet metal and the ramps 524 are obtained by appropriate deformation of an annular portion of the bottom wall 502a. The means for biasing the annular member 517 of the adjusting unit 516 includes coil springs 526 which are guided by suitably curved guide elements or mandrels 528 forming part of the member 517 (see particularly FIG. 22). The coil springs 526 react against the cover 502 and bear against the respective projections 527 of the member 517 so that the latter tends to turn in a direction to move (under the action of the ramps 524) toward the pressure plate 503 and to thus compensate for wear upon the pressure plate 503, the counterpressure plate (not shown in FIGS. 20–22) and/or friction linings 507 between the counterpressure plate and the pressure plate 503. As can be seen in FIG. 21, each mandrel 528 can have an elongated rectangular cross-sectional outline to extend substantially diametrically across the entire space within the surrounding convolutions of the respective coil spring 526. The length of the arcuate mandrels 528 can approximate but can be less than the length of the respective coil springs 526. The utilization of relatively long mandrels 528 ensures predictable and satisfactory guidance of the respective coil springs 526, at least in the radial direction of the member 517. In addition, the mandrels 528 can be designed and dimensioned to effectively prevent any, or any appreciable, axial movements (buckling) of intermediate portions of the respective coil springs 526. Another important advantage of the mandrels 528 is that they simplify the assembly of the friction clutch 501.

FIG. 22 shows one of several radially inwardly extending projections 527 which are or can be of one piece with the major portion of the member 517 and carry the respective mandrels 528. If the member 517 is made of a plastic material (e.g., a material which can be shaped in an injection molding or extruding machine), the projections 527 can be made of one piece with the respective mandrels 528 as well as with the circumferentially complete main portion of the member 517, namely that portion which is provided with ramps 518 serving to cooperate with the ramps 524 on the bottom wall 502a of the cover 502. However, it is equally within the purview of the invention to mass produce the mandrels 528 (or the mandrels 528 and the corresponding projections 527) independently of the main portion of the member 517 and to thereupon assemble the parts 527 or the parts 527, 528 with the main portion of the member 517, e.g., by resorting to connections which operate with snap action. It is also possible to make the mandrels 528 from a one-piece ring which is severed at a required number of locations to permit entry of the thus obtained arcuate portions of the ring into the corresponding coil springs 526 and to affix each arcuate portion of the subdivided ring to one of the projections 527. The connections between the arcuate portions of the aforementioned ring (i.e., of a blank for the making of the mandrels 528 or their equivalents) and the projections 527 can be designed to operate by snap action. It is preferred to provide the member 517 with at least three preferably equidistant projections 527.

If desired or necessary, the friction clutch 501 can be constructed in such a way that it comprises one or more additional systems for preventing undesirable movements of the coil springs 526 relative to the cover 502 and/or member 517. For example, and as already explained with reference to the friction clutch 101 of FIGS. 12–13, the cover 502 and/or the member 517 can be provided with suitable means for preventing any undesirable movements of the coil springs 526 under the action of centrifugal force.

The means for coupling one end of each coil spring 526 to the cover 502 of the friction clutch 501 comprises retainers or stops 526a′ (one shown in each of FIGS. 20 and 21) which can constitute suitably deformed portions of the cover 502 and extend in the axial direction of the friction clutch. The configuration of the retainers 526a′ is preferably such that they not only abut the adjacent outermost convolutions of the respective coil springs 526 but that they are also capable of otherwise guiding or locating the respective coil springs (e.g., in the radial and/or axial direction of the friction clutch 501).

In the friction clutch 601 of FIG. 23, the sensor 613 is located at the outer side of the bottom wall 602a of the housing or cover 602, i.e., at that side of the bottom wall 602a which faces away from the pressure plate 603. An advantage of such mounting of the sensor 613 is that it is subjected to less pronounced thermal stresses; this reduces the likelihood of undesirable reduction or decrease of resiliency of the sensor 613 as a result of excessive thermal stressing. Moreover, the sensor 613 at the outer side of the bottom wall 602a is subjected to much more pronounced cooling action when the friction clutch 601 is in use.

The operative connection between the sensor 613 and the diaphragm spring 604 in the clutch 601 of FIG. 23 is established by way of distancing elements in the form of rivets 615 (only one shown). The shanks of these rivets extend through slots between the neighboring prongs of the diaphragm spring 604 and through openings in the bottom wall 602a of the cover 602. The axes of the rivets 615 are parallel to the axis of the friction clutch 601, and each of these rivets has a head which overlies the outer side of the sensor 613. The rivets 615 constitute but one form of means which can be used to operatively connect the sensor 613 with the diaphragm spring 604. For example, the sensor 613 can be provided with axially extending projections in the form of lugs or the like having suitable tips overlying the ring 611 of the seat 605 to maintain the ring 611 in uninterrupted contact with the main portion of the diaphragm spring 604. In fact, it is possible to design the sensor 613 in such a way that it is made of one piece with parts which replace the rivets 615 as well as the ring 611 of the seat 605. Still further, the rivets 615 which are rigid with the sensor 613 can be replaced with parts which are articulately connected to the sensor 613.

Referring to FIG. 24, there is shown a portion of a friction clutch 701 with a sensor 713 which is disposed radially inwardly of the locations of contact between the diaphragm spring 704 and the portion or portions 703a of the pressure plate 703. Thus, the sensor 713 is located radially inwardly of the seat 705. The radially inner portions (tongues) of the sensor 713 react against the adjacent portions of the cover 702. To this end, the cover 702 is provided with arms 715 which extend through the slots between the prongs of the diaphragm spring 704 and are engaged by the adjacent portions of the sensor 713.

Figure 25:
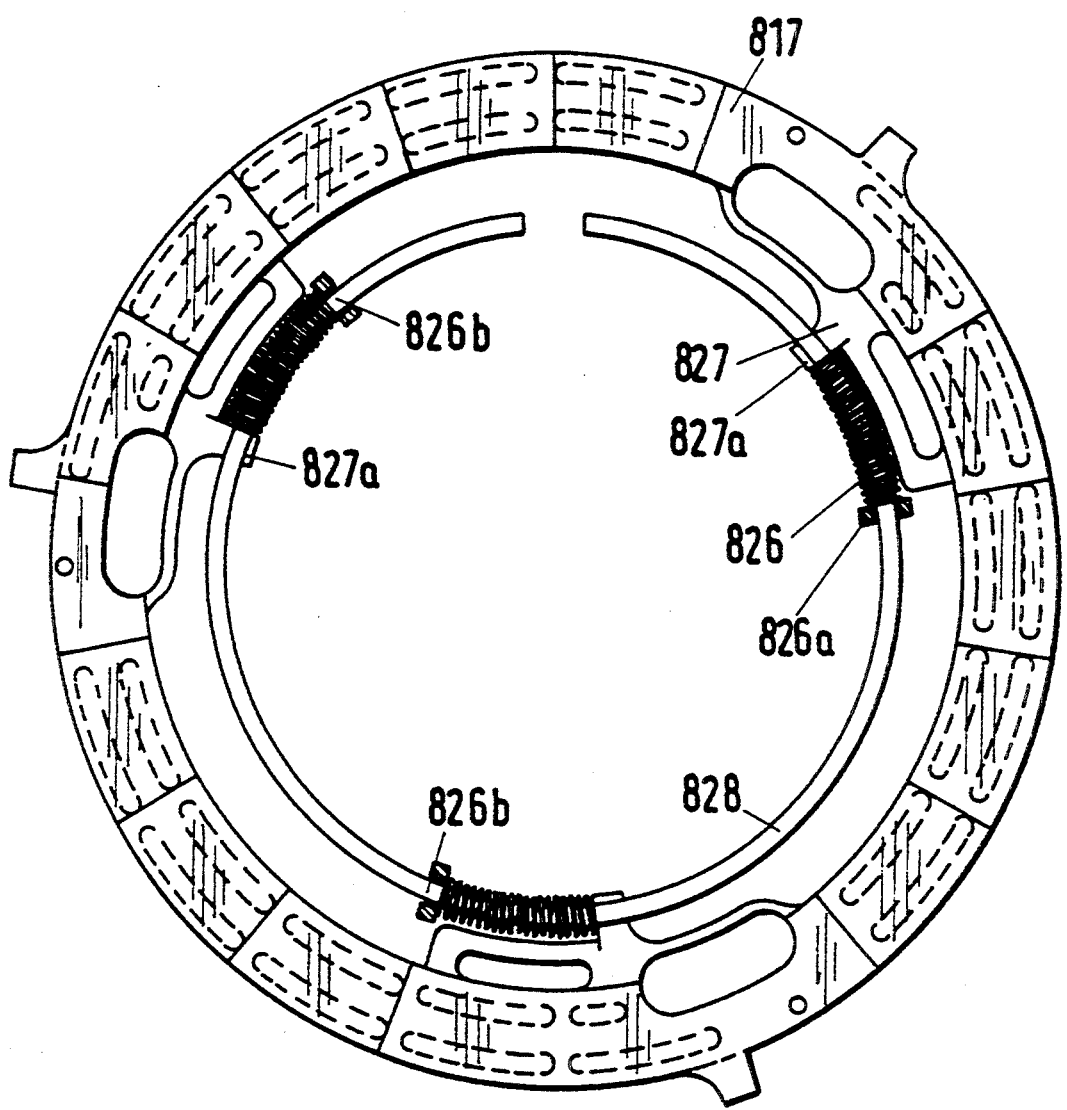
FIG. 25 is a plan view of an annular adjusting member which can be utilized in the adjusting unit of the second or fourth friction clutch.

The annular adjusting member 817 which is shown in FIG. 25 can be utilized with advantage in the friction clutch of FIGS. 20, 20a and 21 in lieu of the annular member 517 of FIG. 22. The radially inner portion of the member 817 is provided with projections 827 which extend radially inwardly and have radially inwardly projecting extensions 827a. The extensions 827a serve as abutments for the adjacent end convolutions of arcuate coil springs 826 extending in the circumferential direction of the member 817. The other end convolution of each coil spring 826 bears against a retainer 826a forming part of a housing or cover (not shown but corresponding to the cover 502 of FIGS. 20 and 21) and extending in parallelism with the axis of the friction clutch employing the member 817.

In order to facilitate assembly of the member 817 with the coil springs 826, there is provided a split ring 828 which is concentric or nearly concentric with the member 817 and extends through the extensions 827a, through the coil springs 826 and through the retainers 826a. The ring 828 is affixed to the extensions 827a; for example, the extensions 827a can be provided with grooves or sockets extending in the circumferential direction of the member 817 and being dimensioned and configurated to receive the respective portions of the split ring 828 by snap action. Each retainer 826a can be provided with a groove 826b which extends in substantial parallelism with the axis of the member 817 and is configurated and dimensioned to receive the adjacent portion of the split ring 828 with freedom of movement of the ring relative to the retainer 826a in the circumferential direction of the member 817. At the very least, the ring 828 can move circumferentially of the member 817 to the extent which is necessary to compensate for wear upon the friction linings, the pressure plate and/or the counterpressure plate in the friction clutch which employs the structure of FIG. 25.

It is presently preferred to configurate the extensions 827a and the retainers 826a in such a way that the sockets of the extensions 827a (for reception of the adjacent portions of the split ring 828 by snap action) face in one axial direction and the grooves 826b (for reception of adjacent portions of the ring 828 with freedom of movement in the circumferential direction of the member 817) face in the opposite axial direction. In other words, the sockets of the extension 827a can be open in a direction toward or away from the bottom wall of the housing or cover of the friction clutch employing the structure of FIG. 25, and the grooves 826b of the retainers 826a can be open in a direction away from the bottom wall of such housing or cover.

Figure 26:
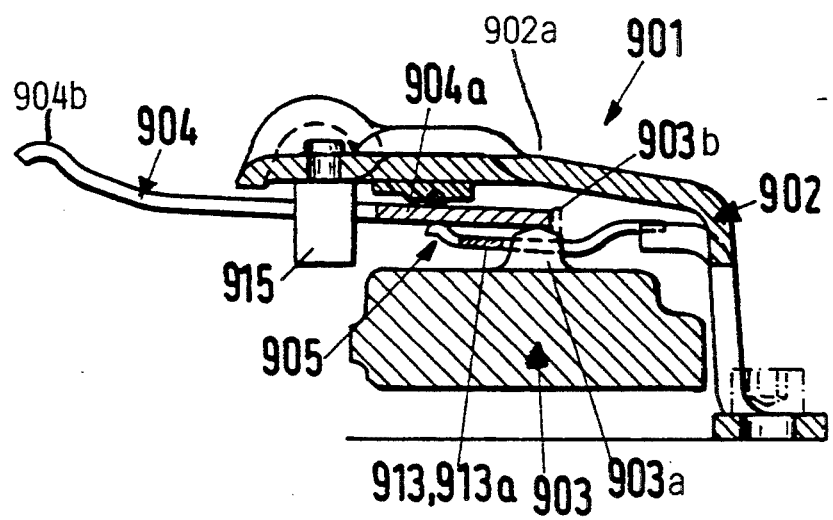
FIG. 26 is a fragmentary axial sectional view of a seventh friction clutch.

FIG. 26 illustrates a friction clutch 901 with a diaphragm spring 904 having a main portion 904a. The median part of the main portion 904a is in contact with the parts of the seat 905 and the radially outermost part of the main portion 904a is positioned to bear against the projecting portion or portions 903a of the pressure plate 903 when the friction clutch 901 is engaged. The prongs 904b of the diaphragm spring 904 (i.e., the actuating means of the means for engaging and disengaging the friction clutch 901) extend radially inwardly beyond the main portion 904a, i.e., radially inwardly beyond the seat 905. The distance of the seat 905 from the radially innermost part of main portion 904a of the diaphragm spring 904 is greater than in heretofore known friction clutches wherein the means for biasing the pressure plate toward the friction linings of the clutch disc includes a diaphragm spring reacting against the housing or cover of the friction clutch. In the embodiment of FIG. 26, the ratio of the width of that part of the main portion 904a which extends radially inwardly beyond the seat 905 to the width of that part of the main portion 904a which extends radially outwardly beyond the seat 905 is approximately 1:2. It is often desirable that such ratio be between 1:6 and 1:2. By selecting the position of the seat 905 relative to the main portion 904a of the diaphragm spring 904 in the just outlined manner, the maker of the friction clutch 901 reduces the likelihood of damage to and/or overstressing of the main portion 904a in the region of engagement with the seat 905. In other respects, the friction clutch 901 of FIG. 26 can be constructed and assembled in a manner as described with reference to the friction clutch 101 of FIGS. 12 and 13.

FIG. 26 further shows, by broken lines, an axially extending centering projection 903b on the illustrated axially projecting portion 903a of the pressure plate 903. The pressure plate 903 can be provided with a circumferentially complete projecting portion 903a or with a discontinuous projecting portion, e.g., with at least three equidistant discrete projecting portions 903a. The single projecting portion or each discrete projecting portion 903a of the pressure plate 903 can be provided with a centering projection 903b for the diaphragm spring 904. The centering projections 903b render it possible to dispense with all other means for centering the diaphragm spring 904 relative to the bottom wall 902a of the housing or cover 902. Though FIG. 26 shows a rivet 915 which is to center the diaphragm spring 904, such rivet is optional if the projecting portion or portions 903a of the pressure plate 903 are provided with centering projections 903b.

It is further possible to replace the rivets 915 and/or the centering projection or projections 903b of the pressure plate 903 in the friction clutch 901 of FIG. 26 with a set of centering projections which are of one piece with or are affixed (e.g., welded) to the bottom wall 902a of the cover 902. For example, the centering projections of the cover 902 can constitute lugs which are bent out of the bottom wall 902a and extend in parallelism with the axis of the friction clutch 901 toward the pressure plate 903. Alternatively, the centering projections of the cover 902 can constitute inwardly bulging portions (rather than lugs) of the bottom wall 902a.

Figure 27:
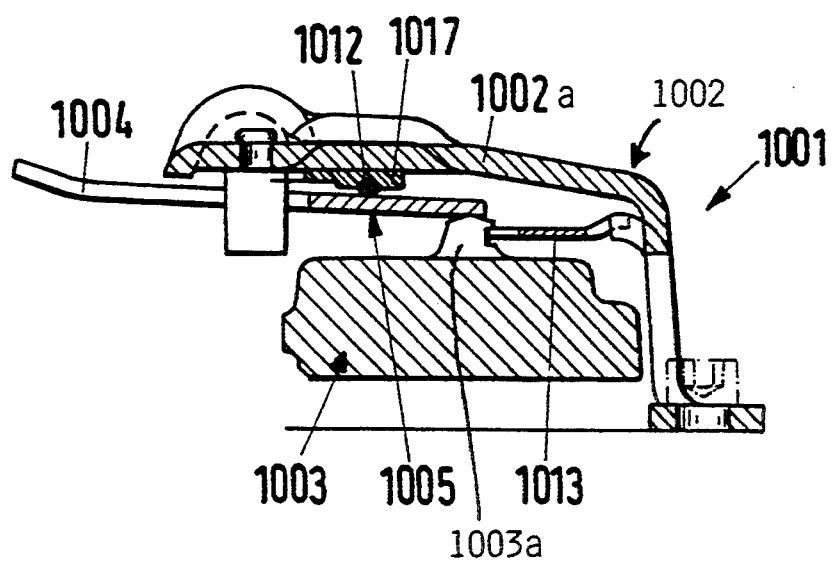
FIG. 27 is a fragmentary axial sectional view of an eighth friction clutch.

The diaphragm spring which constitutes the sensor 913 in the friction clutch 901 of FIG. 27 is designed in such a way that its circumferentially complete main or basic portion 913a is disposed radially inwardly of the projecting portion or portions 903a of the pressure plate 903. In order to prop the diaphragm spring 904 on the one hand, and to be adequately propped against the cover 902 on the other hand, the sensor 913 is further provided with radial arms in the form of tongues including a set extending from the main portion 913a radially inwardly to form part of the seat 905 (such as a substitute for the wire ring 11 in the seat 5 of FIGS. 1-2) and a set extending from the main portion 913a radially outwardly to react against lugs forming part of the substantially axially extending portion of the cover 902.

Referring to FIG. 27, there is shown a friction clutch 1001 including a diaphragm spring 1013 constituting a sensor and serving to transmit a force which opposes the force to be applied in order to disengage the friction clutch and which also opposes the force of the diaphragm spring (resilient device) 1004. The sensor 1013 reacts against the housing or cover 1002 and bears against the projecting portion or portions 1003a of the pressure plate 1003. In other words, the sensor 1013 is installed in axially stressed condition between the cover 1002 and the pressure plate 1003. In this embodiment of the present invention, the seat 1005 does not provide for the diaphragm spring 1004 a bearing for tilting of the diaphragm spring in a direction to disengage the friction clutch 1001. The diaphragm spring 1004 engages a wire ring 1012 which forms part of the seat 1005 and contacts that side of the main portion of the diaphragm spring 1004 that faces toward the annular adjusting member 1017 and the bottom wall 1002a of the cover 1002. The sensor 1013 constitutes the means for biasing the main portion of the diaphragm spring 1004 against the wire ring 1012 of the seat 1005. The sensor 1013 is dimensioned, configurated and installed in such a way that, during disengagement of the friction clutch 1001, the axial force generated by the sensor 1013 and acting upon the diaphragm spring 1004 is or becomes larger than the force which is required to disengage the friction clutch 1001. The arrangement should be such as to ensure that, when the wear upon the friction linings (not shown in FIG. 27) is nil or minimal, the diaphragm spring 1004 continuously engages the wire ring 1012 of the seat 1005. To this end, and as already described in connection with the previously discussed embodiments of the improved friction clutch, it is necessary to properly relate the superimposed forces acting in the axial direction of the friction clutch 1001. Such forces are generated by the sensor 1013, by the resilient segments (not shown) of the clutch disc in the friction clutch 1001, by leaf springs (if any) which connect the pressure plate 1003 with the cover 1002 in such a way that the parts 1002, 1003 have a certain freedom of axial movement but cannot turn relative to each other, by the diaphragm spring 1004, by the means for disengaging the friction clutch 1001, and by resilient means (e.g., coil springs or torsion springs) acting upon the member 1017 of the adjusting or compensating unit in order to compensate for wear upon the pressure plate 1003, the counterpressure plate (not shown) and/or the friction linings of the clutch disc between the pressure plate 1003 and the counterpressure plate.

The operation of the friction clutch 1001 of FIG. 27 is as follows: The sensor 1013 is designed in such a way that its force corresponds to the disengaging force at the point of adjustment. When the friction linings (not shown in FIG. 27) have undergone a certain amount of wear (and/or when one or more other parts of the friction clutch 1001 have undergone a certain amount of wear, such as the portion or portions 1003a of the pressure plate 1003 and/or the adjacent portion of the diaphragm spring 1004), the conicity of the diaphragm spring 1004 is changed accordingly. If the friction clutch 1001 is then disengaged against the more pronounced resistance of the diaphragm spring 1004, the diaphragm spring is first tilted at the ring 1012 to a position close to the adjustment point. At such point, the disengaging force equals the force of the sensor 1013 plus the remaining force of the resilient segments (not shown in FIG. 27) forming part of the clutch disc; therefore, further disengagement of the friction clutch 1001 causes a tilting of the diaphragm spring 1004 at the portion or portions 1003a of the pressure plate 1003 until an equilibrium is established between the disengaging force and the force of the sensor 1013. The diaphragm spring 1004 is disengaged from the ring 1012 and the latter is free to be adjusted (in response to angular displacement of the annular member 1017 of the compensating device) in a direction to compensate for wear. As the disengagement of the friction clutch 1001 continues, the magnitude of the disengaging force continues to decrease, the force of the sensor 1013 prevails and the sensor then causes the pressure plate 1003 to push the diaphragm spring 1004 against the ring 1012 of the seat 1005. Further tilting of the diaphragm spring 1004 then takes place with reference to the ring 1012. During transition from engagement of the diaphragm spring 1004 with the ring 1012 to engagement of the diaphragm spring with the portion or portions 1003a of the pressure plate 1003, the diaphragm spring changes its tendency to act as a two-armed lever. The diaphragm spring then temporarily reacts against the pressure plate 1003 with the then prevailing disengaging force and, as already mentioned above, is lifted off the ring 1012 of the seat 1005 on the cover 1002. However, and as the disengagement of the friction clutch 1001 continues, the resulting drop of bias of the diaphragm spring 1004 enables the force of the sensor 1013 to prevail and to push the diaphragm spring back against the ring 1012 which results in blocking or deactivation of the compensating device including the annular adjusting member 1017, i.e., the adjusting operation is completed. The diaphragm spring 1004 is then in condition to act as a two-armed lever during further disengagement of the friction clutch 1001. This diaphragm spring is preferably designed by full consideration of all spring forces which are directly or indirectly applied or applicable to oppose its bias. Such forces include particularly that of the sensor 1013 and the forces adapted to be applied by parts which are movable in the axial direction of the cover 1002 and form part of the compensating device including the member 1017.

Figure 28:
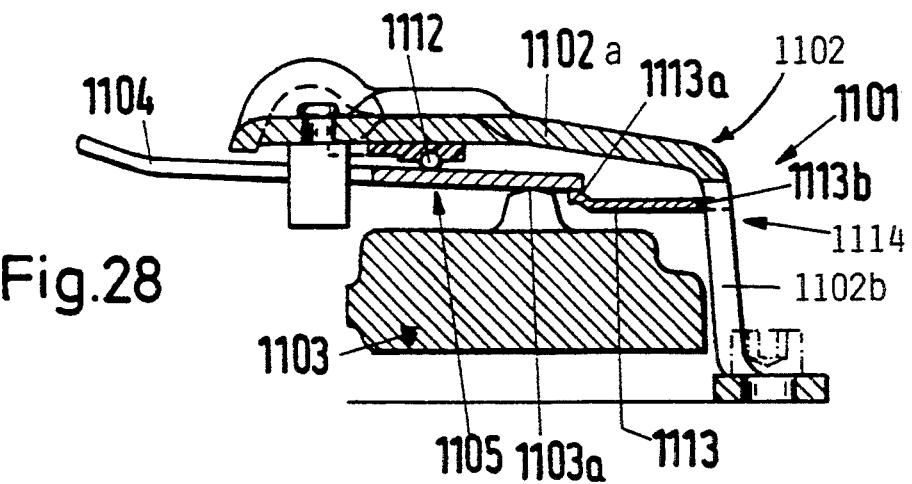
FIG. 28 is a fragmentary axial sectional view of a ninth friction clutch.

FIG. 28 shows a portion of a torque transmitting friction clutch 1101 wherein the sensor 1113 engages the diaphragm spring 1104 radially outwardly of the ring 1112 of the seat 1105. The location of engagement between the sensor 1113 and the housing or cover 1102 of the friction clutch 1101 is also disposed radially outwardly of the ring 1112 and radially outwardly of that portion or those portions 1103a of the pressure plate 1103 which is or are biased by the diaphragm spring 1104. The radially outermost portion of the sensor 1113 is constituted by radially outwardly extending arms 1113b which engage the cover 1102 in a manner similar to that shown in and already described with reference to FIG. 21, namely by resorting to a bayonet mount 1114. The latter maintains the sensor 1113 at a predetermined axial distance from the bottom wall 1102a of the cover 1102 and prevents undesirable angular movements of the sensor relative to the cover 1102. In order to facilitate installation of the sensor 1113 in the cover 1102, the latter is provided with axially parallel slots 1102b which receive the arms 1113b in order to assemble the bayonet mount 1114. The arms 1113b can be introduced into the respective slots 1102b in the axial direction of the cover 1102. The diaphragm spring 1104 is caused to bear upon the ring 1112 of the seat 1105 under the bias of the sensor 1113.

The friction clutch 1101 of FIG. 28 exhibits the advantage that the diaphragm spring 1104 is stressed and acts not unlike a two-armed lever as soon as, and as long as, the friction clutch remains in engaged condition. In other words, the diaphragm spring 1104 is stressed between the ring 1112 of the seat 1105 and the portion or portions 1103a of the pressure plate 1103. However, when the friction clutch 1101 is being disengaged, the diaphragm spring 1104 bears only or practically exclusively against the sensor 1113 and is tilted at that portion (1113a) of the sensor 1113 which can be said to form part of the seat 1105 and serves as a substitute for the ring 11 in the seat 5 of the friction clutch 1. At the same time, the portion 1113a of the sensor 1113 moves in the axial direction of the cover 1102 so that the diaphragm spring 1104 then acts not unlike a one-armed lever.

The sensor 1113 can be designed in such a way that it can engage any desired or selected portion of the diaphragm spring 1104, i.e, it can also engage the diaphragm spring at a selected radial distance from the axis of the cover 1102 anywhere between the seat 1005 and the location or locations of engagement between the diaphragm spring and the portion or portions 1103a of the pressure plate 1103. However, it is also possible to place the diameter of contact between the sensor 1113 and the diaphragm spring 1104 radially inwardly of the seat 1105. If the friction clutch 1101 is designed in the just outlined manner, the axial propping force to be furnished by the sensor 1113 tends to increase in response to decreasing diameter of the locations of contact between the portion 1113a of the sensor and the diaphragm spring 1104. Furthermore, the width of that range during which the force to be applied by the sensor 1113 is at least substantially constant must increase with increasing distance of the location of contact between the portion 1113a of the sensor and the diaphragm spring 1104 from the diameter of contact between the diaphragm spring and the seat 1105.

Figure 29:
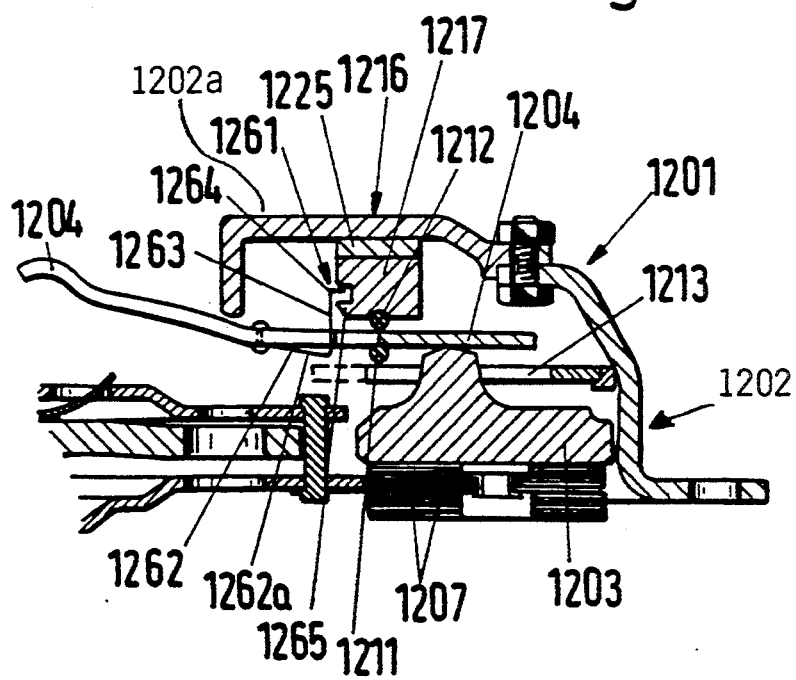
FIG. 29 is a fragmentary axial sectional view of a tenth friction clutch.

The friction clutch 1201 of FIG. 29 comprises a compensating or adjusting device 1216 whose operation is analogous to that of the aforedescribed compensating devices, especially those in the friction clutches 1 and 101. The seat for the diaphragm spring 1204 comprises two rings 1211, 1212 which are disposed at opposite sides of the diaphragm spring. The seat 1211 is adjacent the pressure plate 1203 and is biased by the sensor 1213 so that it is normally maintained in contact with the respective side of the diaphragm spring 1204.

The friction clutch 1201 further comprises a device 1261 which prevents the ramps on the adjusting member 1217 of the compensating device 1216 from adhering to the adjacent ramps on the annulus 1225 which is immediately adjacent the inner side of the bottom wall 1202a of the cover or housing 1202. The unit 1261 is designed in such a way that it prevents the ramps of the two sets from adhering to each other during the entire useful life of the friction clutch 1201. The non-illustrated ramps on the annulus 1225 are or can be identical with or analogous to the ramps 24 of the annulus 25 which forms part of the friction clutch 1 of FIGS. 1–2 and is shown in FIGS. 5 and 6. Adherence of ramps on the annular member 1217 to the ramps on the annulus 1225 of the compensating device 1216 would prevent this device from automatically compensating for wear upon the friction linings 1207 and preferably also upon certain other parts of the friction clutch 1201.

The unit 1261 can be said to constitute a ramp separating assembly in a sense that it does not prevent one set of ramps from contacting the ramps of the other set but is effective to prevent the ramps of the two sets from adhering to one another with a force which could affect the accuracy and reliability of the compensating device 1216. The arrangement is such that the unit 1261 is effective during disengagement of the friction clutch 1201 and, if the friction linings 1207 have undergone an amount of wear which warrants activation of the device 1216, i.e., a compensation for such wear, the unit 1261 can apply to the adjusting member 1217 a force in the axial direction of the cover 1202. Such force suffices to terminate any adherence of the ramps on the annular adjusting member 1217 to the ramps on the annulus 1225. The illustrated unit 1261 comprises an element 1262 which is resilient in the axial direction of the cover 1202 and is connected to the diaphragm spring 1204. The element 1262 comprises a ring-shaped diaphragm-like main or basic portion 1262a having a radially inner portion which is connected (e.g., riveted) to the diaphragm spring 1204. The radially outer part of the main portion 1262a of the element 1262 (which also resembles a diaphragm spring) is provided with axially extending projections 1263. These projections extend through axial holes or windows of the diaphragm spring 1204 and their free ends are bent at 1264 to overlie a shoulder 1265 of the annular adjusting member 1217. The projections 1263 are preferably equidistant from each other in the circumferential direction of the element 1262. The shoulder 1265 can constitute a circumferentially complete shoulder if the peripheral surface of the annular member 1217 is provided with a ring-shaped groove or recess. It is also possible to provide the peripheral surface of the member 1217 with several spaced-apart grooves or recesses each of which is bounded by a separate shoulder 1265 for one of the free ends 1264.

The axial distance between the free ends 1264 and the shoulder 1265 in engaged condition of the friction clutch 1201 is selected in such a way that the free ends 1264 do not contact the adjusting member 1217, the same as during the major part of disengagement of the friction clutch. The arrangement is preferably such that the free ends 1264 of the projections 1263 engage and pull the shoulder 1265 in a direction away from the annulus 1225 only when the friction clutch 1201 is fully disengaged. The resilient element 1262 is then stressed between the diaphragm spring 1204 and the adjusting member 1217. This ensures that, when warranted by wear upon the friction linings 1207 (or by additional wear upon these friction linings), the ring 1211 can be shifted axially of the cover 1202 toward the pressure plate 1203 because the two sets of ramps (on the member 1217 and on the annulus 1225) do not adhere to each other and the member 1217 can be turned in order to effect the necessary adjustment which compensates for wear or additional wear upon the friction linings 1207.

The unit 1261 is further designed to prevent an adjustment by the member 1217 of the compensating device 1261 when the extent of disengagement is excessive, for example, due to improper assembly of the friction clutch 1201, particularly as a result of improper basic or initial setting of the device 1216. This function is accomplished by the unit 1261 in that, when the change of conicity of the diaphragm spring 1204 during disengagement of the friction clutch 1201 is excessive, the element 1262 biases the adjusting member 1217 toward the diaphragm spring which, in turn, prevents the member 1217 from turning relative to the diaphragm spring and hence also relative to the annulus 1225 of the compensating device 1216. With reference to the diagram of FIG. 8, the unit 1261 ensures that, when the change of conicity of the diaphragm spring 1204 is such as to cause the point 46 to migrate upwardly and away from the abscissa, the annular member 1217 is no longer free to turn relative to the annulus 1225 and relative to the diaphragm spring because, at such time, the retaining force of the sensor 1213 is overcome. In other words, in the absence of any undertaking to the contrary, the adjusting member 1217 would then change its angular position and would compensate for (non-existent or insufficient) wear upon the friction linings 1207. This would result in a change of operating point, i.e., a change of the position or shape of the diaphragm spring 1204 in a direction to reduce its bias upon the pressure plate 1203. Referring again to the diagram of FIG. 8, this would mean that the operating point 41 would be transferred along the curve 40 in a direction toward the lowest point 45 of this curve.

Figure 30:
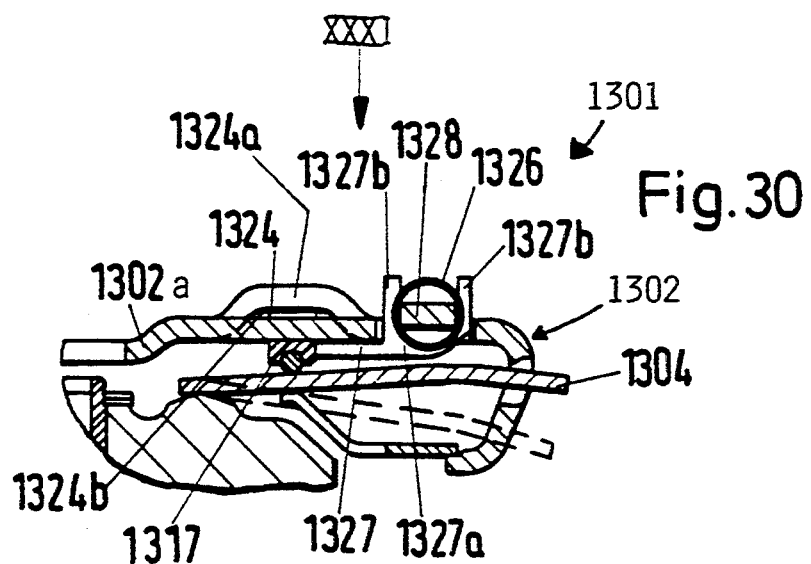
FIG. 30 is a fragmentary axial sectional view of an eleventh friction clutch.
Figure 31:
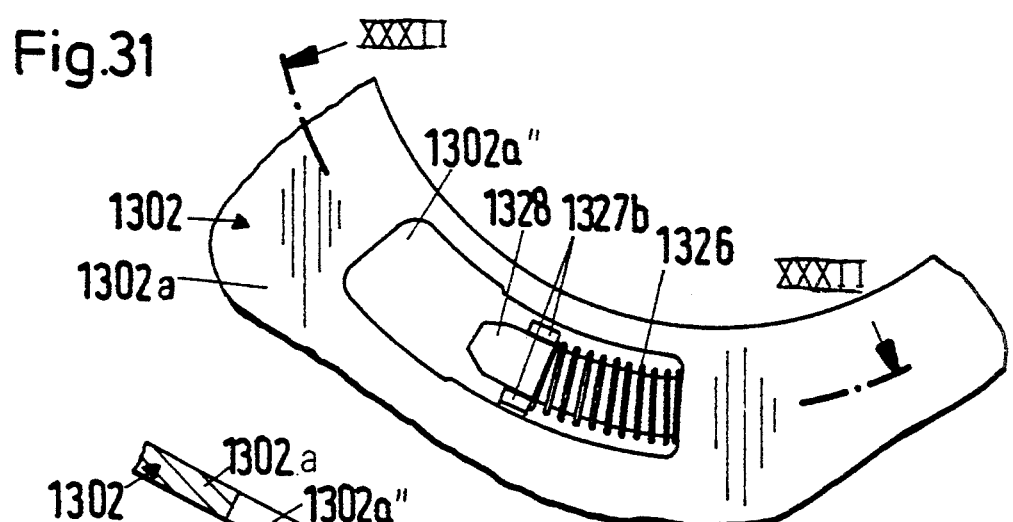
FIG. 31 is a fragmentary plan view substantially as seen in the direction of arrow XXXI in FIG. 30.
Figure 32:
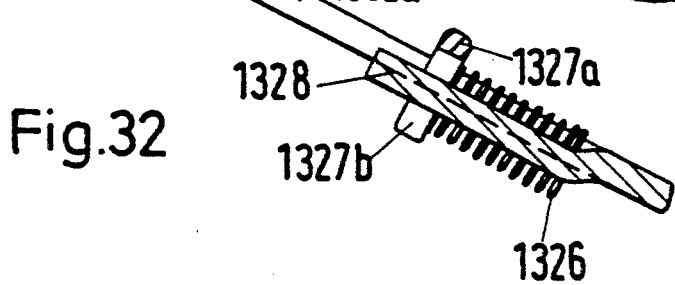
FIG. 32 is a fragmentary sectional view substantially as seen in the direction of arrows from the line XXXII—XXXII in FIG. 31.

Referring to FIGS. 30, 31 and 32, there is shown a portion of a friction clutch 1301 wherein the compensating device comprises an annular adjusting member 1317. The means for operating the compensating device in order to compensate for wear upon the friction linings (not shown) of the clutch disc comprises coil springs 1326 each of which surrounds an arcuate retainer in the form of a mandrel 1328 forming part of the bottom wall 1302a of the cover or housing 1302. The cover 1302 is made of a metallic sheet material and the mandrels 1328 are elongated tongues which are bent out of the bottom wall 1302a in a manner best shown in FIGS. 31 and 32. To this end, the bottom wall 1302a is provided with U-shaped cutouts 1302a" each of which surrounds three sides of the respective mandrel 1328. As can be seen in FIGS. 31 and 32, the mandrels 1328 are flat, they have an arcuate shape and they are preferably disposed in a plane which is at least close to the general plane of the bottom wall 1302a. It is also possible to employ mandrels which extend substantially tangentially of a circle having its center on the axis of the friction clutch 1301. The mandrel 1328 which is shown in FIG. 32 is offset from the general plane of the bottom wall 1302a by a distance corresponding to half the thickness of the bottom wall. The width of each mandrel 1328 is or can be selected in such a way that each such mandrel can adequately guide the respective coil spring 1326 in the radial and axial directions of the cover 1302.

The annular adjusting member 1317 of the compensating device in the friction clutch 1301 comprises radially outwardly extending arms 1327 which are disposed between the bottom wall 1302a and the diaphragm spring 1304. The radially outermost portions of the arms 1327 are provided with axially extending bifurcated (generally U-shaped) portions or sockets 1327a each having two prongs 1327b flanking the respective mandrel 1328 (see particularly FIGS. 31 and 32). Thus, the springs 1326 bear against the prongs 1327b on the arms 1327 of the annular member 1317 and react against the bottom wall 1302a so that they tend to turn the member 1317 relative to the ramps 1324 which are provided directly at the inner side of the bottom wall 1302a in axial alignment with the ramps (not specifically shown) of the member 1317. The prongs 1327b extend axially of the cover 1302 through the respective U-shaped cutouts 1302a" of the bottom wall 1302a.

The ramps 1324 are of one piece with the bottom wall 1302a and are preferably formed in such a way that the bottom wall is provided with slots 1324a to establish passages 1324b for the flow of cool atmospheric air. The passages 1324b are preferably oriented in such a way that they have inlets facing in the direction of rotation of the cover 1302 when the latter is driven by the flywheel on the output element of a combustion engine in a motor vehicle. Forced circulation of atmospheric air when the cover 1302 is set in rotary motion ensures highly desirable and highly effective cooling of the entire friction clutch 1302. The cooling action is particularly beneficial to the annular adjusting member 1317 if the latter is made of a plastic material. This results in highly effective reduction of thermal stresses upon the member 1317. Of course, the air streams which are admitted through the passages 1324b can also serve to cool one or more additional parts of the friction clutch 1301.

In accordance with a further embodiment of the present invention, the diaphragm spring which urges the pressure plate against the adjacent set of friction linings forming part of a clutch disc can be biased by a sensor including one or more leaf springs which are installed, for example, between the pressure plate and the cover to bear (directly or indirectly) against the diaphragm spring. Such leaf springs can correspond to the leaf springs 9 in the friction clutch 1, i.e., they can be installed to hold the pressure plate against rotation relative to the cover but to permit limited axial movements of the pressure plate in the axial direction of the cover. In other words, the leaf springs 9 of the friction clutch 1, or analogous leaf springs, could perform the function of non-rotatably but axially movably coupling the pressure plate 3 to the cover 2 and the function of acting as a sensor which urges the diaphragm spring 4 against its seat. Moreover, such leaf springs could also replace the ring 11 of the seat 5. All that is necessary is to design and install the leaf springs 9 in such a way that, when the friction clutch 1 is actuated at a time when the wear upon the friction linings is nil or negligible, the diaphragm spring 4 continues to abut the ring 12 of the seat 5. However, when the friction linings 7 have been subjected to an amount of wear which warrants compensation by the device 16, i.e., when the disengaging force of the diaphragm spring 4 is increased, the leaf springs 9 should permit an appropriate adjustment of the diaphragm spring. Leaf springs which can be used to perform all of the above outlined functions are preferably designed to exhibit a displacement-to-force characteristic which is practically linear for the maximum required adjustment of the friction clutch, i.e., for maximal adjustment of the diaphragm spring. In other words, and as already described with reference to the diagram of FIG. 9, the leaf springs should exhibit a characteristic curve corresponding to the portion of the curve 47 or 47a within the distance 48.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. An engageable and disengageable friction clutch, comprising:
    a housing rotatable about a predetermined axis;
    a pressure plate;
    means for non-rotatably connecting said pressure plate to said housing with limited freedom of movement in the direction of said axis;
    a rotary counterpressure plate adjacent said pressure plate;
    a torque transmitting clutch disc disposed between said plates and having friction linings which are subject to wear in response to repeated engagement and disengagement of said friction clutch;
    an axially stressed diaphragm spring disposed between said housing and said pressure plate to bias said pressure plate against said clutch disc so that said friction linings are clamped between said plates in an engaged condition of said friction clutch;
    a seat which is carried by said housing, said diaphragm spring being tiltable against said seat;
    means for automatically compensating for wear at least upon said friction linings, said compensating means being effective between said housing and said diaphragm spring to shift said seat relative to said housing in the direction of said axis which compensates for wear at least upon said friction linings;
    means for operating said compensating means; and
    biasing means for producing a supporting force applied so as to bias said diaphragm spring and said seat together.

2. The friction clutch of claim 1, wherein said diaphragm spring has a degressive characteristic curve within its operating range.

3. The friction clutch of claim 1, wherein said diaphragm spring is force-lockingly braced against the action of said supporting force.

4. The friction clutch of claim 1, wherein said supporting force and the bias of said diaphragm spring are related to each other in such a way that, in contemplated built-in condition of the diaphragm spring, in the absence of changes of conicity of said diaphragm spring due to wear, and within said disengagement range of the diaphragm spring, said supporting force is greater than the bias which is applied by said diaphragm spring and opposes said supporting force whereas, when the conicity of said diaphragm spring changes as a result of wear, said supporting force is smaller than the bias which is applied by the diaphragm spring to oppose said supporting force within portions of said disengagement path of said diaphragm spring.

5. The friction clutch of claim 1, wherein said means for applying said supporting force comprises at least one energy storing device which changes its shape as a result of wear-induced adjustment of said diaphragm spring and/or said seat.

6. The friction clutch of claim 5, wherein said at least one energy storing device comprises a spring.

7. The friction clutch of claim 1, wherein said compensating means is disposed between said diaphragm spring and said housing as seen in the direction of said axis.

8. The friction clutch of claim 1, wherein said compensating means comprises sloping surfaces, said sloping surfaces being movable relative to said housing.

9. The friction clutch of claim 8, wherein said compensating means comprises ramps and said sloping surfaces are provided on said ramps.

10. The friction clutch of claim 1, wherein said biasing means for producing said supporting force comprises an annular spring element.

11. The friction clutch of claim 1, wherein said means for applying said supporting force comprises a second diaphragm spring which engages said axially stressed diaphragm spring at a predetermined radial distance from said axis, said axially stressed diaphragm spring being tiltable relative to said seat at or close to said predetermined radial distance from said axis.

12. The friction clutch of claim 9, wherein said seat comprises a first portion between said diaphragm spring and said housing and a second portion between said diaphragm spring and said means for applying said supporting force.

13. The friction clutch of claim 12, wherein said second portion of said seat is disposed between said diaphragm spring and said pressure plate and said means for applying said supporting force includes means for urging said second portion of said seat against said diaphragm spring.

14. The friction clutch of claim 13, wherein said second portion of said seat is movable in the direction of said axis.

15. The friction clutch of claim 14, wherein the bias of said diaphragm spring varies in response to movement of said second portion of said seat.

16. The friction clutch of claim 15, wherein the bias of said diaphragm spring decreases in response to movement of said second portion of said seat.

17. The friction clutch of claim 14, wherein said second portion of said seat is movable to a position in which the supporting force which is applied thereto is in a state of at least substantial equilibrium with the disengaging force which is applied thereto by said diaphragm spring.

18. The friction clutch of claim 14, wherein said urging means comprises energy storing means which applies to said second portion of said seat a substantially constant force within the contemplated adjustment range.

19. The friction clutch of claim 1, wherein said means for applying said supporting force includes energy storing means which acts as a sensor.

20. The friction clutch of claim 1, wherein said seat comprises a first portion which is disposed between said diaphragm spring and said housing and is movable in the direction of said axis toward said pressure plate but is adapted to be arrested against movement in the direction of said axis away from said pressure plate, said seat further comprising a second portion disposed between said diaphragm spring and said pressure plate and being biased toward said diaphragm spring.

21. The friction clutch of claim 1, wherein said means for operating said compensating means comprises a spring.

22. The friction clutch of claim 1, wherein said compensating means comprises an annular member which is stressed by said diaphragm spring in the direction of said axis in engaged condition of the friction clutch.

23. The friction clutch of claim 1, wherein said compensating means comprises adjustable ramps which slope in the direction of said axis.

24. The friction clutch of claim 23, wherein said compensating means further comprises an annular adjusting member and said ramps include a set of ramps provided on said adjusting member.

25. The friction clutch of claim 24, wherein said ramps further include a second set of ramps cooperating with the ramps of the seat on said adjusting member.

26. The friction clutch of claim 24, wherein said ramps further include a second set of ramps cooperating with the ramps of the set on said adjusting member.

27. The friction clutch of claim 26, wherein said compensating means further comprises an annulus between said housing and said adjusting member, the ramps of said second set being provided on said annulus.

28. The friction clutch of claim 26, wherein the ramps of said second set are of one piece with said housing.

29. The friction clutch of claim 1, wherein said compensating means acts as a freewheel in the direction of disengagement of the friction clutch and is self-locking in a direction counter to said direction of disengagement.

30. The friction clutch of claim 1, wherein said compensating means comprises sets of cooperating ramps and the ramps of one of said sets being inclined at an angle of 4–20 degrees with reference to a plane which is normal to said axis.

31. The friction clutch of claim 30, wherein said angle is 5–12 degrees.

32. The friction clutch of claim 1, wherein said compensating means comprises a first annular member having a first set of ramps and a second annular member having a second set of ramps engaging the ramps of said first set and having a slope such that said sets of ramps are in self-locking frictional engagement with each other.

33. The friction clutch of claim 1, wherein said compensating means comprises a first member having a first set of ramps and a second member having a second set of ramps engaging the ramps of said first set, at least one of said members being movable relative to the other of said members and being biased relative to said other member in said direction to shift said seat relative to said housing.

34. The friction clutch of claim 1, wherein said compensating means comprises a plurality of discrete mobile adjusting members.

35. The friction clutch of claim 1, wherein said compensating means includes means for shifting said seat as a function of the rotational speed of said housing.

36. The friction clutch of claim 1, wherein said compensating means is ineffective when said housing is rotated at least at one of a plurality of different speeds.

37. The friction clutch of claim 36, wherein said compensating means is ineffective when the speed of said housing exceeds a predetermined threshold value.

38. The friction clutch of claim 36, wherein said speeds include an idling speed and speeds below said idling speed, said compensating means being effective at and below said idling speed.

39. The friction clutch of claim 1, wherein said compensating means is effective when the rotational speed of said housing is at least close to zero.

40. The friction clutch of claim 1, wherein said compensating means comprises a first member having a first set of ramps and a second member having a second set of ramps engaging the ramps of said first set, one of said members being movable relative to said housing in a predetermined direction and means for biasing said one of said members in said predetermined direction.

41. The friction clutch of claim 40, wherein said one member is biased in the circumferential direction of said rotatable housing.

42. The friction clutch of claim 1, wherein said means for applying said supporting force comprises a resilient sensor having a portion remote from said axis and reacting against said housing.

43. The friction clutch of claim 1, wherein said means for applying said supporting force includes a resilient sensor, wherein said housing comprises portions at which said sensor is directly supported.

44. The friction clutch of claim 1, wherein said friction linings comprise a first friction lining and a second friction lining which are respectively engageable by said pressure plate and said counterpressure plate, said clutch disc further comprising resilient means for biasing said first and second friction linings away from each other in the direction of said axis.

45. The friction clutch of claim 1, wherein said friction linings comprise a first friction lining and a second friction lining which are engageable by said pressure plate and said counterpressure plate, respectively, said clutch disc further comprising resilient means for biasing said first and second friction linings away from each other in the direction of said axis and said resilient means by being deformable in response to the bias of said diaphragm spring upon said pressure plate with a first force-to-displacement characteristic, said diaphragm spring having a second force-to-displacement characteristic which at least substantially matches said first characteristic.

46. The friction clutch of claim 1, that the force which is required to actuate said diaphragm spring in disengaged condition of the friction clutch is in the range of minus 150 nm and plus 150 nm.

47. The friction clutch of claim 1, that said diaphragm spring has a force-to-displacement characteristic with a transition from positive to negative upon disengagement of said clutch disc from said counterpressure plate.

48. A friction clutch comprising:
a pressure plate rotatable about a predetermined axis;
a rotary counterpressure plate coaxial with said pressure plate;
a diaphragm spring arranged to bias one of said plates axially towards the other of said plates; and
a clutch disposed between said plates and having a first and a second friction lining engageable by said pressure plate and said counterpressure plate, respectively, said clutch disc further having resilient means for biasing said first and second frictions linings away from each other in the direction of said axis and said resilient means being deformable in response to the bias of said diaphragm spring upon one said plate with a first force-to-displacement characteristic, said diaphragm spring having a second force-to-displacement characteristic which at least substantially matches said first characteristic.

* * * * *